(12) United States Patent
Sengupta et al.

(10) Patent No.: US 8,397,204 B2
(45) Date of Patent: Mar. 12, 2013

(54) SYSTEM AND METHODOLOGY FOR DEVELOPMENT OF A SYSTEM ARCHITECTURE USING OPTIMIZATION PARAMETERS

(75) Inventors: Anirban Sengupta, Scarborough (CA); Reza Sedaghat, Oakville (CA)

(73) Assignee: Ryerson University, Toronto, Ontario ( * ) Notice: Subject to any disclaimer, the term of this patent is extended or adjusted under 35 U.S.C. 154(b) by 56 days.

(21) Appl. No.: 12/974,925

(22) Filed: Dec. 21, 2010

(65) Prior Publication Data

US 2012/0159119 A1  Jun. 21, 2012

(51) Int. Cl.
G06F 17/50 (2006.01)
G06F 11/22 (2006.01)

(52) U.S. Cl. .................. 716/138; 716/132; 716/136

(58) Field of Classification Search .................. None
See application file for complete search history.

(56) References Cited

U.S. PATENT DOCUMENTS

| | | | |
|---|---|---|---|
| 6,351,151 B2 | 2/2002 | Kumar et al. | |
| 6,740,958 B2 | 5/2004 | Nakazato et al. | |
| 6,954,916 B2 | 10/2005 | Bernstein et al. | |
| 7,234,121 B2 | 6/2007 | Zhu et al. | |
| 7,657,416 B1 * | 2/2010 | Subasic et al. | 703/13 |
| 7,743,289 B2 | 6/2010 | Furuta et al. | |
| 2006/0275995 A1 | 12/2006 | Furuta | |
| 2007/0011575 A1 | 1/2007 | Koktan et al. | |

OTHER PUBLICATIONS

P. Arató, Z. Á. Mann, and A. Orbán, "Time-constrained scheduling of large pipelined datapaths," Journal of Systems Architecture, vol. 51, No. 12, pp. 665-687, 2005.
G. De Micheli, Synthesis and Optimization of Digital Circuits, McGraw-Hill, Boston, Mass, USA, 1994.
I. Das. A preference ordering among various Pareto optimal alternatives. Structural and Multidisciplinary Optimization, 18(1):30-35, Aug. 1999.
Christian Haubelt, Jurgen Teich, "Accelerating Design Space Exploration Using Pareto-Front Arithmetic's", In Proceedings of Asia and South Pacific Design Automation Conference (ASP-DAC'03), Japan, 2003.
J. C. Gallagher, S. Vigraham, and G. Kramer, "A family of compact genetic algorithms for intrinsic evolvable hardware," IEEE Trans. Evolutionary Computation., vol. 8, No. 2 , pp. 1-126, Apr. 2004.

(Continued)

*Primary Examiner* — A. M. Thompson
(74) *Attorney, Agent, or Firm* — Bereskin & Parr LLP/S.E.N.C.R.L., S.r.l.

(57) ABSTRACT

Described embodiments relate to methods, systems and computer readable medium for developing a system architecture. Resources constraints are defined, where each resource constraint corresponds to a maximum number of a each kind of resources available to construct the system architecture. Constraint values for each of at least three optimization parameters are defined, which includes a final optimization parameter. A design space is defined as a plurality of vectors representing different combinations of a number of each kind of resource available to construct the system architecture. For each of the plurality of optimization parameters, a priority factor function is defined. A plurality of satisfying sets of vectors is determined for each of the optimization parameters except for the final optimization parameter. A set of vectors is determined based on an intersection of the plurality of satisfying sets of vectors for the optimization parameters. A vector is selected from the set of vectors based on the ordered list of vectors and the final optimization parameter, where the selected vector is for use in developing the system architecture.

31 Claims, 21 Drawing Sheets

OTHER PUBLICATIONS

Vyas Krishnan and Srinivas Katkoori, A Genetic Algorithm for the Design Space Exploration of Datapaths During High-Level Synthesis, IEEE Transactions on Evolutionary Computation, vol. 10, No. 3, Jun. 2006.

E. Torbey and J. Knight, "High-level synthesis of digital circuits using genetic algorithms," in Proc. Int. Conf. Evol. Comput., pp. 224-229, May 1998.

E. Torbey and J. Knight, "Performing scheduling and storage optimization simultaneously using genetic algorithms," in Proc. IEEE Midwest Symp. Circuits Systems, pp. 284-287, 1998.

Giuseppe Ascia, Vincenzo Catania, Alessandro G. Di Nuovo, Maurizio Palesi, Davide Patti, "Efficient design space exploration for application specific systems-on-a-chip" Journal of Systems Architecture 53, pp. 733-750, 2007.

A.C.Williams, A.D.Brown and M.Zwolinski, "Simultaneous optimisation of dynamic power, area and delay in behavioural synthesis", IEE Proc.-Comput. Digit. Tech, vol. 147, No. 6, pp. 383-390, Nov. 2000.

Christian Haubelt, Thomas Schlichter, Joachim Keinert, Mike Meredith, "SystemCoDesigner: automatic design space exploration and rapid prototyping from behavioral models", Proceedings of the 45th annual ACM IEEE Design Automation Conference, pp. 580-585, 2008.

Xuejie Zhang and Kam W. Ng, "A review of high-level synthesis for dynamically reconfigurable FPGAs", Microprocessors and Microsystems, Elsevier, vol. 24, Issue 4, pp. 199-211, Aug. 1, 2000.

C. Mandal, P. P. Chakrabarti, and S. Ghose, "GABIND: A GA approach to allocation and binding for the high-level synthesis of data paths," IEEE Transaction on VLSI, vol. 8, No. 5, pp. 747-750, Oct. 2000.

M. J. M. Heijlingers, L. J. M. Cluitmans, and J. A. G. Jess, "High-level synthesis scheduling and allocation using genetic algorithms," in Proc.Asia South Pacific Design Automation Conf., pp. 61-66, 1995.

M. K. Dhodhi, F. H. Hielscher, R. H. Storer, and J. Bhasker, "Datapath synthesis using a problem-space genetic algorithm," in IEEE Trans.Comput.-Aided Des., vol. 14, pp. 934-944, 1995.

S. Brown et al. Fundamentals of digital logic with VHDL design. 2nd ed. New York, NY: McGraw-Hill: 2005. p. 940.

Saraju P. Mohanty, Nagarajan Ranganathan, Elias Kougianos and Priyadarsan Patra, "Low-Power High-Level Synthesis for Nanoscale CMOS Circuits" Chapter- High-Level Synthesis Fundamentals, Springer US, 2008.

D. Gajski, N. Dutt, A.Wu, and S. Lin, High Level Synthesis: Introduction to Chip and System Design. Norwell, MA: Kluwer, 1992.

P. G. Paulin and J. P. Knight, "Force-directed scheduling for the behavioral synthesis of ASICs," IEEE Trans. Comput.-Aided Des., vol. 8, No. 6, pp. 661-679, 1989.

Zhipeng Zeng et al. A Novel Framework of Optimizing Modular Computing Architecture for multi objective VLSI designs, 2009 International Conference on Microelectronics, pp. 322-325.

Anirban Sengupta et al. "A high level synthesis design flow with a novel approach for efficient design space exploration in case of multi-parametric optimization objective", Microelectronics Reliability 50 (2010) 424-437.

I. Kirischian et al. Multi-parametric optimisation of the modular computer architecture, Int. J Technol Policy Manage 2006;6(3):327-46.

G. Alessandro et al. Fuzzy decision making in embedded system design. In: Proceedings of the 4th international conference on hardware/software codesign and system synthesis, 2006; Oct. 2006 p. 223-8.

Parker AC McFarland et al. The high-level synthesis of digital systems. Proc IEEE 1990:78(2):301-18.

Parker AC McFarland et al. Tutorial on high-level synthesis. In: Proceedings of the 25th ACM/IEEE design automation conference, Atlantic City, NJ, USA; 1988, p. 330-6.

R. Larson et al. Calculas with analytic geometry. 8th ed. Houghton Mifflin Company: 2006, p. 918-9.

S. Salivahanan et al. Digital signal processing. Tata McGraw-Hill Publishing Company Limited: 2006. p. 439-44.

P. G. Paulin et al. Scheduling and binding algorithms for high-level synthesis. In: Twenty sixth conference on design automation, 1988, p. 1-6.

http://www.cadence.com/support/university/Pages/default.aspx.

ISE 9.21 Quick Start Tutorial, Xilinx ISE 9.2i, Software manuals and help, <http://www.xilinx.com/support/sw_manuals/xilinx92/download/>.

http://www.xilinx.com/publications/xcellonline/xcell_54/xc_ssinterface54.htm.

http://www.synopsys.com/Tools/SLD/AlgorithmicSynthesis/Pages/default.aspx.

G. De Micheli, Synthesis and Optimization of Digital Circuits, New York, McGraw-Hill, 1994.

* cited by examiner

Arrangement of Power in increasing order from the top to the bottom element using the proposed algorithm The Border Variant for Power consumption Arrangement of hardware area in increasing order from the top to the bottom element using the proposed algorithm The variants of the Pareto Optimal Set arranged in increasing order for hardware area Arrangement of area in increasing order from the top to the bottom element using the proposed algorithm The design space in increasing order for area Arrangement of time of execution in decreasing order from the top to the bottom element using the proposed algorithm The arranged design vector space in decreasing order for time of execution

SYSTEM AND METHODOLOGY FOR DEVELOPMENT OF A SYSTEM ARCHITECTURE USING OPTIMIZATION PARAMETERS

FIELD

The described embodiments relate to systems and methods of developing a system architecture, and in particular, relate to systems and methods of developing a system architecture based on a plurality of optimization parameters.

BACKGROUND

The design and development of systems requires extensive analysis and assessment of the design space, not only due to the assorted nature of design parameters, but also due to the diversity in architecture for implementation. Given specifications and system requirements, the aim of designers is to reduce a large and complex design space into a set of feasible design solutions meeting performance objectives and functionality.

For systems based on operational constraints the selection of an optimal architecture for system design is an important step in the development process. Design space architecture can have innumerable design options for selection and implementation based on the parameters of optimization. Selection of the optimal architecture from the design space that satisfies all the performance parameter objectives may be useful for the present generation of System-on-chip (SoC) designs and Very Large Scale Integration (VLSI) design. As it is possible to implement different functions of a system on different hardware components, the architecture design space becomes more complex to analyze. In the case of high level synthesis, performing design space exploration to choose candidate architecture by concurrently satisfying many operating constraints and performance parameters is considered an important stage in the whole design flow. Since the design space is huge and complex there exists a desire to efficiently explore candidate architectures for the system design based on the application to be executed. The method for exploration of candidate architecture should not only be less in terms of complexity factor and time but should also explore the variant in an efficient way meeting specifications provided. The process of high-level synthesis design is very complicated and descriptive and is usually performed by system architects. Depending on the application, the process of defining the problem, performing design space exploration and the other steps required for its successful accomplishment may be very time consuming. Furthermore, recent advancements in areas of communications and multimedia have led to the growth of a wide array of applications requiring huge data processing at minimal power expense. Such data hungry applications demand satisfactory performance with power efficient hardware solutions. Hardware solutions should satisfy multiple contradictory performance parameters such as power consumption and time of execution, for example. Since the selection process for the best design architecture is complex, an efficient approach to explore the design space for selecting a design option is desirable.

SUMMARY

In a first aspect, some embodiments provide a method of developing a system architecture comprising:
defining a plurality of resources constraints $maxN_{R1}, \ldots maxN_{Rn}$, wherein each resource constraint corresponds to a maximum number $N_{Ri}$, $1 \leq i \leq n$, of a each kind of resources $R1, \ldots Rn$ available to construct the system architecture, wherein n is an integer greater than 1;

defining a constraint value for each of at least three optimization parameters for the system architecture, wherein the at least three optimization parameters comprise a final optimization parameter;

defining a design space as a plurality of vectors representing different combinations of a number of each kind of resource $R1, \ldots Rn$ available to construct the system architecture, wherein each vector $V_n$ of the design space is of the form:

$$V_n = (N_{R1} \ldots N_{Rn})$$

wherein, $N_{R1}$ represents the number of the kind of resource R1, $N_{Rn}$ represents the number of the kind of resource Rn; and wherein based on resource constraints, $1 \leq N_{R1} \leq maxN_{R1}, \ldots 1 \leq N_{Rn} \leq maxN_{R1}$ wherein $maxN_{R1}$ is a maximum number of the kind of resource $R1 \ldots maxN_{Rn}$ is a maximum number of the kind resource Rn;

for each of the plurality of optimization parameters, defining a priority factor function for each kind of resource $R1, \ldots Rn$, wherein a priority factor function defines a rate of change of the optimization parameter with respect to a change in a number $N_{Ri}$ of the corresponding kind of resource Ri, $1 \leq i \leq n$;

determining a plurality of satisfying sets of vectors by, for each of the optimization parameters except for the final optimization parameter:
for each kind of resource $R1, \ldots Rn$ available to construct the system architecture, calculating a priority factor using the corresponding priority factor function for the optimization parameter;

determining a priority order by sorting the calculated priority factors based on a relative magnitude of the calculated priority factors;

generating an ordered list of vectors by sorting the plurality of vectors of the design space based on the priority order; and determining a satisfying set of vectors from the ordered list of vectors, wherein each vector of the satisfying set substantially satisfies the constraint value for the optimization parameter;

determining a set of vectors based on an intersection of the plurality of satisfying sets of vectors for the optimization parameters;

for the final optimization parameter:
for each kind of resource $R1, \ldots Rn$ available to construct the system architecture, calculating a priority factor using the corresponding priority factor function for the final optimization parameter;

determining a priority order by sorting the calculated priority factors based on a relative magnitude of calculated priority factors;

generating an ordered list of vectors by sorting the set of vectors based on the priority order;

selecting a vector from the set of vectors based on the ordered list of vectors; and developing the system architecture using the selected vector.

The system architecture may comprise a Register Transfer Level data path circuit. The system architecture may further comprise a Register Transfer Level control timing sequence. The Register Transfer Level data path circuit may be configured to generate output data as a result of performing a sequence of operations on data using Register Transfer Level modules, wherein the Register Transfer Level modules include the number of each kind of resources represented by the selected vector. The Register Transfer Level modules may be selected from the group consisting of registers for storage of data, memory modules, latches for sinking of data, multiplexers and demultiplexers.

The kinds of resources R1, ... Rn may selected from the group consisting of adders, subtractors, clock oscillators, multipliers, divider, comparator, Arithmetic Logic Unit (ALU), integrator, summer and other functional modules.

The optimization parameters may be selected from the group consisting of hardware area, cost, time of execution, and power consumption.

The Register Transfer Level control timing sequence may provide a control configuration for a data path circuit to provide timing and synchronization required by data traversing through the Register Transfer Level modules of the data path circuit.

In accordance with some embodiments, a final optimization parameter is a hardware area of a total number of all kinds of resources R1, ... Rn, and wherein, for the hardware area, the priority factor function of each kind of resource R1, ... Rn is an indicator of a change of area contributed by a change in the number of the kind of resource Ri, wherein $1 \leq i \leq n$ For the hardware area, the priority factor for each kind of resource R1, ... Rn that is not a clock oscillator may be calculated from $N_{Ri}$, $\Delta N_{Ri}$, $K_{Ri}$ wherein $N_{Ri}$ is the number of the kind of resource Ri, $K_{Ri}$ is an area occupied by the kind of resource Ri, $\Delta N_{Ri} \cdot K_{Ri}$ is a change of area contributed by the kind of resource Ri, wherein Ri is a member of the kinds of resources R1, ... Rn; and wherein, for the hardware area, the priority factor function of resource Ri that is a clock oscillator is calculated from $\Delta A(R_{clk})$, $N_{Rclk}$ $R_{clk}$, wherein $R_{clk}$ is a clock oscillator used to construct the system architecture, $\Delta A(R_{clk})$ is a change of area occupied by clock oscillators, $N_{Rclk}$ is a number of clock oscillators.

For the hardware area, the priority factor for each kind of resource R1, ... Rn that is not a clock oscillator may be of the form:

$$PF(Ri) = \frac{\Delta N_{Ri} \cdot K_{Ri}}{N_{Ri}}$$

and wherein, for the hardware area, the priority factor function of resource Ri that is a clock oscillator is of the form:

$$\frac{\Delta A(R_{clk})}{N_{Rclk}}$$

In accordance with some embodiments, the plurality of optimization parameters comprise a time of execution of a total number of all kinds resources R1, ... Rn, and wherein, for the time of execution, the priority factor function for each kind of resource R1, ... Rn is a function of the rate of change of a cycle time with a change in the number $N_{Ri}$ of the kind of resources Ri at a maximum clock period, wherein $1 \leq i \leq n$ and Ri is a member of the kinds of resources R1, ... Rn.

The priority factor function for the time of execution of the resources R1, ... Rn that is not a clock oscillator may be calculated by $N_{Ri}$, $T_{Ri}$, $T_p^{max}$, wherein $N_{Ri}$ is the number of the kind of resource Ri, $T_{Ri}$ a number of clock cycles required by the kind of resource Ri to finish each operation, $T_p$ is the time period of the clock, $T_p^{max}$ is the maximum clock period; and wherein, for the time of execution, the priority factor function of resource Ri that is a clock oscillator may be calculated by $R_{clk}$, $N_{Ri}$, $T_{Ri}$, $R_{clk}$, $N_{Rclk}$, where $R_{clk}$ is a clock oscillator used to provide necessary clock frequency to the system, $N_{Ri}$ is the number of the kind of resource Ri, $N_{Rclk}$ is the number of clock oscillators, $T_{Ri}$ a number of clock cycles required by the kind of resource Ri to finish each operation.

The priority factor function for the time of execution of the resources R1, ... Rn that is not a clock oscillator may be of the form:

$$PF(R_i) = \frac{\Delta N_{Ri} T_{Ri}}{N_{Ri}} (T_p^{max})$$

and wherein, for the time of execution, the priority factor function of resource Ri that is a clock oscillator may be of the form:

$$PF(R_{clk}) = \frac{N_{R1} \cdot T_{R1} + N_{R2} \cdot T_{R2} \ldots + N_{Rn} \cdot T_{Rn}}{N_{Rclk}} (\Delta T_p)$$

In accordance with some embodiments, the plurality of optimization parameters comprise a power consumption of the resources R1, ... Rn, and wherein, for the power consumption, the priority factor function for each kind of resource R1, ... Rn is a function of a change in power consumption per unit area due to deviation of clock frequency from maximum to minimum and a change in the number $N_{Ri}$ of the kind of resource Ri at maximum clock frequency, wherein $1 \leq i \leq n$, and Ri is a member of the kinds of resources R1, ... Rn.

The priority factor function for the power consumption of the resources R1, ... Rn that is not a clock oscillator may be calculated by $N_{Ri}$, $K_{Rn}$, $\Delta N_{Ri}$, $(p_c)^{max}$, $p_c$ wherein $N_{Ri}$ is the number of resource Ri, $K_{Rn}$ is an area occupied by resource Ri, $\Delta N_{Rn} \cdot K_{Rn}$ is a change of area contributed by resource Ri, $p_c$ is power consumed per area unit resource at a particular frequency of operation, $(p_c)^{max}$ is power consumed per area unit resource at a maximum clock frequency; and wherein, for the power consumption, the priority factor function of resource Ri that is a clock oscillator may be calculated by $N_{Ri}$, $T_{Ri}$, $R_{clk}$, $N_{Rclk}$, $p_c$ where $R_{clk}$ is a clock oscillator used to provide necessary clock frequency to the system, $N_{Ri}$ is the number of the kind of resource Ri, $T_{Rn}$ a number of clock cycles required by resource Ri to finish each operation, $p_c$ is power consumed per area unit of resource at a particular frequency of operation.

The priority factor function for the power consumption of the resources R1, ... Rn that is not a clock oscillator may be of the form:

$$PF(Ri) = \frac{\Delta N_{Ri} \cdot K_{Ri}}{N_{Ri}} (p_c)^{max}$$

and wherein, for the power consumption, the priority factor function of resource Ri that is a clock oscillator may be of the form:

$$PF(Rclk) = \frac{N_{R1} \cdot T_{R1} + N_{R2} \cdot T_{R2} \ldots + N_{Rn} \cdot T_{Rn}}{N_{Rclk}}(\Delta p_c)$$

In accordance with some embodiments, the plurality of optimization parameters comprise a total cost of the total number of all kinds resources R1, . . . Rn, and wherein, for the total cost, the priority factor function for each kind of resource R1, . . . Rn is an indicator of change in total cost of the total number of all kinds resources R1, . . . Rn with respect to a change in the number of the kind of resource Ri and the cost per unit resource, wherein 1≦i≦n.

The priority factor function for each kind of the resources R1, . . . Rn that is not a clock oscillator may be calculated by $N_{Ri}$, $K_{Ri}$, $\Delta N_{Ri}$, $C_{Ri}$, wherein $N_{Ri}$ is the number of the kind of resource Ri, $K_{Ri}$ is an area occupied by the kind of resource Ri, $\Delta N_{Ri} \cdot K_{Ri}$ is a change of area contributed by the kind of resource Ri, $C_{Ri}$ is the cost per area unit of the kind of resource Ri; and wherein, for the cost, the priority factor function of resource Ri that is a clock oscillator may be calculated by $R_{clk}$, $N_{Rclk}$, $\Delta A(R_{clk})$, $C_{Rclk}$, wherein $R_{clk}$ is a clock oscillator used to provide necessary clock frequency to the system, $\Delta A(R_{clk})$ is a change of area occupied by clock oscillators, $N_{Rclk}$ is a total number of clock oscillators available to construct the system architecture, $C_{Rclk}$ is the cost per area unit of clock oscillators.

For the cost, the priority factor function for each kind of the resources R1, . . . Rn that is not a clock oscillator may be of the form:

$$PF(Ri) = \frac{\Delta N_{Ri} \cdot K_{Ri} \cdot C_{Ri}}{N_{Ri}}$$

and wherein, for the cost, the priority factor function of resource Ri that is a clock oscillator may be of the form:

$$PF(R_{clk}) = \frac{A(R_{clk}) \cdot C_{Rclk}}{N_{Rclk}}$$

In accordance with some embodiments, the method may further comprise, for each optimization parameter:
determining a border variant from the ordered list of vectors, wherein the border variant is the extreme vector of the ordered list of vectors to satisfy the constraint value for the optimization parameter such that all vectors to one side of the border variant in the ordered list of vectors satisfy the constraint value for the optimization parameter and all vectors to the other side of the border variant in the ordered list of vectors do not satisfy the constraint value for the optimization parameter;
and wherein determining the satisfying set of vectors from the ordered list of vectors further comprises using the border variant.

In accordance with some embodiments, the method may further comprise, for each of the plurality of optimization parameters, determining whether the constraint value for the optimization parameter is valid by:
determining a minimum value for the optimization parameter;
determining a maximum value for the optimization parameter;
determining whether the constraint value is greater than or equal to the minimum value for the optimization parameter and whether the constraint value is less than or equal to the maximum value for the optimization parameter;
if the constraint value is greater than or equal to the minimum value for the optimization parameter and the constraint value is less than equal than or equal to the maximum value for the optimization parameter, determining that the constraint value is valid; and
otherwise, determining that the constraint value is invalid and prompting for correction.

In accordance with some embodiments, the method may further comprise determining whether the set of vectors is valid by determining whether the set of vectors is null; and upon determining that the set of vectors is not valid, relaxing the constraint values for each optimization parameter by predetermined percentage.

In accordance with some embodiments, the method may further comprise representing the combination of the number of resources R1, . . . Rn of the selected vector in a temporal and a spatial domain using a sequencing and binding graph and a plurality of registers.

In accordance with some embodiments, the method may further comprise determining a multiplexing scheme for the resources R1, . . . Rn of the selected vector, with inputs, outputs, operations, interconnections and time steps.

In accordance with some embodiments, the method may further comprise producing a Register Transfer Level data path circuit using the multiplexing scheme.

In accordance with some embodiments, the method may further comprise producing an integrated circuit using the system architecture.

In accordance with some embodiments, the set of vectors based on the intersection of the satisfying sets of vectors is a pareto set of vectors.

In another aspect, embodiments described herein provide a non-transitory computer-readable storage medium comprising instructions for execution on a computing device, wherein the instructions, when executed, perform acts of a method of developing a system architecture, wherein the method comprises:
defining a plurality of resources constraints $maxN_{R1}$, . . . $maxN_{Rn}$, wherein each resource constraint corresponds to a maximum number $N_{Ri}$, 1≦i≦n, of a each kind of resources R1, . . . Rn available to construct the system architecture,
wherein n is an integer greater than 1;
defining a constraint value for each of at least three optimization parameters for the system architecture, wherein the at least three optimization parameters comprise a final optimization parameter;
defining a design space as a plurality of vectors representing different combinations of a number of each kind of resource R1, . . . Rn available to construct the system architecture, wherein each vector $V_n$ of the design space is of the form:

$V_n = (N_{R1}, \ldots N_{Rn})$ wherein, $N_{R1}$ represents the number of the kind of resource R1, $N_{Rn}$ represents the number of the kind of resource Rn; and wherein based on resource constraints, $1 \leq N_{R1} \leq maxN_{R1}$, . . . $1 \leq N_{Rn} \leq maxN_{Rn}$, wherein $maxN_{R1}$ is a maximum number of the kind of resource R1, . . . $maxN_{Rn}$ is a maximum number of the kind resource Rn;
for each of the plurality of optimization parameters, defining a priority factor function for each kind of resource R1, ... Rn, wherein a priority factor function defines a rate of change of the optimization parameter with respect to a change in a number $N_{Ri}$ of the corresponding kind of resource Ri, $1 \leq i \leq n$;

determining a plurality of satisfying sets of vectors by, for each of the optimization parameters except for the final optimization parameter:

for each kind of resource R1, ... Rn available to construct the system architecture, calculating a priority factor using the corresponding priority factor function for the optimization parameter;

determining a priority order by sorting the calculated priority factors based on a relative magnitude of the calculated priority factors;

generating an ordered list of vectors by sorting the plurality of vectors of the design space based on the priority order; and determining a satisfying set of vectors from the ordered list of vectors, wherein each vector of the satisfying set substantially satisfies the constraint value for the optimization parameter;

determining a set of vectors based on an intersection of the plurality of satisfying sets of vectors for the optimization parameters;

for the final optimization parameter:

for each kind of resource R1, ... Rn available to construct the system architecture, calculating a priority factor using the corresponding priority factor function for the final optimization parameter;

determining a priority order by sorting the calculated priority factors based on a relative magnitude of calculated priority factors;

generating an ordered list of vectors by sorting the pareto set of vectors based on the priority order;

selecting a vector from the set of vectors based on the ordered list of vectors; and developing the system architecture using the selected vector.

In a further aspect, embodiments described herein provide a system of developing a system architecture comprising:

a resource constraint module for defining a plurality of resources constraints $maxN_{R1}, \ldots maxN_n$, wherein each resource constraint corresponds to a maximum number $N_{Ri}$, $1 \leq i - n$, of a each kind of resources R1, ... Rn available to construct the system architecture, wherein n is an integer greater than 1;

an optimization parameter constraint module for defining a constraint value for each of at least three optimization parameters for the system architecture, wherein the at least three optimization parameters comprise a final optimization parameter;

a design space module for defining a design space as a plurality of vectors representing different combinations of a number of each kind of resource R1, ... Rn available to construct the system architecture, wherein each vector $V_n$ of the design space is of the form:

$$V_n = (N_{R1}, \ldots N_{Rn})$$

wherein, $N_{R1}$ represents the number of the kind of resource R1, $N_{Rn}$ represents the number of the kind of resource Rn; and wherein based on resource constraints, $1 \leq N_{R1} \leq maxN_{R1}, \ldots 1 \leq N_{Rn} \leq maxN_{Rn}$, wherein $maxN_{R1}$ is a maximum number of the kind of resource R1, ... $maxN_{Rn}$ is a maximum number of the kind resource Rn;

a priority factor module for each of the plurality of optimization parameters, defining a priority factor function for each kind of resource R1, ... Rn, wherein a priority factor function defines a rate of change of the optimization parameter with respect to a change in a number $N_{Ri}$ of the corresponding kind of resource Ri, $1 \leq i \leq n$;

a satisfying set module for determining a plurality of satisfying sets of vectors by, for each of the optimization parameters except for the final optimization parameter:

for each kind of resource R1, ... Rn available to construct the system architecture, calculating a priority factor using the corresponding priority factor function for the optimization parameter;

determining a priority order by sorting the calculated priority factors based on a relative magnitude of the calculated priority factors;

generating an ordered list of vectors by sorting the plurality of vectors of the design space based on the priority order; and determining a satisfying set of vectors from the ordered list of vectors, wherein each vector of the satisfying set substantially satisfies the constraint value for the optimization parameter;

an intersection module for determining a set of vectors based on an intersection of the plurality of satisfying sets of vectors for the optimization parameters;

a selection module for selecting a vector for use in developing the system architecture by, for the final optimization parameter:

for each kind of resource R1, ... Rn available to construct the system architecture, calculating a priority factor using the corresponding priority factor function for the final optimization parameter;

determining a priority order by sorting the calculated priority factors based on a relative magnitude of calculated priority factors;

generating an ordered list of vectors by sorting the set of vectors based on the priority order;

selecting a vector from the set of vectors based on the ordered list of vectors; and a system architecture module for developing the system architecture using the selected vector.

In another aspect, embodiments described herein provide a method of determining a vector representing a combination of a number of each kind of resource R1, ... Rn available for constructing a system architecture comprising:

defining a plurality of resources constraints $maxN_{R1}, \ldots maxN_{Rn}$, wherein each resource constraint corresponds to a maximum number $N_{Ri}$, $1 \leq i \leq n$, of a each kind of resources R1, ... Rn available to construct the system architecture, wherein n is an integer greater than 1;

defining a constraint value for each of at least three optimization parameters for the system architecture, wherein the at least three optimization parameters comprise a final optimization parameter;

defining a design space as a plurality of vectors representing different combinations of a number of each kind of resource R1, ... Rn available to construct the system architecture, wherein each vector $V_n$ of the design space is of the form:

$$V_n = (N_{R1}, \ldots N_{Rn})$$

wherein, $N_{R1}$ represents the number of the kind of resource R1, $N_{Rn}$ represents the number of the kind of resource Rn; and wherein based on resource constraints, $1 \leq N_{R1} \leq maxN_{R1}, \ldots 1 \leq N_{Rn} \leq maxN_{Rn}$, wherein $maxN_{R1}$ is a maximum number of the kind of resource R1, ... $maxN_{Rn}$ is a maximum number of the kind resource Rn;

for each of the plurality of optimization parameters, defining a priority factor function for each kind of resource R1, ... Rn, wherein a priority factor function defines a rate of change of the optimization parameter with respect to a change in a number $N_{Ri}$ of the corresponding kind of resource Ri, $1 \leq i \leq n$; determining a plurality of satisfying sets of vectors by, for each of the optimization parameters except for the final optimization parameter:

for each kind of resource R1, ... Rn available to construct the system architecture, calculating a priority factor using the corresponding priority factor function for the optimization parameter;

determining a priority order by sorting the calculated priority factors based on a relative magnitude of the calculated priority factors;

generating an ordered list of vectors by sorting the plurality of vectors of the design space based on the priority order; and determining a satisfying set of vectors from the ordered list of vectors, wherein each vector of the satisfying set substantially satisfies the constraint value for the optimization parameter;

determining a set of vectors based on an intersection of the plurality of satisfying sets of vectors for the optimization parameters;

selecting a vector for use in constructing the system architecture by, for the final optimization parameter:

for each kind of resource R1, ... Rn available to construct the system architecture, calculating a priority factor using the corresponding priority factor function for the final optimization parameter;

determining a priority order by sorting the calculated priority factors based on a relative magnitude of calculated priority factors;

generating an ordered list of vectors by sorting the set of vectors based on the priority order;

selecting a vector from the set of vectors based on the ordered list of vectors

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
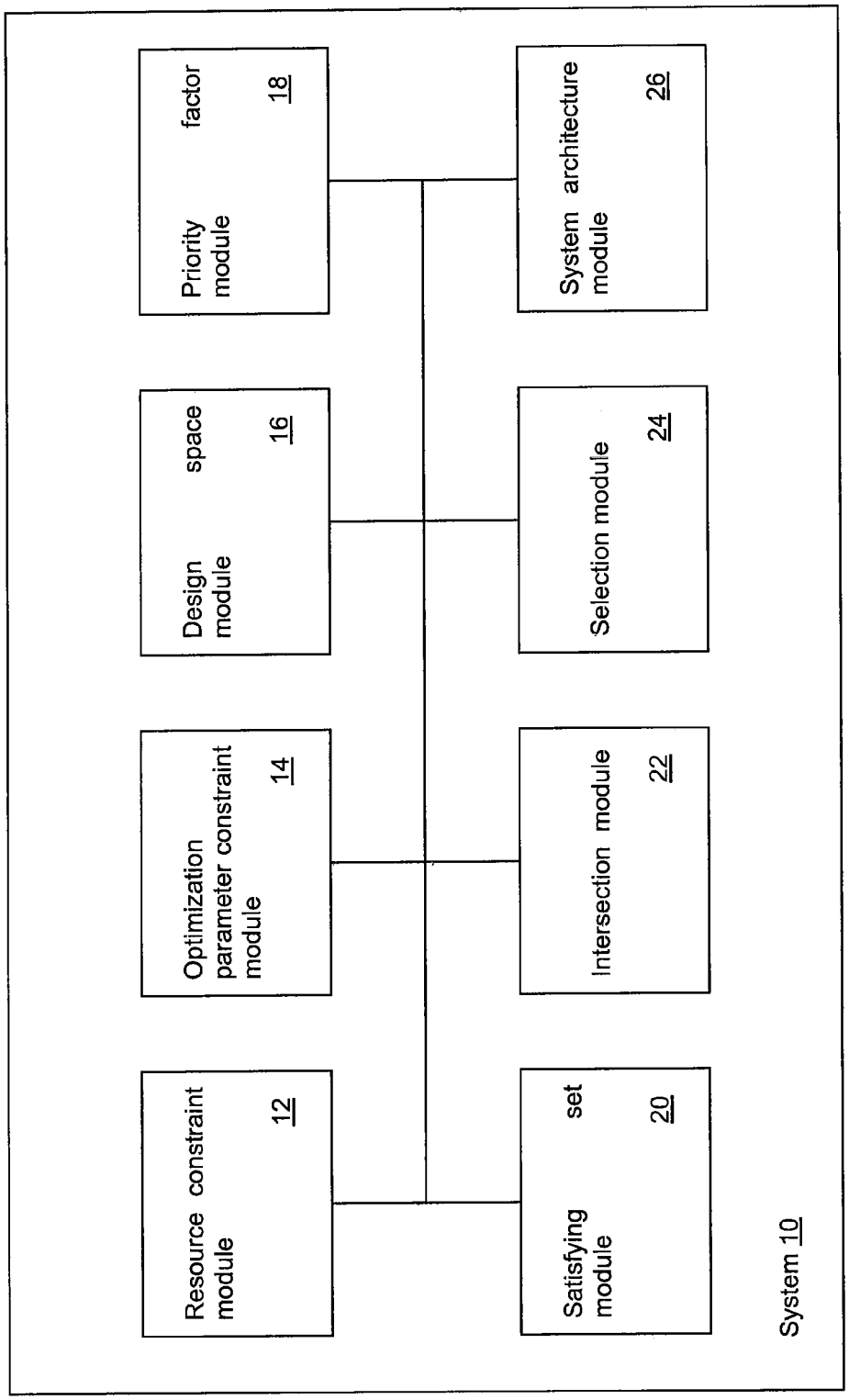
FIG. 1 illustrates a block diagram of a system for developing a system architecture in accordance with embodiments described herein.

The drawings, described below, are provided for purposes of illustration, and not of limitation, of the aspects and features of various examples of embodiments of the invention described herein. The drawings are not intended to limit the scope of the applicants' teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. However, these embodiments may be implemented in computer programs executing on programmable computers, each computer including at least one processor, a data storage system (including volatile and non-volatile memory and/or storage elements), and at least one communication interface. For example, the programmable computers may be a server, network appliance, set-top box, embedded device, computer expansion module, personal computer, laptop, personal data assistant, or mobile device. Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may provide Design Space Exploration (DSE) and a formalized High Level Synthesis (HLS) design flow with multi parametric optimization objective using the described DSE approach. The proposed approach may resolve issues related to DSE such as the precision of evaluation, time exhausted during evaluation and also automation of the exploration process. During DSE a conflicting situation may exist to concurrently maximize the accuracy of the exploration process and minimize the time spent during DSE analysis. Embodiments described herein may be capable of reducing the number of architectural variants to be analyzed for accurate selection of a design point. Embodiments described herein may involve determining the Priority Factor (PF) of the resources for final organization of the design space in increasing or decreasing order and may not require graphs or hierarchical tree arrangements to analyze the candidate variants. Embodiments described herein may be capable of simultaneously optimizing many performance parameters, such as for example time of execution, power consumption, hardware area and cost.

Embodiments described herein may provide an approach for finding design architecture with multi-parametric optimization objectives, which may be useful for accelerating design space exploration in HLS. Embodiments described herein may provide design steps of a multi-parametric optimized high level design flow useful for the generation of high data processing applications and complex SoC and VLSI design. Embodiments described herein may reduce the number of architectural variants to be analyzed for finding a candidate combination of a number of kinds of resources, and in accordance with some embodiments may be the pareto-optimized design point. Multi-parameter optimization and design space exploration in HLS design flow may allow automation of the proposed high level design for HLS tools. The architecture variant obtained by methods in accordance with embodiments described here may be used to implement integrated circuits such as SoC designs, field-programmable gate arrays (FPGA), Application Specific Integrated Circuits (ASICs), and so on.

Background on High Level Synthesis and Design Space Exploration

Interdependent tasks such as scheduling, allocation and module selection are important ingredients of the HLS design process. HLS is a methodology of transforming an algorithmic behavioral description into a Register Transfer Level (RTL) structure. The algorithmic description specifies the inputs and outputs of the behavior of the algorithm in terms of operations to be performed and data flow. A description of the algorithm may be represented in the form of an acyclic directed graph known as a sequencing graph. These graphs specify the input/output relation of the algorithm and the data dependency present in the data flow. The graph is defined in terms of its vertices and edges, where the vertices signify the operations and the edges indicate the data dependency present in the function. High level synthesis is therefore a conversion from the behavioral description to its respective hardware description in the form of memory elements, storage units, multiplexers/demultiplexers and the necessary interconnections. The RT level representation includes a control unit and the data path unit.

For the present generation of VLSI technology with multi objective nature, the cost of solving the scheduling, allocation, and module selection by exhaustive search may be prohibitive. Multi-objective VLSI designs are used in low end ASICs with low power dissipation and acceptable performance as well as in high end ASICs with high performance requirements and satisfactory power expenditure. Hence, there is a desire for efficient design space exploration techniques to make efficient use of time due to time to market pressure, for example. Design space exploration is a procedure for analyzing the various design architectures in the design space to obtain an optimum, near optimum, or other candidate architecture for the behavioral description according to the predefined specifications. Design space exploration may be a challenge for researchers due to the heterogeneity of the objectives and parameters involved. An example of design space exploration is a multi-objective search problem where the optimization parameters may be hardware area, execution time, power consumption, cost, and so on. A trend in design space exploration is the reduction of the design space into a set of pareto optimal points by pareto optimal analysis. Sometimes even the pareto optimal set can be very large for analysis and selection of the design for system implementation. In order to assist in exploring the design space better, an accurate approach that is efficient in terms of time is desirable for high level synthesis design of embedded systems.

The Proposed Design Space Exploration Framework

Embodiments described herein explore candidate micro-architectures from the architecture design space. Embodiments described herein may also serve as a backbone for high level synthesis design flow. In general, exploring design space can be a tedious and time consuming task for the designer. It demands great accuracy and elaborate analysis to determine the optimum design configuration. The exploration of the best design variant in a large design space within a short time and with less complexity is desirable. The amount of influence a resource can have on each parameter to be optimized during its change can be determined and the described theory used to explain a real example through high level synthesis.

Analysis for Hardware Area of the Resources

Let the area of the resources be given as 'A'. $R_i$ denotes the resources available for system designing; where 1<i<n.

$R_{clk}$ refers to the clock oscillator used as a resource providing the necessary clock frequency to the system. The total area can be represented as the sum of all the resources used for designing the system. Hence total area is given in equation (1):

$$A = \Sigma A(Ri) \qquad (1)$$

Area can be expressed as the sum of the resources i.e. adder/subtractor, multiplier, divider etc and also the clock frequency oscillator. Therefore for a system with 'n' functional resources equation (1) can also be represented as shown in equation (2):

$$A = (N_{R1} \cdot K_{R1} + N_{R2} \cdot K_{R2} + \ldots + N_{Rn} \cdot K_{Rn}) + A(R_{clk}) \qquad (2)$$

Where $N_{Ri}$ represents the number of resource $R_i$ and '$K_{Ri}$' represents the area occupied per unit resource 'Ri' (1<=i<=n); Applying partial derivatives to equation (2) with respect to $N_{R1}, N_{R2} \ldots N_{Rn}$ yields equation (3), equation (4) and equation (5) respectively as shown below:

$$\frac{\partial A}{\partial N_{R1}} = \frac{\partial \left( \sum (N_{R1} \cdot K_{R1} + \ldots + N_{Rn} \cdot K_{Rn}) + A(R_{clk}) \right)}{\partial N_{R1}} = K_{R1} \qquad (3)$$

$$\frac{\partial A}{\partial N_{R2}} = \frac{\partial \left( \sum (N_{R2} \cdot K_{R2} + \ldots N_{Rn} \cdot K_{Rn}) + A(R_{clk}) \right)}{\partial N_{R2}} = K_{R2} \qquad (4)$$

$$\frac{\partial A}{\partial N_{Rn}} = K_{Rn} \qquad (5)$$

According to the theory of approximation by differentials the change in the total area can be approximated by equation (6):

$$dA = \frac{\partial A}{\partial N_{R1}} \cdot \Delta N_{R1} + \frac{\partial A}{\partial N_{R2}} \cdot \Delta N_{R2} + \ldots + \frac{\partial A}{\partial N_{Rn}} \Delta N_{Rn} + \Delta A(R_{clk}) \qquad (6)$$

where symbol '$\Delta$' is called the delta operator.

Substituting equation (3), (4) and (5) into equation (6) yields equation (7) shown below:

$$dA = \Delta N_{R1} \cdot K_{R1} + \Delta N_{R2} \cdot K_{R2} + \ldots + \Delta N_{Rn} \cdot K_{Rn} + \Delta A(R_{clk}) \qquad (7)$$

$$dA = \underbrace{(\Delta N_{R1} \cdot K_{R1})}_{\substack{\text{The change} \\ \text{of area} \\ \text{contributed} \\ \text{by resource} \\ \text{R1}}} + \underbrace{(\Delta N_{R2} \cdot K_{R2})}_{\substack{\text{The change} \\ \text{of area} \\ \text{contributed} \\ \text{by resource} \\ \text{R2}}} + \ldots + \underbrace{\Delta N_{Rn} \cdot K_{Rn}}_{\substack{\text{The change} \\ \text{of area} \\ \text{contributed} \\ \text{by resource} \\ \text{Rn}}} + \underbrace{\Delta A(R_{clk})}_{\substack{\text{The change} \\ \text{of area} \\ \text{contributed} \\ \text{by resource} \\ \text{clock}}}$$

The equation above indicates the rate of change of area with respect to resource R1, R2 . . . $R_n$. Here the clock oscillator has been considered a resource which contributes to the area occupied by the hardware resources.

The term Priority Factor (PF) will be used herein when exploring the design space in the proposed approach. The PF is a determining factor which helps judge the influence of a particular resource on the variation of the optimization parameters such as area, time of execution, power consumption, and so on. This PF will be used later to organize the architecture design space consisting of variants in increasing or decreasing order of magnitude. An example priority factor for area of the resource $R_1, R_2 \ldots R_n$ may be given as:

$$PF(R1) = \frac{\Delta N_{R1} \cdot K_{R1}}{N_{R1}} \qquad (9)$$

$$PF(R2) = \frac{\Delta N_{R2} \cdot K_{R2}}{N_{R2}} \qquad (10)$$

$$PF(Rn) = \frac{\Delta N_{Rn} \cdot K_{Rn}}{N_{Rn}} \qquad (11)$$

$$PF(Rclk) = \frac{\Delta A(Rclk)}{N_{Rclk}} \qquad (12)$$

The factor defined above determines how the variation in area is affected by the change of number of that certain resource. Hence, the PF is the rate of change of area with respect to the change in number of resources.

Analysis for Time of Execution

For a system with 'n' functional resources the time of execution can be represented by the following formula:

$$T_{exe} = [L + (N-1) \cdot T_c] \qquad (13)$$

where 'L' represents latency of execution, '$T_c$' represents the cycle time of execution, 'N' denotes the number of data elements to be processed.

Since the number of data elements to be processed is large for real life applications, 'L' can be ignored and cycle time ($T_c$) becomes a primary factor. The maximum cycle time with one operation in each time slot can be represented by equation (14):

$$T = (N_{R1} \cdot T_{R1} + N_{R2} \cdot T_{R2} + \ldots + N_{Rn} \cdot T_{Rn}) \cdot T_p \qquad (14)$$

$N_{Ri}$ represents the number of resource of Ri and '$T_{Ri}$' represents the number of clock cycles needed by resource 'Ri' (1<=i<=n) to finish each operation and '$T_p$' is the time period of the clock. From the theory of approximation of differentials the change in the total cycle time can be approximated as in equation (15).

$$dT_c = \left(\frac{\partial T_c}{\partial N_{R1}} \cdot \Delta N_{R1} + \frac{\partial T_c}{\partial N_{R2}} \cdot \Delta N_{R2} + \ldots + \frac{\partial T_c}{\partial N_{Rn}} \Delta N_{Rn}\right) + \Delta T_p \cdot \frac{\partial T_c}{\partial T_p} \quad (15)$$

Applying partial derivatives to equation (14) with respect to $N_{R1}, N_{R2} \ldots N_{Rn}$ and $T_p$ will produce the following set of equations:

$$\frac{\partial T_c}{\partial N_{R1}} = \frac{\partial (N_{R1} \cdot T_{R1} + N_{R2} \cdot T_{R2} + \ldots + N_{Rn} \cdot T_{Rn}) \cdot T_p}{\partial N_{R1}} = T_{R1} T_p \quad (16)$$

$$\frac{\partial T_c}{\partial N_{R2}} = \frac{\partial (N_{R1} \cdot T_{R1} + N_{R2} \cdot T_{R2} + \ldots + N_{Rn} \cdot T_{Rn}) \cdot T_p}{\partial N_{R2}} = T_{R2} T_p \quad (17)$$

$$\frac{\partial T_c}{\partial N_{Rn}} = \frac{\partial (N_{R1} \cdot T_{R1} + N_{R2} \cdot T_{R2} + \ldots + N_{Rn} \cdot T_{Rn}) \cdot T_p}{\partial N_{Rn}} = T_{Rn} T_p \quad (18)$$

$$\frac{\partial T_c}{\partial T_p} = \frac{\partial (N_{R1} \cdot T_{R1} + N_{R2} + \ldots + N_{Rn} \cdot T_{Rn}) \cdot T_p}{\partial T_p} \quad (19)$$

$$= N_{R1} \cdot T_{R1} + N_{R2} \cdot T_{R2} + \ldots + N_{Rn} \cdot T_{Rn} \quad (20)$$

Now substituting equations (16), (17), (18) and (20) in equation (15). The substitution yields the following equation (21) below:

$$dT_c = \Delta N_{R1} \cdot T_{R1} \cdot T_p + \Delta N_{R2} \cdot T_{R2} \cdot T_p + \ldots + \Delta N_{Rn} \cdot T_{Rn} T_p + \Delta T_p(T_{R1} \cdot N_{R1} + T_{R2} \cdot N_{R2} + \ldots + T_{Rn} \cdot N_{Rn}) \quad (21)$$

Equation (21) represents the change in total cycle time with the change in the number of resources and the clock period (clock frequency).

$\Delta N_{R1} \cdot T_{R1} \cdot T_p$=The change of '$T_c$' caused by the change in the number of resource $R1$;Similarly, $\Delta N_{Rn} \cdot T_{Rn} \cdot T_p$=The change of '$T_c$' caused by the change in the number of resource $Rn$.

Finally, $\Delta T_p \cdot (T_{R1} \cdot N_{R1} + T_{R2} \cdot N_{R2} + \ldots + T_{Rn} \cdot N_{Rn})$=The change of '$T_c$' caused by the change in clock period (clock frequency) and the change in the number of all resources available.

The priority factor (PF) can be defined for the 'time of execution' parameter. An example PF time of execution for the resource $R_1, R_2 \ldots R_n$ is given as:

$$PF(R1) = \frac{\Delta N_{R1} \cdot T_{R1}}{N_{R1}} \cdot (T_p)^{max} \quad (22)$$

$$PF(R2) = \frac{\Delta N_{R2} \cdot T_{R2}}{N_{R2}} \cdot (T_p)^{max} \quad (23)$$

$$PF(Rn) = \frac{\Delta N_{Rn} \cdot T_{Rn}}{N_{Rn}} \cdot (T_p)^{max} \quad (24)$$

$$PF(Rclk) = \frac{N_{R1} \cdot T_{R1} + N_{R2} \cdot T_{R2} + \ldots + N_{Rn} \cdot T_{Rn}}{N_{Rclk}} \cdot (\Delta T_p) \quad (25)$$

The factors defined above indicate the rate of change of cycle time ($T_a$) with the change in number of resources at minimum clock frequency. For example, equation (22) indicates the rate of change of cycle time with a change in the number of that particular resource (e.g. change in number of adders/subtractors from one to three adders/subtractors) at minimum clock frequency.

Minimum clock frequency is considered because the clock period is the maximum at this frequency. Hence, the change in the number of a specific resource at maximum clock period will influence the change in the cycle time the most, compared to the change in cycle time at other clock periods. The PF will yield a real number, which will suggest the extent to which the change in number of that particular resource contributes to the change in cycle time.

Analysis for Power Consumption

Therefore for a system with 'n' functional resources the total power consumption (P) of the resources in a system can be represented by the following equation (26):

$$P = \sum_{i=1}^{n} (N_{Ri} \cdot K_{Ri}) \cdot p_c \quad (26)$$

$$P = (N_{R1} \cdot K_{R1} + N_{R2} \cdot K_{R2} + \ldots + N_{Rn} \cdot K_{Rn}) \cdot p_c \quad (27)$$

'$N_{Ri}$' represents the number of resource of resource Ri as mentioned before. '$K_{Ri}$' represents the area occupied per unit resource Ri and '$p_c$' denotes the power consumed per area unit resource at a particular frequency of operation.

Using the theory of approximation of differentials the change in power consumption can be formulated as shown in equation (28):

$$dP = \left(\frac{\partial P}{\partial N_{R1}} \cdot \Delta N_{R1} + \frac{\partial P}{\partial N_{R2}} \cdot \Delta N_{R2} + \ldots + \frac{\partial P}{\partial N_{Rn}} \Delta N_{Rn}\right) + \Delta p_c \cdot \frac{\partial P}{\partial P_c} \quad (28)$$

Applying partial derivative to equation (27) will produce the following equations:

$$\frac{\partial P}{\partial N_{R1}} = \frac{\partial [(N_{R1} \cdot K_{R1} + N_{R2} \cdot K_{R2} + \ldots + N_{Rn} \cdot K_{Rn}) \cdot p_c]}{\partial N_{R1}} = K_{R1} \cdot p_c \quad (29)$$

$$\frac{\partial P}{\partial N_{R2}} = \frac{\partial [(N_{R1} \cdot K_{R1} + N_{R2} \cdot K_{R2} + \ldots + N_{Rn} \cdot K_{Rn}) \cdot p_c]}{\partial N_{R2}} = K_{R2} \cdot p_c \quad (30)$$

$$\frac{\partial P}{\partial N_{Rn}} = \frac{\partial [(N_{R1} \cdot K_{R1} + N_{R2} \cdot K_{R2} + \ldots + N_{Rn} \cdot K_{Rn}) \cdot p_c]}{\partial N_{Rn}} = K_{Rn} \cdot p_c \quad (31)$$

$$\frac{\partial P}{\partial p_c} = \frac{\partial [(N_{R1} \cdot K_{R1} + N_{R2} \cdot K_{R2} + \ldots + N_{Rn} \cdot K_{Rn}) \cdot p_c]}{\partial p_c} \quad (32)$$

$$= N_{R1} \cdot K_{R1} + N_{R2} \cdot K_{R2} + \ldots + N_{Rn} \cdot K_{Rn} \quad (33)$$

Substituting equations (29), (30), (31) and (33) in equation (28). yields equation (34) below:

$$dP = (\Delta N_{R1} \cdot K_{R1} \cdot p_c + \Delta N_{R2} \cdot K_{R2} \cdot p_c + \ldots + \Delta N_{Rn} \cdot K_{Rn} \cdot p_c) + \Delta p_c \cdot (K_{R1} \cdot N_{R1} + K_{R2} \cdot N_{R2} + \ldots + K_{Rn} \cdot N_{Rn}) \quad (34)$$

Equation (34) represents the change in total power consumption with the change in the number of all resources and the clock period (clock frequency).

$\Delta N_{R1} \cdot K_{R1} \cdot p_c$=The change of 'P' contributed by the change in the number of resource $R1$;

Similarly, $\Delta N_{Rn} \cdot K_{Rn} \cdot p_c$=The change of P contributed by the change in the number of resource Rn;

Finally, $\Delta p_c \cdot (K_{R1} \cdot N_{R1} + K_{R2} \cdot N_{R2} + \ldots + K_{Rn} \cdot N_{Rn})$=The change of 'P' contributed by the change in clock period (clock frequency) and the change in the number of all resources available.

$$PF(R1) = \frac{\Delta N_{R1} \cdot K_{R1}}{N_{R1}} \cdot (p_c)^{max} \quad (35)$$

$$PF(R2) = \frac{\Delta N_{R2} \cdot K_{R2}}{N_{R2}} \cdot (p_c)^{max} \quad (36)$$

$$PF(Rn) = \frac{\Delta N_{Rn} \cdot K_{Rn}}{N_{Rn}} \cdot (p_c)^{max} \quad (37)$$

$$PF(Rclk) = \frac{N_{R1} \cdot T_{R1} + N_{R2} \cdot T_{R2} + \ldots + R_{Rn} \cdot T_{Rn}}{N_{Rclk}} \cdot (\Delta p_c) \quad (38)$$

The example PF defined from equations (35) to (37) indicate the rate of change in the total power consumption with the change in number of resources at maximum clock frequency. For example, equation (35) indicates the rate of change of total power consumption of system with the change in the number of that particular resource (e.g. change in number of adders from one to three) at maximum clock frequency. The PF will help arrange the architectural variants of the design space in increasing or decreasing order of magnitude depending on the parameter of optimization. This would further facilitate the selection of the optimal design point that satisfies, or nearly satisfies, all operating constraints and optimization requirements specified. Examples of nearly satisfying the constraints would be within a 5-10% threshold or other reasonable, acceptable amount. If the vectors of the satisfying set obey constraint values or exceed constraint value by a predetermined acceptable percentage or amount, then the vectors are said to satisfy or nearly satisfy the constraint respectively.

In the above equations, the maximum clock frequency was considered because the total power consumption is at the maximum at this frequency. Hence, the change in the number of a specific resource at maximum clock frequency will influence the change in the total power consumption (P) the most, compared to the change at other clock frequencies. The PF will yield a real number, which will suggest the extent to which the change in number of that particular resource contributes to the change in total power consumption for the system.

The PF is arranged in such a way that the resource with the minimum PF is chosen first, gradually increasing and then ending at the resource with the highest priority factor. The above rule may apply for all optimization parameters.

Analysis for Hardware Cost of Resources (Including Cost of Intermediate Memory as Storage Register During Scheduling)

Another example optimization parameter is the hardware cost of resources. Let the area of the resources be given as 'A'. $R_i$ denotes the resources available for system designing; where $1 < i < n$. 'n' represents the maximum resource available for designing. 'Rclk' refers to the clock oscillator used as a resource providing the necessary clock frequency to the system. The total area can be represented as the sum of all the resources used for designing the system, such as adder, multiplier, divider, clock frequency oscillator and the memory elements. Hence total area can be given as shown in equation (1c).

$$A = \Sigma A(Ri) \quad (1c)$$

$$A = (N_{R1} \cdot K_{R1} + N_{R2} \cdot K_{R2} + \ldots + N_{Rn} \cdot K_{Rn}) + A(R_{clk}) + N_{RM} \cdot K_{RM} \quad (2c)$$

Where 'NRi' represents the number of resource 'Ri', '$K_{Ri}$' represents the area occupied per unit resource 'Ri', '$N_{RM}$' represents the number of memory elements present (such as registers) and '$K_{RM}$' represents the area occupied by each memory element. Let the total cost of all resources in the system is '$C_R$'. Further, cost per area unit of the resource (such as adders, multipliers etc) is given as '$C_{Ri}$', the cost per area unit of the clock oscillator is '$C_{Rclk}$' and finally the cost per area unit of memory element is '$C_{RM}$'. Therefore total cost of the resources is given as:

$$C_R = (N_{R1} \cdot K_{R1} + N_{R2} \cdot K_{R2} + \ldots + N_{Rn} \cdot K_{Rn}) \cdot C_{Ri} A(R_{clk}) \\ C_{Rclk} + N_{RM} \cdot K_{RM} \cdot C_{RM} \quad (3c)$$

Applying partial derivative to equation (3c) with respect to $N_{R1} \ldots N_{Rn}$, with respect to $N_{RM}$ and with respect to $A_{Rclk}$ yields equation (4c) to (7c) respectively as shown below:

$$\frac{\partial C_R}{\partial N_{R1}} = \frac{\partial [(N_{R1} \cdot K_{R1} \cdot C_{R1} + \ldots + N_{Rn} \cdot K_{Rn} \cdot C_{Rn}) + A(R_{clk}) \cdot C_{Rclk} + N_{RM} \cdot K_{RM} \cdot C_{RM}]}{N_{R1}} = K_{R1} \cdot C_{R1} \quad (4c)$$

$$\frac{\partial C_R}{\partial N_{Rn}} = \frac{\partial [(N_{R1} \cdot K_{R1} \cdot C_{R1} + \ldots + N_{Rn} \cdot K_{Rn} \cdot C_{Rn}) + A(R_{clk}) \cdot C_{Rclk} + N_{RM} \cdot K_{RM} \cdot C_{RM}]}{N_{Rn}} = K_{Rn} \cdot C_{Rn} \quad (5c)$$

$$\frac{\partial C_R}{\partial A_{Rclk}} = C_{Rclk} \quad (6c)$$

$$\frac{\partial C_R}{\partial A_{RM}} = K_{RM} \cdot C_{RM} \quad (7c)$$

Now using the theory of approximation by differentials, the change in the total area can be approximated by the following equation:

$$dC_R = \frac{\partial C_R}{\partial N_{R1}} \cdot \Delta N_{R1} + \frac{\partial C_R}{\partial N_{Rn}} \cdot \Delta N_{Rn} + \frac{\partial C_R}{\partial N_{RM}} \cdot \Delta N_{RM} + \frac{\partial C_R}{\partial A_{Rclk}} \cdot \Delta A_{Rclk} \quad (8c)$$

Substituting equations (4c) to (7c) into equation (8c) yields equation (9c) shown below.

Equation (9c) represents the change in total cost of resources with the change in the number of all resources and the clock period (clock frequency). The Priority Factor (PF) for cost of resources is defined as:

$$PF(R1) = \frac{\Delta N_{R1} \cdot K_{R1} \cdot C_{Ri}}{N_{R1}} \quad (10c)$$

$$PF(Rn) = \frac{\Delta N_{Rn} \cdot K_{Rn} \cdot C_{Ri}}{N_{Rn}} \quad (11c)$$

$$PF(RM) = \frac{\Delta N_{RM} \cdot K_{RM} \cdot C_{RM}}{N_{RM}} \quad (12c)$$

$$PF(Rclk) = \frac{\Delta A(Rclk) \cdot C_{Rclk}}{N_{Rclk}} \quad (13c)$$

Priority Factor (PF) yields a real number, which suggests the extent to which the change in number of a particular resource contributes to the change in hardware cost. The PF is a determining factor which helps us to judge the influence of a particular resource on the variation of the optimization parameters like area, time of execution and power consumption. The equation (10c) and (11c) indicates the change of cost with respect to change in resource R1, . . . Rn. Similarly, equation (12c) indicates the change of cost of the system with respect to change in number of resource 'RM'. Further equation (13c) indicates the change of cost of the system with respect to change in resource 'Rclk'.

Design Flow

Embodiments described herein use the priority factor to organize the design space in increasing or decreasing order. Embodiments described herein may be directed to a design flow starting with the real specification and formulation, and eventually obtaining the register transfer level structure performing design space exploration. As an illustrative example, three parameters will be optimized during the following demonstration of design flow for high level synthesis; however, more than three parameters may be optimized and different combinations of parameters may be optimized. This illustrative example will be based on the following optimization parameters: power consumption, time of execution and hardware area of the resources.

Reference is first made to FIG. 1, which illustrates a block diagram of a system 10 for developing a system architecture in accordance with embodiments described herein. System may include a resource constraint module 12, an optimization parameter constraint module 14, a design space module 16, a priority factor module 18, a satisfying set module 20, an intersection module 22, a selection module 24, and a system architecture module 26.

System 10 may be implemented using a server which includes a memory store, such as database(s) or file system(s), or using multiple servers or groups of servers distributed over a wide geographic area and connected via a network. System 10 has a network interface for connecting to network in order to communicate with other components, to serve web pages, and perform other computing applications. System 10 may reside on any networked computing device including a processor and memory, such as an electronic reading device, a personal computer, workstation, server, portable computer, mobile device, personal digital assistant, laptop, smart phone, WAP phone, an interactive television, video display terminals, gaming consoles, and portable electronic devices or a combination of these. System 10 may include a microprocessor that may be any type of processor, such as, for example, any type of general-purpose microprocessor or microcontroller, a digital signal processing (DSP) processor, an integrated circuit, a programmable read-only memory (PROM), or any combination thereof. System 10 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. System 10 may include one or more input devices, such as a keyboard, mouse, camera, touch screen and a microphone, and may also includes one or more output devices such as a display screen and a speaker. System 10 has a network interface in order to communicate with other components by connecting to any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Resource constraint module 12 is operable to define a plurality of resources constraints $maxN_{R1}, \ldots maxN_{Rn}$. Each resource constraint corresponds to a maximum number $N_{Ri}$, $1 \leq i \leq n$, of a each kind of resources R1, ... Rn available to construct the system architecture, where n is an integer greater than 1 Examples of resources include adders, subtractors, clock oscillators, multipliers, dividers, comparators, Arithmetic Logic Units (ALU), integrators, summers and other functional modules. An example of a resources constraint is a maximum amount of each type of resource available to construct the system architecture.

Optimization parameter constraint module 14 is operable to define a constraint value for each of at least three optimization parameters for the system architecture. The at least three optimization parameters comprise a final optimization parameter. Examples of optimization parameters include hardware area, cost, time of execution, and power consumption. Other optimization parameters may also be considered.

Design space module 16 is operable to define a design space as a plurality of vectors representing different combinations of a number of each kind of resource R1, ... Rn available to construct the system architecture. Each vector of the design space is of the form:

$$V_n = (N_{R1}, \ldots N_{Rn})$$

wherein, $N_{R1}$ represents the number of the kind of resource R1, $N_{Rn}$ represents the number of the kind of resource Rn; and wherein based on resource constraints, $1 \leq N_{R1} \leq maxN_{R1}, \ldots 1 \leq N_{Rn} \leq maxN_{Rn}$, wherein max $N_{R1}$ is a maximum number of the kind of resource R1 ... $maxN_{Rn}$ is a maximum number of the kind resource Rn.

For each of the plurality of optimization parameters, priority factor module 18 is operable to define a priority factor function for each kind of resource R1, ... Rn. A priority factor function defines a rate of change of the optimization parameter with respect to a change in a number $N_{Ri}$ of the corresponding kind of resource Ri, $1 \leq i \leq n$ Examples of priority factor functions are illustrated herein in relation to hardware area, execution time, cost, and power consumption. Other priority factor functions may also be used by system 10 for these optimization parameters, and for other optimization parameters.

Satisfying set module 20 is operable to determine a plurality of satisfying, or near satisfying, sets of vectors. Satisfying set module 20 is operable to determine the satisfying sets of vectors, by, for each of the optimization parameters except for the final optimization parameter:

for each kind of resource R1, ... Rn available to construct the system architecture, calculating a priority factor using the corresponding priority factor function for the optimization parameter;

determining a priority order by sorting the calculated priority factors based on a relative magnitude of the calculated priority factors;

generating an ordered list of vectors by sorting the plurality of vectors of the design space based on the priority order; and determining a satisfying set of vectors from the ordered list of vectors, wherein each vector of the satisfying set substantially satisfies or nearly satisfies the constraint value for the optimization parameter.

Intersection module 22 is operable to determine a set of vectors based on an intersection of the plurality of satisfying sets of vectors for the optimization parameters.

Selection module 24 is operable to select a vector for use in developing the system architecture by, for the final optimization parameter:

for each kind of resource R1, ... Rn available to construct the system architecture, calculating a priority factor using the corresponding priority factor function for the final optimization parameter;

determining a priority order by sorting the calculated priority factors based on a relative magnitude of calculated priority factors;

generating an ordered list of vectors by sorting the set of vectors based on the priority order; and selecting a vector from the set of vectors based on the ordered list of vectors.

System architecture module 26 is operable to develop the system architecture using the selected vector.

Figure 2:
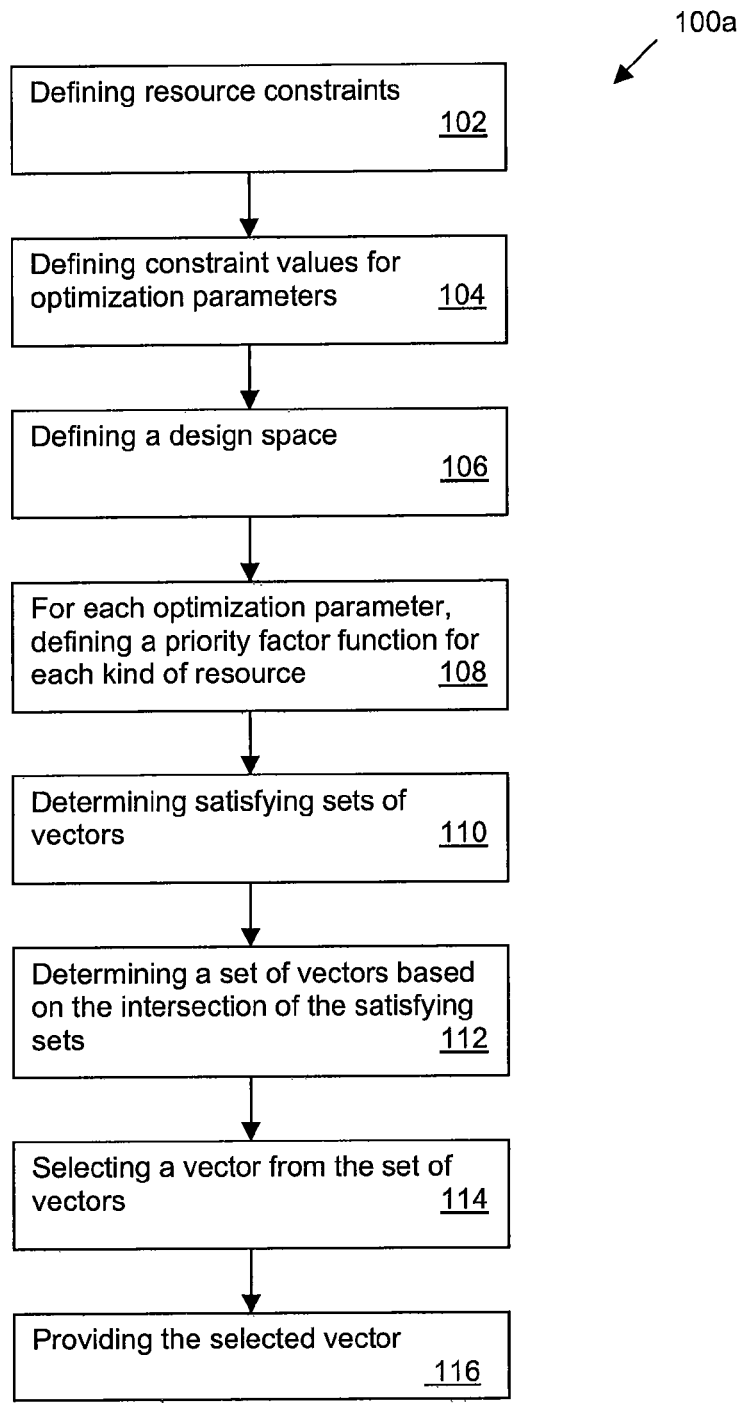
FIG. 2 illustrates a flow chart of a method of determining a vector representing a combination of a number of each kind of resource available to construct a system architecture in accordance with embodiments described herein.
Figure 3:
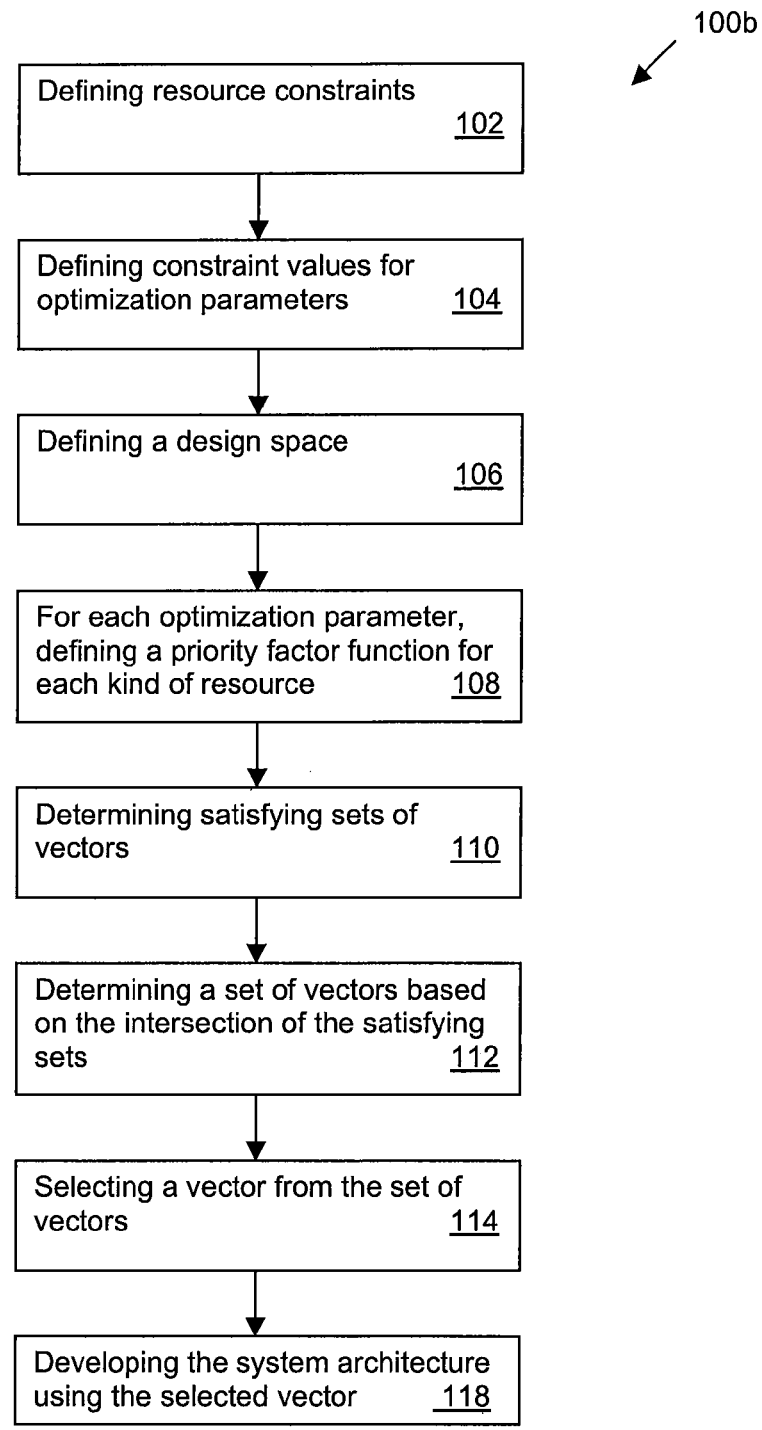
FIG. 3 illustrates a flow chart of another method of developing a system architecture in accordance with embodiments described herein.

Referring now to FIG. 2, which illustrates a method 100*a* of determining a vector representing a combination of a number of each kind of resource R1, . . . Rn available to construct a system architecture in accordance with embodiments described herein. Referring also to FIG. 3, which illustrates another method 100*b* of developing a system architecture in accordance with embodiments described herein. Method 100*a* and method 100*b* includes similar steps, as illustrated by the similar reference numerals.

Problem Formulation and Technical Specifications

At step 102, system 10 defines a plurality of resources constraints maxN$_{R1}$, . . . maxN$_{Rn}$. Each resource constraint corresponds to a maximum number N$_{Ri}$, $1 \leq i \leq n$, of a each kind of resources R1, . . . Rn available to construct the system architecture, where n is an integer greater than 1.

This stage marks the beginning of the high level synthesis design flow starting with the problem description and technical specifications. The application may be properly defined with its associated data structure. These specifications will act as the input information for the high level synthesis tools. As an illustrative example, the following are example resource constraints:

Maximum resources available for the system design:
3 Adder/subtractor units.
4 Multiplier units
2 clock frequency oscillators: 50 MHz and 200 MHz The following specifications are also assumed as an example for each resource available for constructing the system architecture:

a) No. of clock cycles needed for multiplier to finish each operation: 4 cc
b) No. of clock cycles needed by the Adder/subtractor: 2 cc
c) Area occupied by each adder/subtractor: 20 a.u. on the chip. (e.g. 20 transistors on an FPGA)
d) Area occupied by each multiplier: 100 a.u. on the chip. (e.g. 100 transistors on an FPGA)
e) Area occupied by the 50 MHz clock oscillator: 4 area units (a.u.)
f) Area occupied by the 200 MHz clock oscillator: 10 area units (a.u.)
g) Power consumed at 50 MHz: 10 mW/area unit.
h) Power consumed at 200 MHz: 40 mW/area unit.

At step 104, system 10 defines a constraint value for each of at least three optimization parameters for the system architecture. As an illustrative example, the following are example resource constraints:

Maximum power consumption: 8 watts (W)
Maximum time of execution: 140 µs (For 1000 sets of data during data pipelining)
Hardware area of resources: minimum while satisfying the above constraints.

The at least three optimization parameters comprise a final optimization parameter. In this example, the final optimization parameter is hardware area, with a constraint value being a minimum value while satisfying the other constraints for the other optimization parameters. The final optimization parameter provides a frame of reference to evaluate the set of vectors in order to select a vector for developing the system architecture, as will be explained herein.

During the problem formulation stage for high level synthesis the mathematical model of the application may be used to define the behavior of the algorithm. The model suggests the input/output relation of the system and the data dependency present in the function. For this illustrative example, a transfer function of an IIR Butterworth filter is used to demonstrate the high level synthesis design flow. The choice of IIR Butterworth filter is arbitrary and any other filter can also be used. The selected filter is used as an example benchmark application. The transfer function of a second order IIR digital Butterworth filter function can be given as:

$$H(z) = \frac{Y(z)}{X(z)} = \frac{z^3 + 3z^2 + 3z + 1}{6z^3 + 2z} \quad (39)$$

$$\frac{Y(z)}{X(z)} = \frac{1/6 + (1/2)Z^{-1} + (1/2)Z^{-2} + (1/6)Z^{-3}}{1 + (1/3)Z^{-2}} \quad (40)$$

$$y(n) = \quad (41)$$
$$0.167x(n) + 0.5x(n-1) + 0.5x(n-2) + 0.167x(n-3) - 0.33y(n-2)$$

Where H (z) denotes the transfer function of the filter in the frequency domain and x(n), x(n−1), x(n−2), x(n−3) represent the input variables for the filter in time domain, y(n) and y(n−2) represent the present output of the filter and the previous output of the filter in the time domain, and 'z' represents the unit delay operator. For simplicity in explanation, constants 0.167, 0.5 and 0.33 are denoted with 'A', 'B' and 'C' respectively.

In accordance with embodiments described herein, system 10 is operable to validate the constraint values for the optimization parameters.

System 10 performs this validation step as a first screening level of check by performing a Minimum-Maximum evaluation for the constraint to verify whether the constraints specified are valid and feasible.

System 10 is operable to perform this validation using the following example inputs: Module Library, Data Flow Graph (or Mathematical function) of the application and constraints values. System 10 is operable to produce the following output: the decision whether the design process continues or terminates (i.e. constraints are valid or invalid). System 10 is operable to perform the validation according to the following algorithm:

---

Repeat for all the constraints values specified
{
1. Calculate the minimum value of the optimization parameter under consideration. For the parameter discussed in the supporting document, calculate the minimum value of the hardware area (power consumption)/execution time based on the minimum resource/maximum resource (considering that whichever parameter among hardware area, power consumption or execution time is the first user constraint) using any one of the functions described below based on the user requirement:

-continued

```
In case of hardware Area:
    A_min = (N_R1 · K_R1 + N_R2 · K_R2 + ... + N_Rn · K_Rn) + A(R_clk)
Where, N_Ri represents the number of resource R_i and is equal to 1 for all cases.
Therefore for calculating the minimum area, N_R1 = N_R2 = N_R3 = ... = N_Rn = 1. Also 'K_Ri'
represents the area occupied per unit resource 'Ri' which is obtained from the user as
input. A(R_clk) refers to the area of clock oscillator used as a resource providing the
necessary clock frequency to the system. 'K_Ri' represents the area occupied per unit
resource 'Ri' (1<=i<=n).
In case of power consumption:
    P_min = (N_R1 · K_R1 + N_R2 · K_R2 + ... + N_Rn · K_Rn) · p_c
Therefore for calculating the minimum area, N_R1 = N_R2 = N_R3 = ... = N_Rn = 1. Moreover,
'p_c' is the slowest clock frequency available in the module library which consumes the
least power per unit area.
In case of execution time:
    T_exe = [L + (N - 1) · T_c]
'L' and 'T_c' should be calculated based on minimum resources considering N_R1 = N_R2 =
N_R3 = ... = N_Rn = 1. 'L' represents latency of execution, 'Tc' represents the cycle time of
execution during data piperlining. Also, 'N' is the number of sets of data to be pipelined
obtained from library (users input).
2. Calculate the maximum value of the optimization parameter under consideration.
Calculate the maximum value of the hardware area based on the minimum resource
(considering that hardware area is the first user constraint) using the function described
below:
In case hardware Area:
    A_max = (N_R1 · K_R1 + N_R2 · K_R2 + ... + N_Rn · K_Rn) + A(R_clk)
Where, N_Ri represents the number of resource R_i. Therefore for calculating the
maximum area, N_R1 = N_R2 = N_R3 = ... = N_Rn = Maximum resource of certain functional
unit specified by user in the library. Also 'K_Ri' represents the area occupied per unit resource
'Ri' which is obtained from the user as input.
In case of power consumption:
    P_max = (N_R1 · K_R1 + N_R2 · K_R2 + ... + N_Rn · K_Rn) · p_c
Therefore for calculating the minimum area, N_R1 = N_R2 = N_R3 = ... = N_Rn = Maximum
resource of certain functional unit specified by user in the library. Moreover, 'p_c' is the
fastest clock frequency available in the module library which consumes the maximum
power per unit area.
In case of execution time:
    T_min = [L + (N - 1) · T_c]
'L' and 'T_c' should be calculated based on maximum resources considering N_R1 = N_R2 =
N_R3 = ... = N_Rn = Maximum resource of certain functional unit specified by user in the
library.
Check if Constraint specified satisfies the upper threshold (maximum value) and
lower threshold (minimum value) of the parameter calculated above in steps 1 and 2.
In other words, let the constraint for hardware area is 'A_const', constraint for power
consumption is 'P_const' and constraint for execution time is 'T_const'. Then, the following
conditions are checked.
    A_min<=A_const<=A_max (For Hardware area)
    T_min<=T_const<=T_max (For Execution time)
    P_min<=P_const<=P_max (For Power consumption)
If the above conditions satisfy then, the design process continues
Elseif the above conditions fail then the design process stops and prompt for correction
of constraint values.
}
END
```

Creation of a Random Architecture Design Space for Power Consumption Parameter

At step 106, system 10 defines a design space as a plurality of vectors representing different combinations of a number of each kind of resource R1, . . . Rn available to construct the system architecture, wherein each vector $V_n$ of the design space is of the form:

$$V_n = (N_{R1}, \ldots N_{Rn})$$

wherein, $N_{R1}$ represents the number of the kind of resource R1, $N_{Rn}$ represents the number of the kind of resource Rn; and wherein based on resource constraints, $1 \leq N_{R1} \leq maxN_{R1}, \ldots 1 \leq N_{Rn} \leq maxN_{Rn}$, wherein $maxN_{R1}$ is a maximum number of the kind of resource R1, . . . $maxN_{Rn}$ is a maximum number of the kind resource Rn;

This initial arrangement can be made in any order and is used by system 10 to visualize the total architectural variants available. The design space can change based on the resources of available to construct the system architecture.

The design space is first created according to the resource constraints for total available resources available to construct the system architecture.

For this illustrative example, the variable $V_n = (N_{R1}, N_{R2}, N_{R3})$ is used to represent the architecture design space. The variables $N_{R1}$, $N_{R2}$ and $N_{R3}$ indicate the number of adders/subtractors, multipliers and clock frequencies. According to the resource constraints, $1 \leq N_{R1} \leq 3$, $1 \leq N_{R2} \leq 4$ and $1 \leq N_{R3} \leq 2$. Table 1 shows the design space represented as different combinations of available resources, which are adder/subtractor, multiplier and clock for this example.

TABLE 1

| | | | |
|---|---|---|---|
| V1 = (1,1,1) | V2 = (1,2,1) | V3 = (1,3,1) | V4 = (1,4,1) |
| V5 = (1,1,2) | V6 = (1,2,2) | V7 = (1,3,2) | V8 = (1,4,2) |
| V9 = (2,1,1) | V10 = (2,2,1) | V11 = (2,3,1) | V12 = (2,4,1) |
| V13 = (2,1,2) | V14 = (2,2,2) | V15 = (2,3,2) | V16 = (2,4,2) |
| V17 = (3,1,1) | V18 = (3,2,1) | V19 = (3,3,1) | V20 = (3,4,1) |
| V21 = (3,1,2) | V22 = (3,2,2) | V23 = (3,3,2) | V24 = (3,4,2) |

Calculation of the Priority Factor for Each Available Resource

At step 108, for each of the plurality of optimization parameters, system 10 defines a priority factor function for each kind of resource R1, . . . Rn. A priority factor function defines a rate of change of the optimization parameter with respect to a change in a number $N_{Ri}$ of the corresponding kind of resource Ri, $1 \leq i \leq n$. As described herein the priority factors may be defined by applying a partial derivative to an equation representing an optimization parameter.

An optimization parameter may be a hardware area of a total number of all kinds of resources R1, . . . Rn. For the hardware area, the priority factor function of each kind of resource R1, . . . Rn is an indicator of a change of area contributed by a change in the number of the kind of resource Ri, wherein $1 \leq i \leq n$. For the hardware area, the priority factor for each kind of resource R1, . . . Rn that is not a clock oscillator may be calculated from $N_{Ri}$, $\Delta N_{Ri}$, $K_{Ri}$ wherein $N_{Ri}$ is the number of the kind of resource Ri, $K_{Ri}$ is an area occupied by the kind of resource Ri, $\Delta N_{Ri} \cdot K_{Ri}$ is a change of area contributed by the kind of resource Ri, wherein Ri is a member of the kinds of resources R1, . . . Rn. As an example, for the hardware area, the priority factor for each kind of resource R1, . . . Rn that is not a clock oscillator may be of the form:

$$PF(Ri) = \frac{\Delta N_{Ri} \cdot K_{Ri}}{N_{Ri}}$$

For the hardware area, the priority factor function of resource Ri that is a clock oscillator may be calculated from $\Delta A(R_{clk})$, $N_{Rclk}$, $R_{clk}$, wherein $R_{clk}$ is a clock oscillator used to construct the system architecture, $\Delta A(R_{clk})$ is a change of area occupied by clock oscillators, $N_{Rclk}$ is a number of clock oscillators. As an example, for the hardware area, the priority factor function of resource Ri that is a clock oscillator may be of the form:

$$PF(R_{clk}) = \frac{\Delta A(R_{clk})}{N_{Rclk}}$$

Another optimization parameter may be a time of execution of a total number of all kinds resources R1, . . . Rn. For the time of execution, the priority factor function for each kind of resource R1, . . . Rn may be a function of the rate of change of a cycle time with a change in the number $N_{Ri}$ of the kind of resources Ri at a maximum clock period, wherein $1 \leq i \leq n$ and Ri is a member of the kinds of resources R1, . . . Rn. The priority factor function for the time of execution of the resources R1, . . . Rn that is not a clock oscillator may be calculated by $N_{Ri}$, $T_{Ri}$, $T_p^{max}$, wherein $N_{Ri}$ is the number of the kind of resource Ri, $T_{Ri}$ a number of clock cycles required by the kind of resource Ri to finish each operation, $T_p$ is the time period of the clock, $T_p^{max}$ is the maximum clock period. As an example, the priority factor function for the time of execution of the resources R1, . . . Rn that is not a clock oscillator may be of the form:

$$PF(R_i) = \frac{\Delta N_{Ri} T_{Ri}}{N_{Ri}} (T_p^{max})$$

For the time of execution, the priority factor function of resource Ri that is a clock oscillator may be calculated by $R_{clk}$, $N_{Ri}$, $T_{Ri}$, $R_{clk}$, $N_{Rclk}$, where $R_{clk}$ is a clock oscillator used to provide necessary clock frequency to the system, $N_{Ri}$ is the number of the kind of resource Ri, $N_{Rclk}$ is the number of clock oscillators, $T_{Ri}$ a number of clock cycles required by the kind of resource Ri to finish each operation. As an example, for the time of execution, the priority factor function of resource Ri that is a clock oscillator may be of $$PF(R_{clk}) = \frac{N_{R1} \cdot T_{R1} + N_{R2} \cdot T_{R2} \ldots + N_{Rn} \cdot T_{Rn}}{N_{Rclk}} (\Delta T_p)$$

Another example optimization parameter is a power consumption of the resources R1, . . . Rn. For the power consumption, the priority factor function for each kind of resource R1, . . . Rn may be a function of a change in power consumption per unit area due to deviation of clock frequency from maximum to minimum and a change in the number $N_{Ri}$ of the kind of resource Ri at maximum clock frequency, wherein $11 \leq i \leq n$, and Ri is a member of the kinds of resources R1, . . . Rn. The priority factor function for the power consumption of the resources R1, . . . Rn that is not a clock oscillator may be calculated by $N_{Ri}$, $K_{Rn}$, $\Delta N_{Ri}$, $(p_c)^{max}$, $p_c$ wherein $N_{Ri}$ is the number of resource Ri, $K_{Rn}$ is an area occupied by resource Ri, $\Delta N_{Rn} \cdot K_{Rn}$ is a change of area contributed by resource Ri, $p_c$ is power consumed per area unit resource at a particular frequency of operation, $(p_c)^{max}$ is power consumed per area unit resource at a maximum clock frequency. As an example, the priority factor function for the power consumption of the resources R1, . . . Rn that is not a clock oscillator may be of the form:

$$PF(Ri) = \frac{\Delta N_{Ri} \cdot K_{Ri}}{N_{Ri}} (p_c)^{max}$$

For the power consumption, the priority factor function of resource Ri that is a clock oscillator may be calculated by $N_{Ri}$, $T_{Ri}$, $R_{clk}$, $N_{Rclk}$, $p_c$ where $R_{clk}$ is a clock oscillator used to provide necessary clock frequency to the system, $N_{Ri}$ is the number of the kind of resource Ri, $T_{Rn}$ a number of clock cycles required by resource Ri to finish each operation, $p_c$ is power consumed per area unit of resource at a particular frequency of operation. As an example, for the power consumption, the priority factor function of resource Ri that is a clock oscillator may be of the form:

$$PF(Rclk) = \frac{N_{R1} \cdot T_{R1} + N_{R2} \cdot T_{R2} \ldots + N_{Rn} \cdot T_{Rn}}{N_{Rclk}} (\Delta p_c)$$

As another example, an optimization parameter may be a total cost of the total number of all kinds resources R1, . . . Rn. For the total cost, the priority factor function for each kind of resource R1, . . . Rn may be an indicator of change in total cost of the total number of all kinds resources R1, . . . Rn with respect to a change in the number of the kind of resource Ri and the cost per unit resource, wherein $1 \leq i \leq n$. For the cost, the priority factor function for each kind of the resources R1, . . . Rn that is not a clock oscillator may be calculated by $N_{Ri}$, $K_{Ri}$, $\Delta N_{Ri}$, $C_{Ri}$, wherein $N_{Ri}$ is the number of the kind of resource Ri, $K_{Ri}$ is an area occupied by the kind of resource Ri, $\Delta N_{Ri} \cdot K_{Ri}$ is a change of area contributed by the kind of resource Ri, $C_{Ri}$ is the cost per area unit of the kind of resource Ri. As an example, for the cost, the priority factor function for each kind of the resources R1, . . . Rn that is not a clock oscillator may be of the form:

$$PF(Ri) = \frac{\Delta N_{Ri} \cdot K_{Ri} \cdot C_{Ri}}{N_{Ri}}$$

For the cost, the priority factor function of resource Ri that is a clock oscillator may be calculated by $R_{clk}$, $N_{Rclk}$, $\Delta A(R_{clk})$, $C_{Rclk}$, wherein $R_{clk}$ is a clock oscillator used to provide necessary clock frequency to the system, $\Delta A(R_{clk})$ is a change of area occupied by clock oscillators, $N_{clk}$ is a total number of clock oscillators available to construct the system architecture, $C_{Rclk}$ is the cost per area unit of clock oscillators. As an example, for the cost, the priority factor function of resource Ri that is a clock oscillator may be of the form:

$$PR(R_{clk}) = \frac{A(R_{clk}) \cdot C_{Rclk}}{N_{Rclk}}$$

Figure 4:
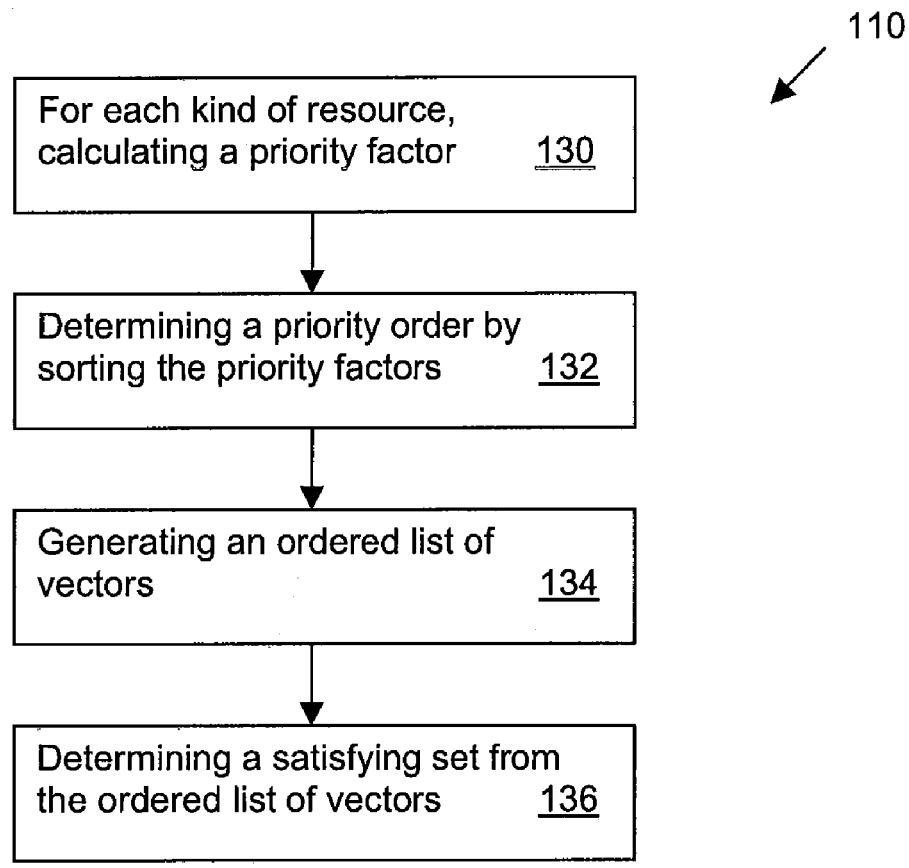
FIG. 4 illustrates a flow chart of a method for determining a satisfying set of vectors for an optimization parameter in accordance with embodiments described herein.

At step 110, system 10 determines a plurality of satisfying sets of vectors, and in particular, system 10 determines a satisfying set for each optimization parameter, except for the final optimization parameter. Referring now to FIG. 4, which illustrates a method 110 for determining a satisfying set of vectors for an optimization parameter in accordance with embodiments described herein. System 10 implements method 110 for each of the optimization parameters except for the final optimization parameter in order to determine a satisfying set for each optimization parameter, except for the final optimization parameter.

For this example, method 110 will first be illustrated for the example optimization parameter power consumption, in order to determine a satisfying set for the optimization parameter power consumption.

At step 130, for each kind of resource R1, . . . Rn available to construct the system architecture, system 10 calculates a priority factor using the corresponding priority factor function for the optimization parameter.

Using the example priority factor functions for power consumption described herein, the following priority factors are calculated for each resource available to construct the system architecture.

For resource adder/subtractor (R1):

$$PF(R1) = \frac{\Delta N_{R1} \cdot K_{R1}}{N_{R1}} \cdot (p_c)^{max} = \frac{(3-1) \cdot 20}{3} \cdot 40 = 533.33$$

For resource multiplier (R2):

$$PF(R2) = \frac{\Delta N_{R2} \cdot K_{R2}}{N_{R2}} \cdot (p_c)^{max} = \frac{(4-1) \cdot 100}{4} \cdot 40 = 3000$$

For resource clock oscillator ($R_{clk}$):

$$PF(Rclk) = \frac{N_{R1} \cdot T_{R1} + N_{R2} \cdot T_{R2}}{N_{Rclk}} (\Delta p_c)$$
$$= \frac{(3 \cdot 20 + 4 \cdot 100) \cdot (40 - 10)}{2}$$
$$= 6900$$

The above priority factors are a measure of the change in power consumption with the change in number of a specific resource. For example, according to the above analysis, the change in clock frequency from 50 MHz to 200 MHz affects the change in power the most, while the change in number of adder/subtractor affects the change in power consumption the least. Similarly, the change in number of multipliers influences the change in power consumption more than the adder/subtractor but less than the clock.

At step 132, system 10 determines a priority order by sorting the calculated priority factors based on a relative magnitude of the calculated priority factors.

For this example, according to the priority factors calculated, the priority order (PO) is arranged so that the resource with the lowest priority factor is assigned the highest priority order while the resource with the highest priority factor is assigned the lowest priority order. The priority order of the resources increases with the decrease in priority factor of the resources. Therefore the following PO of the resources for arranging the design variants in increasing order can be attained, where ">" means precedes:

PO(R1)>PO(R2)>PO(Rclk)

Based on the above PO the variant vectors from the design space are chosen so that the design space for power consumption can be organized in increasing orders of magnitude. That is, the PO is used to arrange the vectors of the design space in increasing order. The arrangement of the variant vectors in the design space in increasing order will help to prune the design space for obtaining the satisfying set for power consumption. Arrange the Design Space According to the Priority Order At step 134, system 10 generates an ordered list of vectors by sorting the plurality of vectors of the design space based on the priority order.

Since the design space is large for the present generation of complex multi objective VLSI designs, finding the system architecture that best meets the specified design objectives by analyzing the design space exhaustively may be strictly prohibitive. Due to increased complexity in VLSI designs the major problem has been the examination of the design variants in the large design space for selecting a design option that is acceptable in terms of all the constraints and predefined specifications. Hence obtaining a superior quality design for the user specified specification requires a structured methodology for exploring the large design spaces. Design space exploration when performed at the higher level of abstraction pays more dividend than performing it at the lower level of abstraction like the logic or the transistor level. The job of design space exploration is apparently a battle between optimizing the following two contradictory conditions: selecting the optimum design option and efficiently searching the space in a short time. Hence, there may be a tradeoff between not only the contradictory parameters of optimization during high level synthesis design, but also between the above mentioned conditions during design space exploration in high level synthesis. To proficiently analyze the complex design spaces, an efficient means of arriving at the best result is needed. Analyzing the design to obtain the best architecture according to the requirement specified requires an efficient design space exploration technique.

Figure 7:
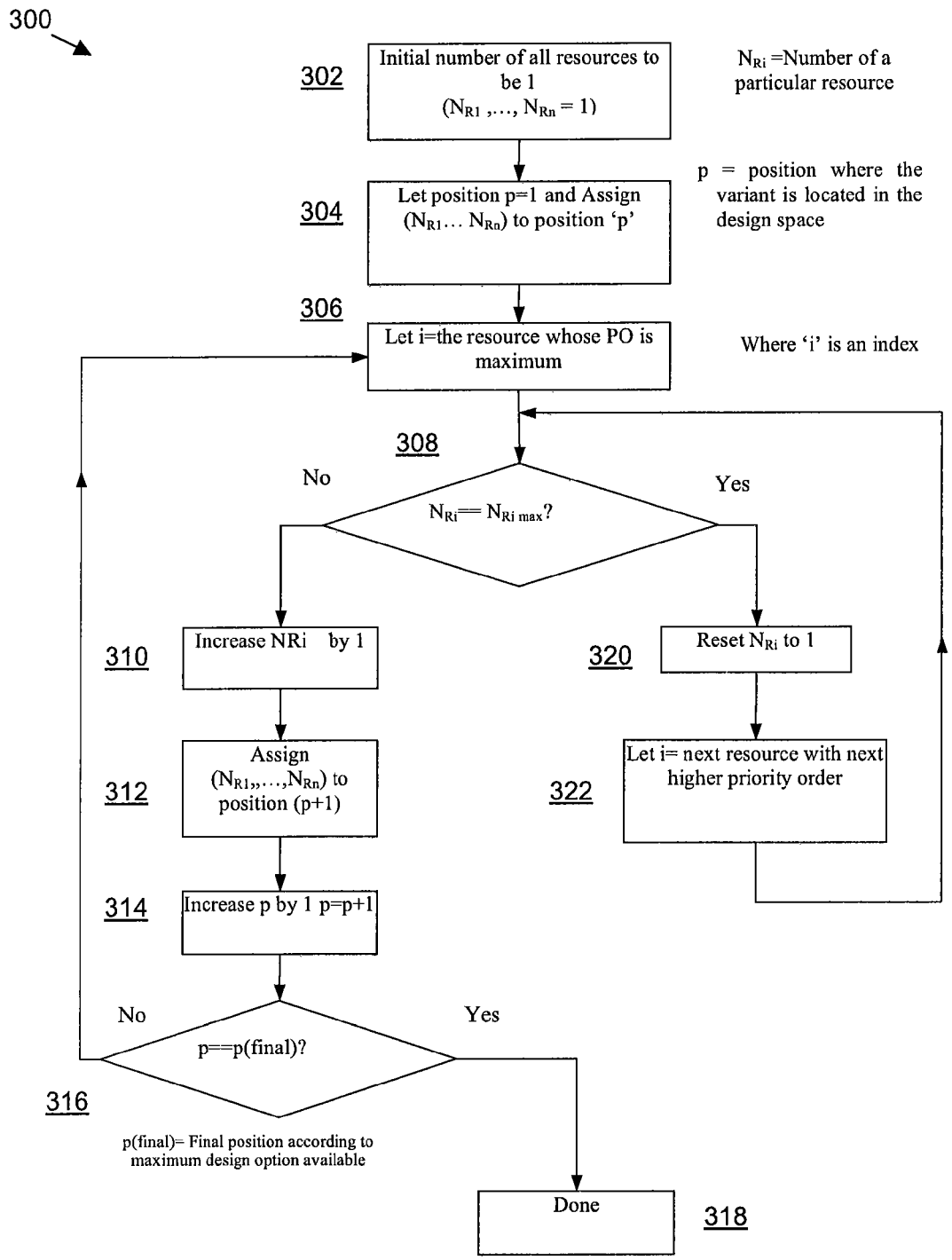
FIG. 7 illustrates a flow chart of a method for generating an ordered list of vectors in accordance with an example embodiment.

Referring now to FIG. 7, which illustrates flow chart of a method 300 for generating an ordered list of vectors by arranging the random design space in an organized increasing order for the power consumption parameter in accordance with an example embodiment. The arrangement is based on priority order (PO) sequencing from step 132 (FIG. 4). In this example, the elements will be placed in such a way that the element on the top will have the least power consumption and the element on the bottom will have the highest power consumption.

Let $N_{Ri}$ represent the number of a particular resource Ri, and at step 302, the initial number of all kinds of resources is set to one, $N_{R1}, \ldots N_{Rn}=1$.

Let position 'p' represent the position where a particular variant vector is located within the arranged design space, and at step 304, the position 'p' is set to one (p=1) and the variant vector $(N_{R1}, \ldots N_{Rn})$ is assigned to position 'p'.

Let 'i' be an index, and at step 306, 'i' represents the resource whose PO is maximum.

Let $N_{Ri\ max}$ (also referred to herein as $maxN_{Ri}$) represent the maximum number of a kind of resource Ri, at step 308, it is determined whether $N_{Ri}=N_{Ri\ max}$.

If $N_{Ri}$ does not equal $N_{Ri\ max}$, then at step 310, $N_{Ri}$ is increased by one.

At step 312, variant vector $(N_{R1}, \ldots N_{Rn})$ is assigned to position 'p+1'.

At step 314, position 'p' is increased by one, p=p+1.

Let p(final) be the final position according to the maximum number of design options available, which is the number of vectors of the design space, and at step 316, it is determined whether p=p(final).

If p does not equal p(final) then method 300 returns to step 306.

If p does equal p(final) then method 300 proceeds to step 318 and ends.

If $N_{Ri}$ equals $N_{Ri\ max}$, then at step 320, $N_{Ri}$ is reset to one.

At step 322, i represents the next resource with the next higher PO, and the method returns to step 308.

Figure 8:
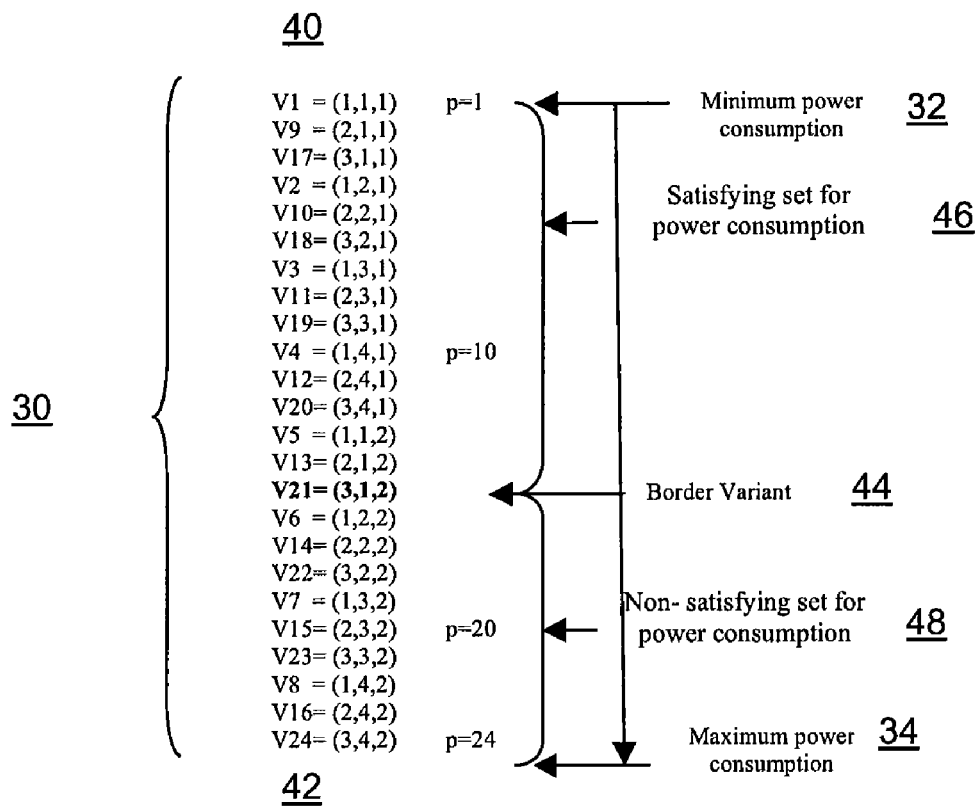
FIG. 8 illustrates an ordered list of vectors for the power consumption optimization parameter in accordance with an example embodiment.

Referring now to FIG. 8, which illustrates the arranged design space 30 (referred to herein as an ordered list of vectors) for the power consumption optimization parameter in accordance with an example embodiment. Vector V1=(1,1,1) 40 is at position p=1 with the minimum power consumption 32. Vector V24=(3,4,2) 42 is at position p=24 with the maximum power consumption 34.

Determination of the Border Variant for the Power Consumption

Referring back to FIG. 4, at step 136, system 10 determines a satisfying set of vectors from the ordered list of vectors, wherein each vector of the satisfying set substantially satisfies the constraint value for the optimization parameter After the vectors are arranged in increasing order to generate the ordered list of vectors, the design space is pruned to obtain the border variant for power consumption and the satisfying set of vectors for power consumption. As an example, binary search is applied to the design space shown in FIG. 8. Binary search can be extremely fast but other search algorithms for sorted data can also be used. Binary search uses the principle of 'divide and conquer', to rule out entire half of the elements in each comparison. Hence the border variant can be found relatively quickly, which in turn yields the satisfying set of vectors. Furthermore, since binary search works well for large size sorted elements, binary search can find the border variant in the large sorted design space with a complexity of log N. Additional explanations will be provided herein. The binary search algorithm yields the variant vectors shown in Table 2a.

TABLE 2a

Variants obtained after pruning of the design space for power consumption

| Variants | Power Consumption in watts (W) | Decision based on the $P_{optimal}$ |
|---|---|---|
| V20 | [(3 * 20) + (4 * 100)] * 10 mw = 4.6 W | $P^{20} < P_{optimal}$, search down in the space |
| V22 | [(3 * 20) + (2 * 100)] * 40 mw = 10.4 W | $P^{18} > P_{optimal}$, search up in the space |
| V21 | [(3 * 20) + (1 * 100)] * 40 mw = 6.4 W | $P^7 < P_{optimal}$, search down in the space |
| V6 | [(1 * 20) + (2 * 100)] * 40 mw = 8.8 W | Stop |

The obtained variants are further analyzed for power consumption according to equation (26). '$P_{optimal}$' is the value of power consumed that is specified as a constraint at the beginning of the design flow. '$P^i$' is the value of power consumption for the vector#i. When the value of $P^i$ is less than the value of specified $P_{optimal}$, then the southern portion (down) of the design space 30 (FIG. 8) with respect to the calculated value of $P^i$, is searched. On the contrary, if the value of the $P^i$ is more than the value of specified $P_{optimal}$, then the northern portion (up) of the design space 30 (FIG. 8) with respect to the calculated value of $P^i$ is searched. After four comparisons it is evident that vector 21 ('V21') is the last variant which satisfies the $P_{optimal}$. This variant is referred to as the border variant for power. The significance of this border variant lies in the fact that all vectors to the top of the border variant satisfy the condition of $P_{optimal}$, while any vector to the bottom fails to meet the constraint.

Referring back to FIG. 8, the border variant 44 is V21=(3, 1,2) and the satisfying set of vectors 46 for power consumption is all vectors to the top of the border variant 44, and includes the border variant 44. The non-satisfying set of vectors 48 for power consumption is all vectors to the bottom of the border variant 44.

Border variant is the last variant (represented as the combination of resources shown by vectors) of the architecture vector design space for hardware area/power consumption that satisfies the constraints. While on the contrary, border variant for execution time (or performance) in the architecture vector design space is the first variant that satisfies the constraint value for execution time.

The Border variant is determined as follows:
Algorithm

Apply the priority factor function obtained in equations (35)-(38) to determine the priority factor of each resource.

Determine the priority order based on the priority factor obtained.

Apply the priority order (PO) sequence to the algorithm proposed in FIG. 7 as input. The output produced by the algorithm is an increasing order vector design space for power consumption This is either increasing in nature or partially increasing in nature due to nature of the application.

Figure 16:
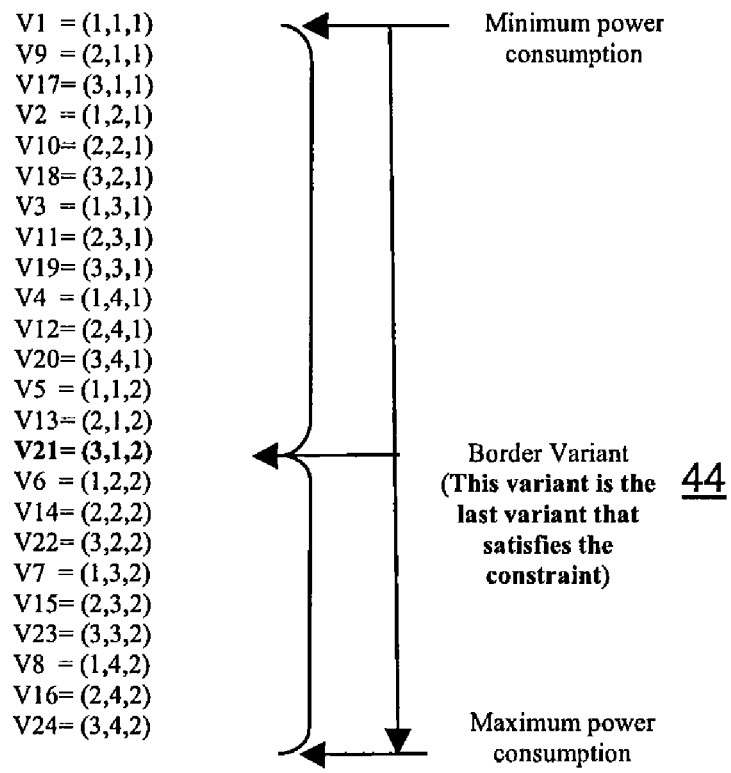
FIG. 16 illustrates the border variant for power consumption in accordance with an example embodiment.

Apply Binary search mechanism (or other search) to search the Border variant value which is the user constraint for power consumption. Calculate the power consumption of each variant visited during searching using the function (27). During evaluation find out the last variant in the design space that has value equal or less that the power consumption constraint provided. The border variant for power consumption obtained after applying the algorithm above indicates that V21 (see FIGS. 8 and 16) with architecture 3 adders, 2 multipliers and $2^{nd}$ clock frequency (200 MHz) is the last architecture in the design space that meets the power constraints.

The binary search termination condition for power consumption/hardware area shown in table 2a may be implemented as follows:
1. Let the user constraint for the parameter is $P_{optimal}$ ($V_{border}$). Let the power consumption of the variant # i is '$P_i$'.
If, the value of the $P_i < P_{optimal}$ then, search the southern portion of the design space for power.
2. If, the value of the $P < P_{optimal}$ then, search the northern portion of the design space for power.
3. Continue binary search until a last variant i which satisfies $P_{optimal}$ is found. In other words, the last variant i for which $P_i < P_{optimal}$ but also most closest to $P_{optimal}$ is found.
4. Stop.

Calculation of the Priority Factor for Each Available Resource for Time of Execution Parameter Referring back to FIG. 4, method 110 will now be illustrated for the example optimization parameter time of execution, in order to determine a satisfying set for the optimization parameter time of execution.

At step 130, for each kind of resource R1, ... Rn available to construct the system architecture, system 10 calculates a priority factor using the corresponding priority factor function for the time of execution.

Using the example priority factor functions for time of execution described herein, the following priority factors are calculated for each resource available to construct the system architecture.

For resource adder/subtractor (R1):

$$PF(R1) = \frac{\Delta N_{R1} \cdot T_{R1}}{N_{R1}} \cdot (T_p)^{max} = \frac{(3-1) \cdot 2}{3} \cdot (0.02) = 0.026$$

For resource multiplier (R2):

$$PF(R2) = \frac{\Delta N_{R2} \cdot T_{R2}}{N_{R2}} \cdot (T_p)^{max} = \frac{(4-1) \cdot 4}{4} \cdot (0.02) = 0.06$$

For resource clock oscillator ($R_{clk}$):

$$PF(R_{clk}) = \frac{N_{R1} \cdot T_{R1} + N_{R2} \cdot T_{R2}}{N_{Rclk}} \cdot (\Delta T_p)$$
$$= \frac{(3 \cdot 2 + 4 \cdot 4) \cdot (0.02 - 0.005)}{2}$$
$$= 0.165$$

The factors determined above measure the change in time of execution with a corresponding change in the number of a specific resource. For instance, according to the above analysis the change in number of adder/subtractor affects the change in time of execution the least, while the change in clock frequency from 50 MHz to 200 MHz affects the change in time of execution the most. Similarly, the change in multiplier influences the change in execution time lesser than the change in clock frequencies.

At step 132, system 10 determines a priority order (PO) for generating the ordered list of vectors by arranging the design variants in increasing order according to the above priority factors calculated. The PO for time of execution is:

PO(R1)>PO(R2)>PO(Rclk)

Arrange the Design Space in Decreasing Order for Execution Time

Figure 9:
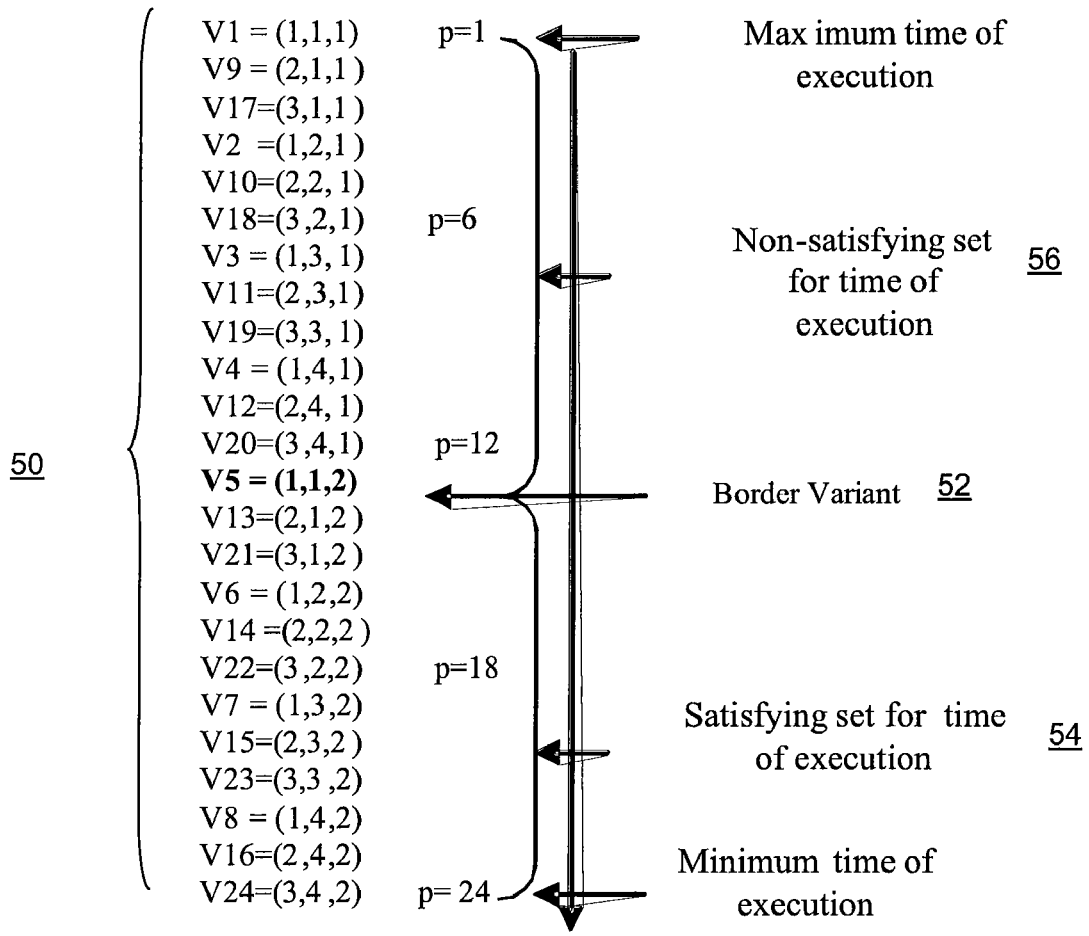
FIG. 9 illustrates an ordered list of vectors for the time of execution optimization parameter in accordance with an example embodiment.

At step 134, system 10 generates an ordered list of vectors using the priority order for time of execution. System 10 may generate an ordered list of vectors using method 300 of FIG. 7. This approach is based on the multi-parametric optimization requirement for efficient DSE. Referring now to FIG. 9, there is shown an ordered list of vectors 50 for time of execution sorted in decreasing order.

Determination of the Border Variant for the Time of Execution Parameter

At step 136, system 10 determines a satisfying set of vectors from the ordered list of vectors. The arrangement of the design space as an ordered list of vectors in decreasing order allows the design space to be pruned for finding the border variant of time of execution. As discussed herein, binary search algorithm is beneficial when it comes to the question of searching a large size ordered list like a large design space but other search algorithms may also be used. This is because it is fast and works well for large size sorted lists of elements. Binary search finds the border variant at a complexity of log N in the sorted design space. The binary search algorithm is applied to the design space as an ordered list 50 shown in FIG. 9 and the variants are analyzed according to equation (13) to determine the best variants, as shown in Table 2b. The vector number 'V5' is the border variant 52 for the time of execution' parameter. The satisfying set 54 for time of execution are all vectors to the south of the border variant 52, including the border variant 52. The non-satisfying set 56 for time of execution is all vectors to the north of the border variant 52.

TABLE 2b

Variants obtained after pruning of the design space for execution time

| Variants | Execution time (in μs) | Decision based on the $T_{optimal}$ |
|---|---|---|
| V20 | $T_{exe}^{20} = 12 + (1000 - 1) * 8 * 0.02 = 160.08$ μs | $T_{exe}^{20} > T_{optimal}$ search down in the space |
| V22 | $T_{exe}^{22} = 16 + (1000 - 1) * 12 * 0.005 = 60.02$ μs | $T_{exe}^{22} < T_{optimal}$, search up in the space |
| V21 | $T_{exe}^{21} = 22 + (1000 - 1) * 20 * 0.005 = 100.01$ μs | $T_{exe}^{21} < T_{optimal}$ search up in the space |
| V5 | $T_{exe}^{5} = 22 + (1000 - 1) * 20 * 0.005 = 100.01$ μs | stop |

The binary search termination condition for execution time for Table 2b may be as follows:
1. Let the user constraint for the parameter is $T_{optimal}$ ($V_{border}$). Let the execution time of the variant # i is '$T_i$'.
If, the value of the $T_i < T_{optimal}$ then, search the northern portion of the design space for execution time.
2. If, the value of the $T_i > T_{optimal}$ then, search the southern portion of the design space for execution time.
3. Continue binary search again until a first variant i which satisfies $T_{optimal}$ is found. In other words, the first variant i for which $T_i < T_{optimal}$ but also most closest to $T_{optimal}$ is found.
4. Stop.

System 10 is operable to calculate performance (execution time) by determination of Latency and Cycle time in Table 2b.

The performance (execution time) metric of a variant is a combination of latency, cycle time and number of sets of data (N) to be pipelined during processing (see equation 13). Latency (L) is the delay for the first processing output while cycle time ($T_o$) is the difference in clock cycle between the outputs of any two consecutive sets of pipelined data. The performance definition is shown with an example of a filter benchmark and is determined as follows:

Example Benchmark:

$$y(n)=0.167x(n)0.5x(n-1)0.5x(n-2)+0.167x(n-3)-0.33y(n-2)$$

Let, 0.167 x(n)=Ai, 0.5 x(n−1)=Bi, 0.5 x(n−2)=$C_i$, 0.167 x(n−3)=$D_i$ $$0.167x(n)+0.5x(n-1)=F_i,$$

$$0.5x(n-2)+0.167x(n-3)=G_i,$$

$$0.167x(n)+0.5x(n-1)+0.5x(n-2)+0.167x(n-3)=H_i,$$

$$0.33y(n-2)=Ji$$

$$0.167x(n)+0.5x(n-1)+0.5x(n-2)+0.167x(n-3)-0.33y(n-2)=Ki$$

Figure 17:
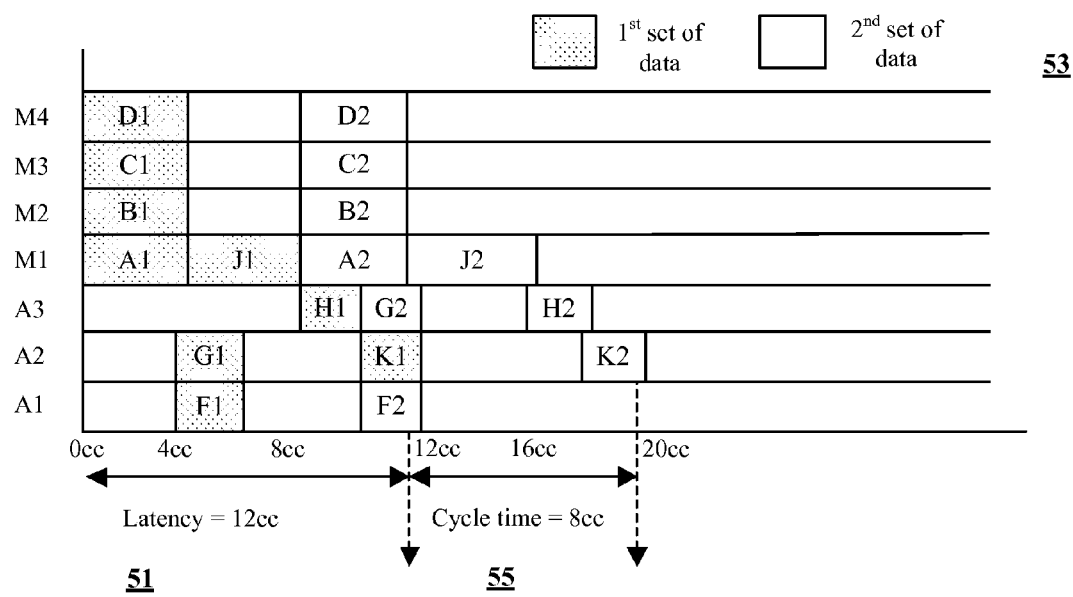
FIG. 17 illustrates an example vector representing a combination of resources.

Referring now to FIG. 17, which illustrates an example vector V20 53 which includes 3 adders/subtractors and 4 multipliers on a data pipelining timing diagram for latency 51 and cycle time 55.

Figure 18:
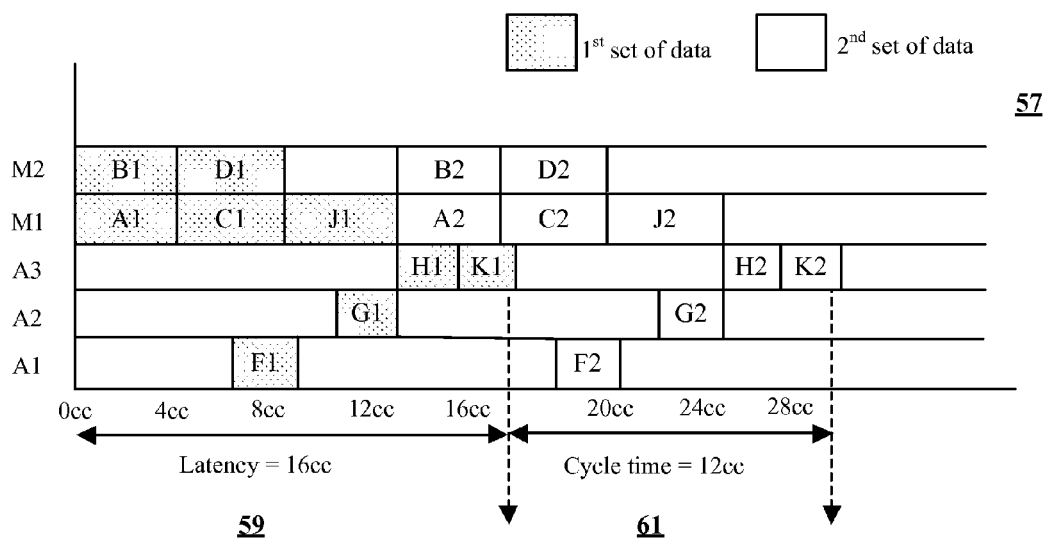
FIG. 18 illustrates another example vector representing another combination of resources.

Referring now to FIG. 18, which illustrates an example vector V22 57 which includes 3 adders/subtractors and 2 multipliers on a data pipelining timing diagram latency 59 and cycle time 61.

Determination of the Pareto-Optimal Set of Design Architecture

Referring back to FIGS. 2 and 3, at step 112, system 10 determines a set of vectors based on an intersection of the plurality of satisfying sets of vectors for the optimization parameters. For the illustrative example, the set of vectors is the intersection of the satisfying set for power consumption and the satisfying set for time of execution.

The set of vectors may be referred to as the pareto-optimal set in some example embodiments. The set of vectors contains all those architectural variants that satisfy (or nearly satisfy) the constraints. Hence the process of analyzing the initial large design space is reduced to analyzing only the architectural variants in the pareto-optimal set. For the illustrative example just three vectors from each satisfying set of optimization parameters, power consumption and time of execution, simultaneously satisfy both power consumed and execution time. The vectors are V5, V13 and V21 (see FIG. 8 and FIG. 9).

In accordance with some embodiments, system 10 is operable determine whether the constraint vectors is valid using the set of vectors. System 10 performs this constraints validation check by determining if the set of vectors is absolutely vacant. A vacant set of vectors signifies that the constraint values provided are too tight/strict. If so, the strict constraint values of the given optimization parameter need to be relaxed to a certain extent. The algorithm for used by system 10 to detect the problem and resolve is described below:

1. Let the variant vectors obtained in the set of vectors (P) after applying the proposed design space exploration approach be P={$V_a$, $V_b$, $V_c$ . . . , $V_n$}, where $V_a$, $V_b$, $V_c$ . . . , $V_n$ are vectors of the design space that are elements of the set of vectors.
2. If the set of vectors, P=φ(Null), then there exists no variants in the set P. This indicates that the constraint values are too tight and it needs to be relaxed. This is because there exist no variant vector from the design space that simultaneously obeyed the constraint values. Proceed to step #4.
3. Elseif P≠φ (not null), then there exists variants in the Pareto set, P. Continue the design process and stop the validation.
4. Relax the constraint values by a predetermined percentage, such as 5% for example, to set new constraint values for the optimization parameter. Using this illustrative example, the constraint for hardware area is '$A_{const}$' constraint for power consumption is '$P_{const}$' and constraint for execution time is '$T_{const}$', then depending on the user specified constraints, the new constraint values after applying the relaxation phase is as follows:

$$A_{const}(\text{new})=A_{const}(\text{original})+5\% \text{ of } A_{const}(\text{original}) \quad \text{a)}$$

$$T_{const}(\text{new})=T_{const}(\text{original})+5\% \text{ of } T_{const}(\text{original}) \quad \text{b)}$$

$$P_{const}(\text{new})=P_{const}(\text{original})+5\% \text{ of } P_{const}(\text{original}) \quad \text{c)}$$

At step 114, system 10 selects a vector from the set of vectors using the final optimization parameter. The selected vector is for use in constructing the system architecture.

Figure 5:
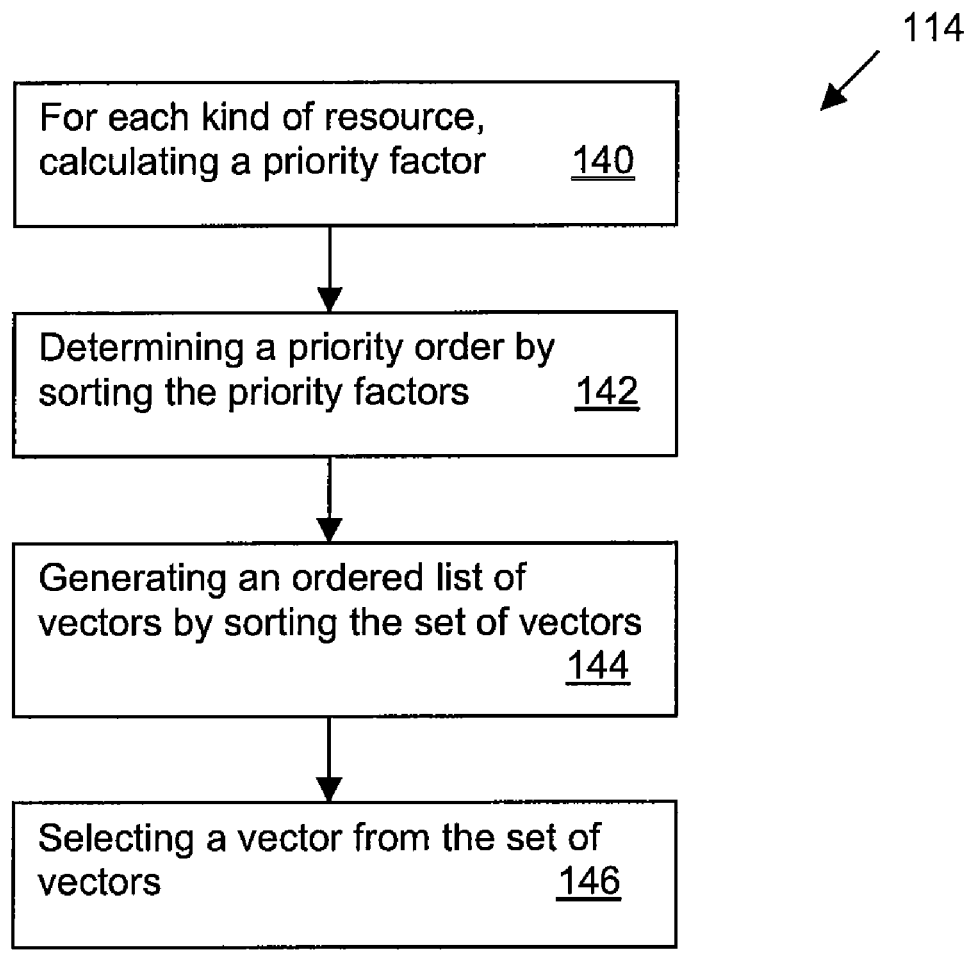
FIG. 5 illustrates a flow chart of a method for selecting a vector from the set of vectors using the final optimization parameter.

Referring now to FIG. 5, which illustrates a flow chart of a method 114 for selecting a vector from the set of vectors using the final optimization parameter. For this illustrative example, the final optimization parameter is hardware area, with a constraint value being minimum provided the constraint values for the other optimization parameters are met.

At step 140, for each kind of resource R1, . . . Rn available to construct the system architecture, system 10 calculates a priority factor using the corresponding priority factor function for the final optimization parameter. For this example, the priority factor for each resource (R1, R2, Rclk) is determined using equations (9)-(12) to arrange the vectors of the set of vectors (from the intersection of the satisfying sets) in increasing order, similarly to the way it was determined for power and execution time.

At step 142, system 10 determines a priority order by sorting the calculated priority factors based on a relative magnitude of calculated priority factors. After calculation of the priority factor for each resource, the priority order is determined. The obtained priority order is: PO(Rclk)>PO(R1)>PO(R2).

At step 144, system 10 generates an ordered list of vectors by sorting the set of vectors based on the priority order. For this example, system 10 arranges the vectors V5, V13, V21 of the set of vectors in increasing orders of magnitude.

At step 146, system 10 selects a vector from the set of vectors based on the ordered list of vectors for use in constructing the system architecture. The selected vector defines a combination of a number of each kind of resource available to construct the system architecture, which satisfies or nearly satisfies the constraint values for the optimization parameters and the resource constraints. If the vectors of the satisfying set obey the constraints or exceed the value by an acceptable amount, such as 5-10% for example, or something other configured amount, then the vectors are said to satisfy or nearly satisfy the constrain respectively. For this example, the design specification demanded minimum area overhead with simultaneous satisfaction of the constraints imposed, so the aim is to find the vector with minimum area overhead. After the arrangement of the vectors of the set of vectors, system 10 selects the vector V5=(1,1,2) (FIGS. 8 and 9) which represents the combination of a number of each resource which concurrently optimizes hardware area, power consumption and time of execution while meeting all the specifications provided.

System 10 is operable to determine and demonstrate the final variant (which satisfies all the three optimization parameters constraints values) from the intersection set of vectors. System 10 is operable to determine the final variant vector according to the following algorithm.

Algorithm
1. Determine the Border variant of power consumption and form the satisfying set of power consumption. In the example demonstrated in the paper, based on the user constraint of 8 Watts, the border variant obtained was V21.
The satisfying set (A) was ={V1, V9, V17, V2, V10, V18, V3, V11, V19, V4, V12, V20, V5, V13, V21}
2. Determine the Border variant for execution time and form the satisfying set for execution time. In the example demonstrated in the paper, based on user constraints of 140 us, the border variant obtained was V5 (see in FIG. 8).
The satisfying set (B) was={V5, V13, V21, V6, V14, V22, V7, V15, V23, V7, V15, V23, V8, V16, V24}
3. Find the Intersection Pareto set which is the intersection of set A and B. The Pareto set (P) was={V5, V13, V21}
4. Calculate the Priority factor of different resources available for hardware area (equations 9-12) which in this case is the third optimization parameter.

$$PF(R1) = \frac{\Delta N_{R1} \cdot K_{R1}}{N_{R1}} = \frac{(3-1) \cdot 20}{3} = 13.33$$

$$PF(R2) = \frac{\Delta N_{R2} \cdot K_{R2}}{N_{R2}} = \frac{(4-1) \cdot 100}{4} = 75$$

$$PF(Rclk) = \frac{\Delta A(Rclk)}{N_{Rclk}} = \frac{10-4}{2} = 3$$

5. Obtain the priority order (PO) for the above resources. Since the resource which has the highest PF is given the lowest priority hence, PO of R2 is least while PO of Rclk is highest. Hence, the following PO sequence is obtained:

PO(Rclk)>PO(R1)>PO(R2)

Figure 19:
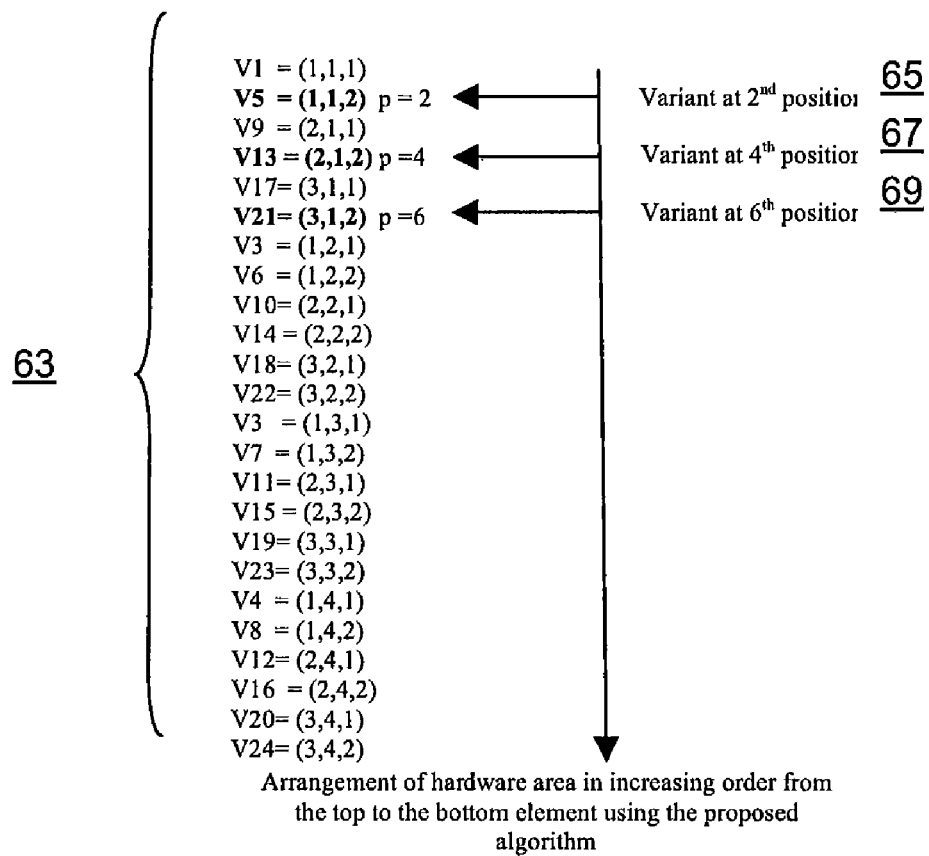
FIG. 19 illustrates an ordered list of vectors in accordance with an example embodiment.

6. Construct the architecture vector design space for hardware area using the PO obtained in step 5 and the algorithm in FIG. 7. Referring now to FIG. 19, which shows the obtained ordered list of vectors 63.
7. Assign a pointer 'p' which indicates the position of the three variants (V5, V13, V21) obtained in step 3 above. FIG. 19 illustrates a pointer 65 at vector V5, a pointer 67 at vector V13, and a pointer 69 at vector V21.
8. Find the pointer which points to the least position p and yield the variant corresponding to that position as the final variant for the exploration process. The pointer pointing to the least position indicates the variant with the minimum hardware area (among the three variants), since the design space for hardware area is arranged in increasing order from top element to bottom element. Therefore, 'V5' in position p=2 is the final best variant of the exploration process.

Referring back to FIG. 2, at step 116, system 10 provides the selected vector for use in constructing the system architecture and an integrated circuit. For example, system 10 may transmit the selected vector, store the selected vector on shared memory for access by another system or application, or both. System 10 may display or print the selected vector, or otherwise output the selected vector.

Additionally or alternatively, referring back to FIG. 3, at step 118, system 10 may develop the system architecture using the selected vector. The system architecture may include a Register Transfer Level (RTL) data path circuit, RTL control timing sequence, or both. The RTL data path circuit is configured to generate output data as a result of performing a sequence of operations on data using RTL modules, where the RTL modules include the number of each kind of resource. Other examples of RTL modules include registers for storage of data, memory modules, latches, multiplexers, and demultiplexers. The RTL control timing sequence provides a control configuration for a data path circuit to provide timing and synchronization required by data traversing through RTL modules of the RTL data path circuit. System 10 is operable to produce an integrated circuit, such as an FPGA or ASIC for example, using the system architecture.

Figure 6:
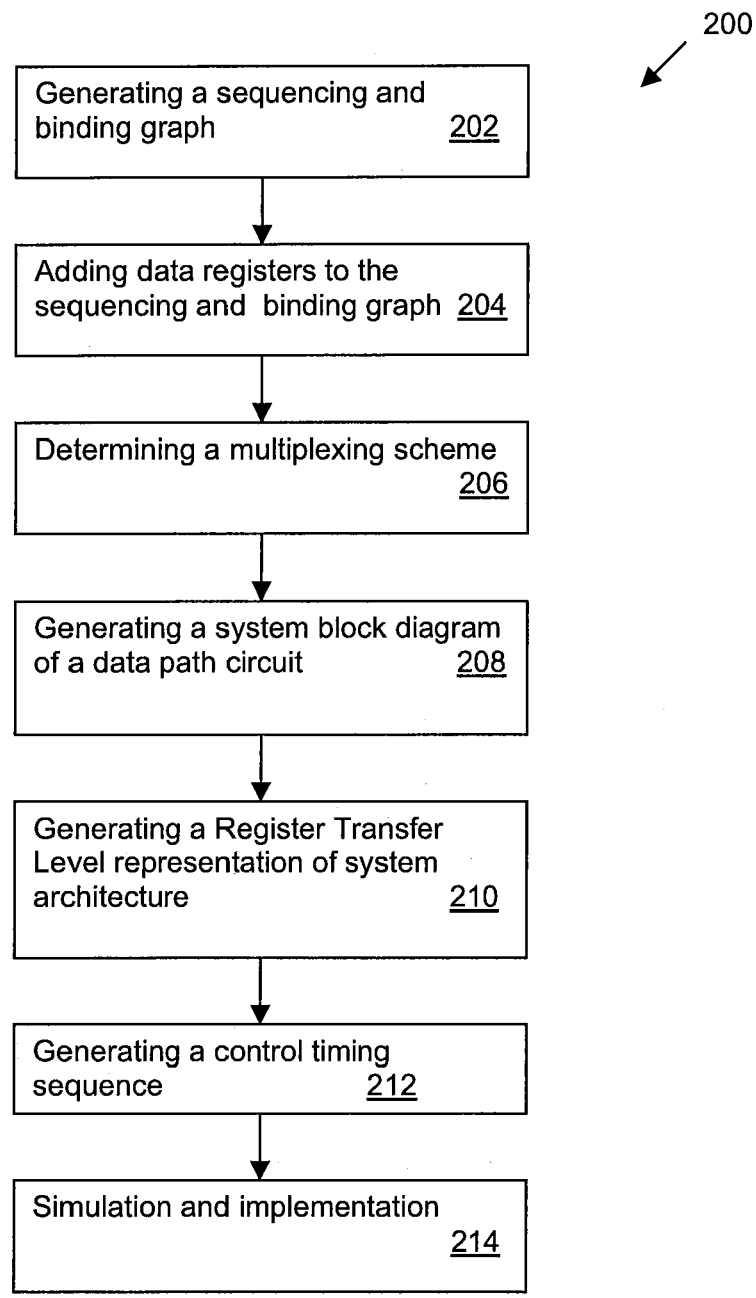
FIG. 6 illustrates a flow chart of a method for developing a system architecture using the selected vector.

Referring now to FIG. 6, which shows a flow chart of a method 200 for developing a system architecture using the selected vector.

Figure 10:
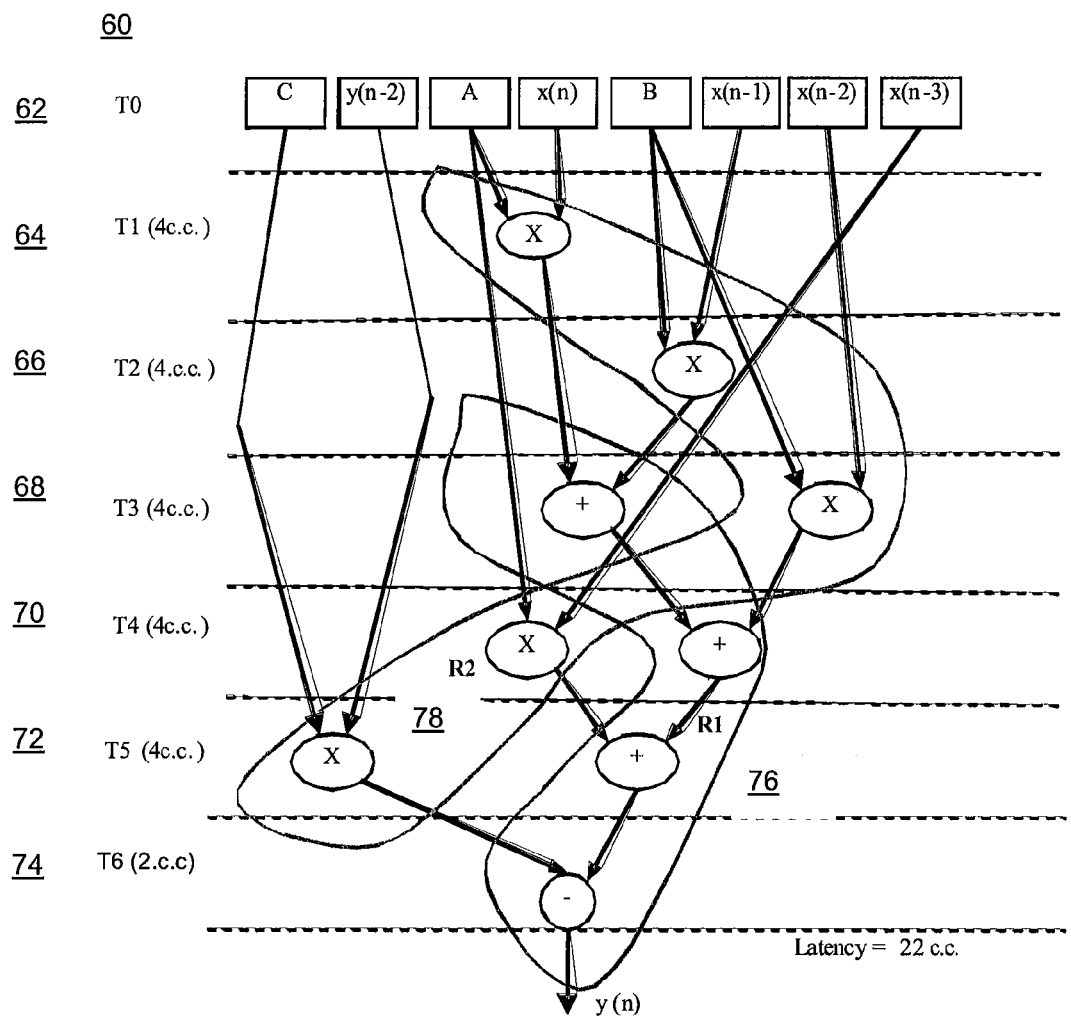
FIG. 10 illustrates a sequencing and binding graph in the context of an example problem.

The Scheduling of Operations Through the Sequencing and Binding Graph for the Selected Vector At step 202, system 10 generates a sequencing graph and a binding graph based on the selected vector. System 10 uses the aid of a sequencing graph and a binding graph to represent the combination of a number of each kind of resource specified by the selected vector in the temporal and spatial domain. The flow of data elements through different operators in the data path can be visualized with the help of sequencing graphs. This graphical representation of the application can distinctly underline the operations in discrete time steps while maintaining the precedence constraints specified. Referring now to FIG. 10, which shows a sequencing and binding graph 60 for the adder (R1) 76 and the multiplier (R2) 78 specified by the selected vector V5 for time slots T0 62, T1 64, T2 66, T3 68, T4 70, T5 72, T6 74, in the context of the example problem.

Scheduling is a process that states the time slot for every operation while fixing the timing length (latency) in such a manner so that a synthesized hardware structure meets the timing restriction specified. A classical example of time constraint scheduling where the scheduler must achieve the goal with a minimum number of functional units possible to realize the behavior is shown. The scheduling of operations is performed based on the As Soon As Possible (ASAP) algorithm. Though many algorithms may be used for scheduling operations such as the As Late as Possible (ALAP), List scheduling, Force Directed scheduling, ASAP, and so on. ASAP was selected because the operations should be done as soon as the resources R1 76 and R2 78 become free. As the processed data is ready the prepared data from the previous stage is used for the next operation. The binding graph will be used in further design stages to realize the function used as a benchmark application for demonstration of the optimized high level synthesis design flow.

Sequencing and Binding Graph with Data Registers

Figure 11:
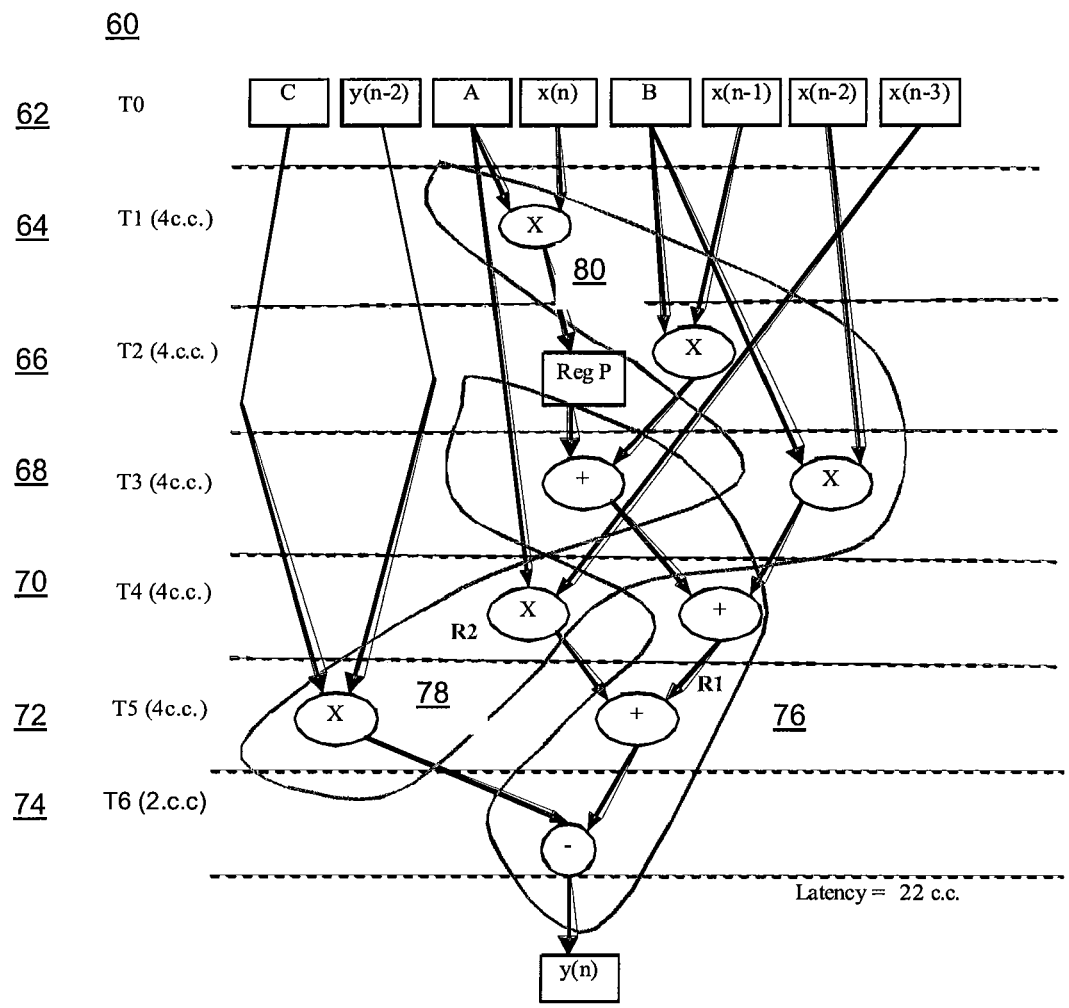
FIG. 11 illustrates the sequencing graph with data registers in the context of the example problem.
Figure 12:
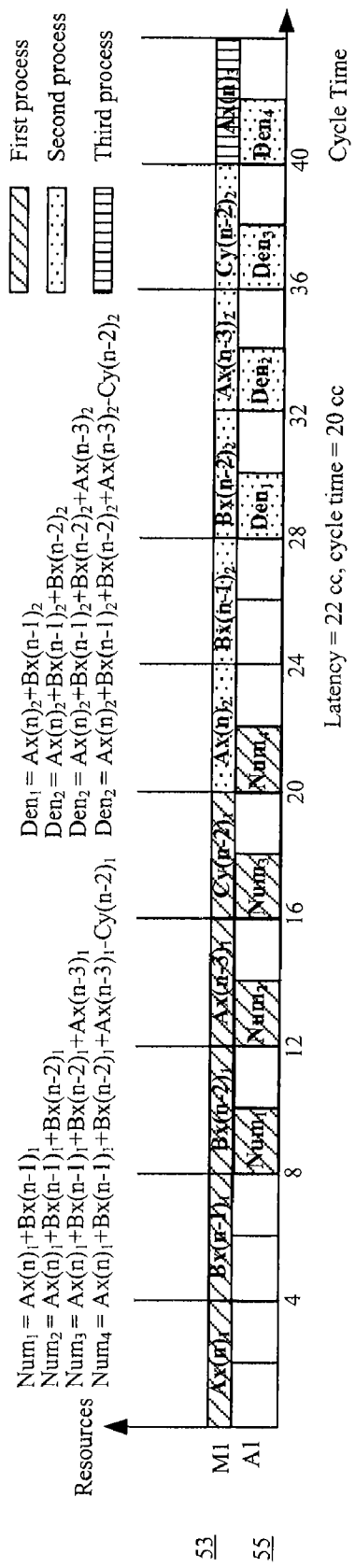
FIG. 12 illustrates the cycle time calculation for the combination of resources specified by the selected vector in accordance with an example embodiment.

Referring back to FIG. 6, at step 204, system 10 adds data registers to the sequencing and binding graph 60. In terms of architectural synthesis and optimization a circuit is generally specified by the following three dimensions. First a sequencing graph, second a set of functional resources described in the form of area and latency and, finally the operating constraints. The function of registers is to perform data storage and the wires interconnect the different discrete components. Referring now to FIG. 11, which illustrates the sequencing graph 60 with data registers 80. In the sequencing graph 60 of this example, Register P 80 has been added in time slot T2 66 because the results of the multiplier (R2) 78 at time slot T1 64 are not used until time slot T3 68. The latency for the function is calculated as 22 clock cycles. Referring now to FIG. 12, which illustrates a graph 51 for the cycle time calculation for the combination of resources specified by the selected vector, and in particular a multiplier 53 and an adder/subtractor 55.

Determination of the Multiplexing Scheme

Referring back to FIG. 6, at step 206, system 10 determines a multiplexing scheme for the resources specified in the selected vector. The binding of the resources as shown in FIGS. 10 and 11 enables a methodology to be formalized that incorporates the multiplexers and demultiplexers into the data path circuit of the system architecture. The multiplexing scheme is an important stage in high level synthesis design flow. Multiplexing scheme is a procedure for representing each system resource with respective inputs, outputs, operations, time steps and the necessary interconnections. Multiplexing scheme highlights the actual usage of resources by the operands at different times while strictly adhering to the data dependency present. The illustration provides a important guide for developing system block diagrams before developing the control unit structure for the data path. This scheme prevents any errors in the final hardware structure that could result in catastrophic consequences. The control unit is responsible for the coordination of the data path of the system. Multiplexers and demultiplexers can be constructed and assigned to their respective inputs and outputs based on the multiplexing scheme, keeping in mind the dependency of the data. In this example, two functional resources one adder/subtractor R1 and one multiplier R2 perform different functions for the circuit. A multiplexing scheme table for each of the above mentioned resources is shown in Tables 3 and 4 respectively.

TABLE 3

Multiplexing scheme for Adder/subtractor resource (R1)

| Time | Operation | Input 1 | Input 2 | Output |
|---|---|---|---|---|
| 0 | — | — | — | — |
| 1 | — | — | — | — |
| 2 | — | R2out | RegP | — |
| 3 | + | R2out | R1out | R1in |
| 4 | + | R2out | R1out | R1in |
| 5 | + | R2out | R1out | R1in |
| 6 | − | — | — | RegY |
| 7 | — | — | — | — |

TABLE 4

Multiplexing scheme for Multiplier resource (R2)

| Time | Operation | Input 1 | Input 2 | Output |
|---|---|---|---|---|
| 0 | — | RegA | Regx(n) | — |
| 1 | * | Regx(n-1) | RegB | RegP |
| 2 | * | Regx(n-2) | RegB | R1in |
| 3 | * | RegA | Regx(n-3) | R1in |
| 4 | * | RegC | Regy(n-2) | R1in |
| 5 | * | — | — | R1in |
| 6 | — | — | — | — |
| 7 | — | — | — | — |

Development of the Multiplexing Scheme

System 10 is operable to develop the multiplexing scheme table (MST) from the scheduling step (Sequencing Graph with data registers) by implementing the following algorithm.

---

Create a table with 5 columns and n rows (where n = number of time steps in the sequencing graph).
The $1^{st}$ column = the times step, $2^{nd}$ column = operation, $3^{rd}$ column = Input 1, $4^{th}$ column = Input 2 and $5^{th}$ column = Output.
Repeat for i = 0 to N
{
For time step i (0<=i<=N, where N is the total number of time steps in the sequencing graph), check if an operation exists. There could be the following three conditions:
If an (operation exists in the current time step and there also exists an operation in the next time step) the assign the respective operation for the current time step i in the column specifying the operation of the MST and assign input 1 and input 2 of next operation which would be used in the next time step (i+1) in the columns specifying the inputs of the MST. Finally, assign the output of the current operation in the column specifying the output of the MST.
Elseif, (there exists no operation in the current time step and there exists no operation in the next time step), then assign "−" for the operation in the column specifying the operation of the MST, assign "−" for the input 1, assign "−" for the input 2 in the columns specifying the inputs of the MST and assign "−" for the output of the current operation in the column specifying the output of the MST.
Elseif, (there exists no operation in the current time step but there exists an operation for the next time step), then assign "−" for the operation in the column specifying the operation of the MST, assign respective inputs for the input 1 and input 2 which would be used in the next time step (i+1), in the columns specifying the inputs of the MST. Also, assign "−" for the output of the current operation in the column specifying the output of the MST.
Elseif, (there exists an operation in the current time step but there exists no operation for the next time step), then assign the respective operation for the current time step i in the column specifying the operation of the MST, assign "−" for the input 1, assign "−" for the input 2 in the columns specifying the inputs of the MST (since there is no operation in time step i+1, hence no inputs are prepared). Finally, assign the respective output of the current operation in the column specifying the output of the MST.
}
STOP System 10 is operable to implement the algorithm mentioned above to create table 3 (multiplexing table for adder/subtractor):

Create a table with 5 columns and n rows (where n=number of time steps in the sequencing graph).

The $1^{st}$ column=the time step, $2^{nd}$ column=operation, $3^{rd}$ column=Input 1, $4^{th}$ column=Input 2 and $5^{th}$ column=Output.

At time step 0 of the sequencing graph, since there is no operation, hence, assign "−" for the operation, "−" for the input 1, "−" for the input 2 and "−" for the output in the multiplexing scheme table for $1^{st}$ row.

At time step 1 of the sequencing graph, since there is no addition operation as well, hence, assign "−" for the operations, "−" for the input 1, "−" for the input 2 and "−" for the output in the multiplexing scheme table for $2^{nd}$ row.

At time step 2 of the sequencing graph, since there is no addition operation as well, hence, assign "−" for the operations. But at this time step, the data for the addition operation in the next time step (time step 3) is getting ready hence assign "R2out" for the input 1, "RegP" for the input 2 and "−" for the output (as there is no operation performed in this step), in the multiplexing scheme table for $3^{rd}$ row.

At time step 3 of the sequencing graph, since there is an addition operation, hence, assign "+" for the operations. Also, at this time step, the data for the next addition operation for the next time step (time step 4) is getting ready hence assign "R2out" for the input 1, "R1out" for the input 2. Now the result of current addition at time step 3 is fed to next adder (binded as resource R1). Therefore assign "R1in" for the output, in the multiplexing scheme table for $4^{th}$ row.

At time step 4 of the sequencing graph, since there is an addition operation, hence, assign "+" for the operations. Also, at this time step, the data for the next addition operation for the next time step (time step 5) is getting ready hence assign "R2out" for the input 1, "R1 out" for the input 2. Now the result of current addition at time step 4 is fed to next adder (binded as resource R1). Therefore assign "R1in" for the output, in the multiplexing scheme table for $5^{th}$ row.

At time step 5 of the sequencing graph, since there is an addition operation, hence, assign "+" for the operations. Also, at this time step, the data for the subtraction operation for the next time step (time step 6) is getting ready hence assign "R2out" for the input 1, "R1 out" for the input 2. Now the result of current addition at time step 5 is fed to subtractor (binded as resource R1). Therefore assign "R1in" for the output, in the multiplexing scheme table for $5^{th}$ row.

At time step 6 of the sequencing graph, since there is a subtraction operation, hence, assign "−" for the operations. Now the result of current subtraction at time step 6 is fed to output register Y. Therefore assign "Reg Y" for the output, in the multiplexing scheme table for $6^{th}$ row.

At time step 7 of the sequencing graph, since there is no operation, hence, assign "−" for the operation, "−" for the input 1, "−" for the input 2 and "−" for the output in the multiplexing scheme table for $7^{th}$ row.

Similarly, Table 4, the multiplexing scheme table for multiplier can be obtained.

At step 208, system 10 generates a system block diagram. After the multiplexing scheme has been successfully performed, the next phase of the design flow is the development of the system block diagram. The system block diagram comprises two divisions, data path circuit and the control unit. The data path is responsible for the flow of data through the buses and wires after the operations have been performed by the components present in the data path circuit. Thus, the data path provides the sequence of operations to be performed on the arriving data based on the intended functionality. As an example, the data path can comprise registers for storage of data, memory elements such as latches for sinking of data in the next stage, as well as multiplexers and demultiplexers for preparation of data at run time by change of configuration. The data path circuit also consists of functional resources which are accountable for performing the operations on the incoming data. The block diagram for the benchmark application consists of two resources (an adder/subtractor and a multiplier) for executing their respective assigned operations. Another component of the system block diagram is the control unit or the controller. A centralized control unit controls the entire data path circuit and provides the necessary timing and synchronization required by data traversing through the data path circuit. The control unit acts as a finite state machine that changes its state according to the requirement of activating and deactivating the various elements of the data path at different instances of time. Based on the multiplexing scheme the block diagram of the data path circuit was constructed to demonstrate design flow for the benchmark application.

Figure 13:
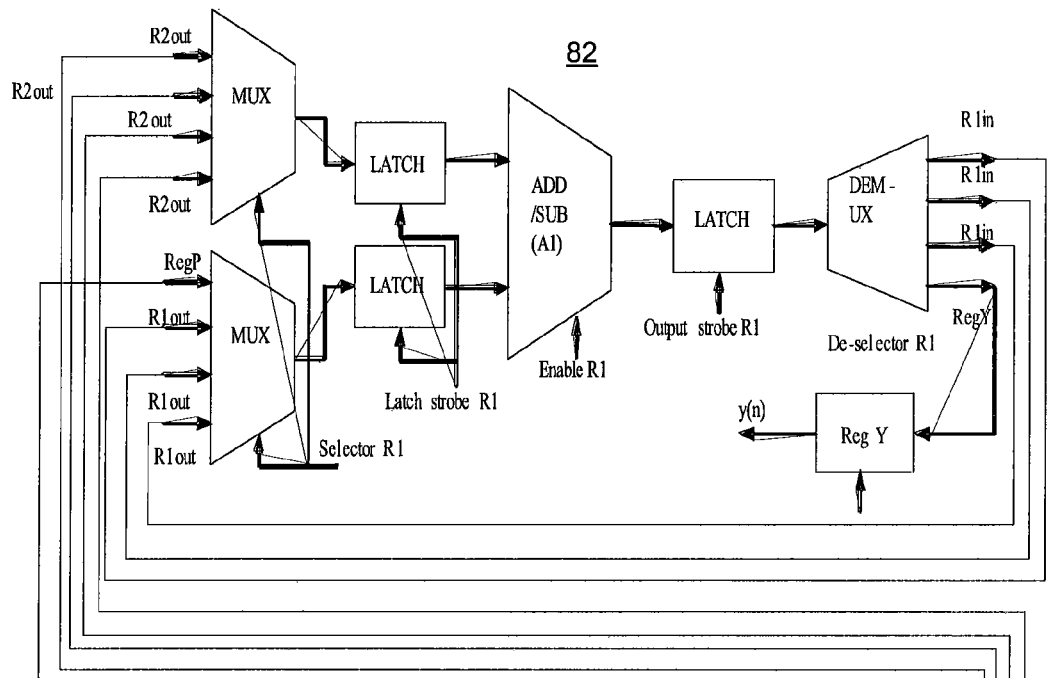
FIG. 13 illustrates a block diagram of the data path circuit for the resources specified in the selected vector in accordance with an example embodiment.
Figure 13:
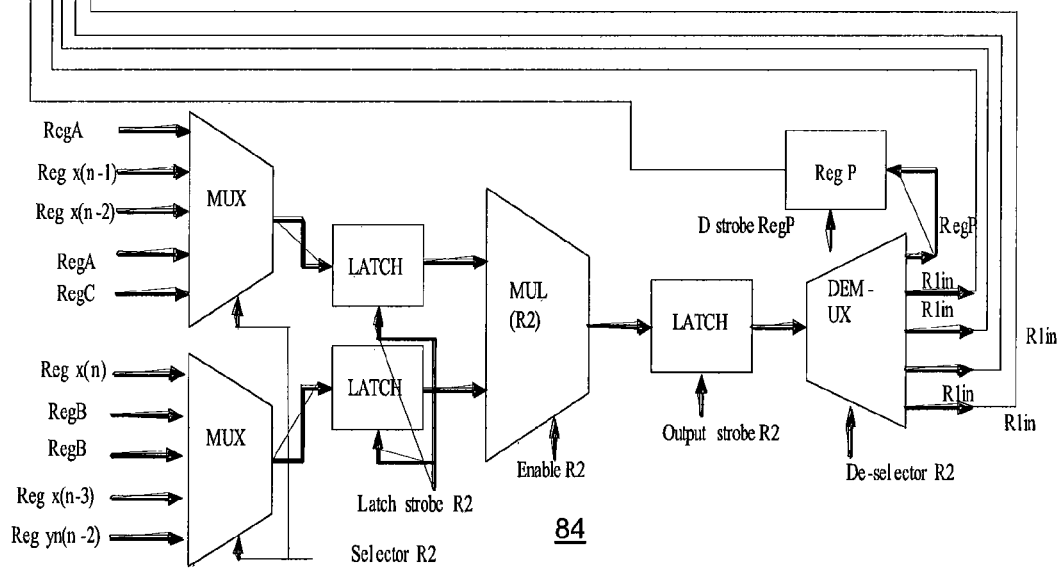

Referring now to FIG. 13, which shows a block diagram of the data path circuit 86 for the resources specified in the selected vector, which for this illustrative example, is a adder/substractor 82 and a multiplier 84.

At step 210, system 10 generates a RTL level representation of the system architecture. System 10 is operable to create the RTL data path circuit diagram from Multiplexing Scheme as follows.

The Block diagram of the RTL data path circuit in FIG. 13 is obtained from the information extracted by the multiplexing scheme in table 3 and table 4 (In the tables, R1=adder/subtractor resource and R2=multiplier resource). The procedure implemented by system 10 for constructing the data path circuit of the RTL is discussed below:

Algorithm

Let the number of variables available for INPUT 1 of the multiplexing scheme table for resource R1 be denoted as $V_x$. Therefore, from the multiplexing scheme table 3 for adder/subtractor, $V_x=4$, since there are 4 possible input variables (R2out, R2out, R2out and R2out) for INPUT 1 of adder/subtractor.

Let the number of possible variables available for INPUT 2 of the multiplexing scheme table for resource R1 be denoted as $V_y$. Therefore, from the multiplexing scheme table 3 for adder/subtractor, $V_y=4$, since there are 4 possible input variables (RegP, R1out, R1out and R1out) for INPUT 2 of adder/subtractor.

Based on the value of $V_x=4$, a 4-bit multiplexer (MUX 1) component is adopted from the module library. The inputs to the 4-bit MUX would be the 4 possible variables acting as inputs for INPUT 1 which are in this case R2out, R2out, R2out and R2out as mentioned in step 1.

Similarly, based on the value of $V_y=4$, a second 4-bit multiplexer (MUX 2) component is again adopted from the module library. The inputs to this second 4-bit MUX would be the 4 possible variables acting as inputs for INPUT 2 which are in this case RegP, R1 out, R1 out and R1 out as mentioned in step 1. Selector signals are assigned to each multiplexer which selects different inputs based on the information of the select lines.

If the multiplexers obtained in step 2 are an N bit multiplexer then input storage elements are needed for each case to store the data from different inputs at different time instances.

Since for the applications discussed as example, the multiplexers (MUX 1 and MUX 2) obtained in step 2 are 4 bit Multiplexers hence there will be a sharing of the same mux unit at different time instances. This mandates the incorporation of storage latches to temporarily hold the data for various inputs until needed by the next component. Therefore, for each multiplexer formed in step 2, a corresponding latch is added. Strobe signals are assigned to each input latch which latches the data when needed. Thus this strobe maintains the synchronization process.

Elseif the multiplexers obtained in step 2 is a 1 bit multiplexer then no input storage element is needed in the design.

Followed by the latch component, the main functional unit has to be added from the library which actually processes the data based on the inputs received at different time instances by the two multiplexers through the corresponding storage latches. In this case, the outputs of two latches act as inputs of the adder/subtractor resource. Hence, the same adder/subtractor resource performs the same functional operation but on different inputs at different time instances (as received from the latches). Enable signal is assigned to functional unit (resource) which activates the resource when both the inputs are ready. Thus enable also maintains the synchronization.

Now since the same adder/subtractor resource performs the same functional operation but on different inputs at different time instances, hence an output storage latch needs to be incorporated in the data path unit of the RTL circuit. This output storage latch holds different data from the functional resource based on the different outputs processed by the functional unit. Output Strobe signals is assigned to the output latch which latches the data when needed. Thus this strobe is also responsible for the synchronization process.

If an output storage latch is present in the data path unit, then a demultiplexer has to be added in the data path unit. This is because, based on the data stored by the output latch due to different output processing from functional unit, a structure is needed that can produce the output of all the data from the latch through parallel wires. Hence an N-bit demultiplexer is needed. In the case of example discussed so far, the value of the N bit width of the demultiplexer=value of N bit width of any input multiplexer. De-selector signal is assigned to the demultiplexer which outputs the different results of the latch through different wires.

Elseif an output storage latch is not present in the data path unit then no demultiplexer needs to be added in the data path unit.

This process is repeated for all the multiplexing tables developed in the design process. In this case, the steps from 1-6 was repeated for multiplexing table for multiplier resource (R2).

Once all the connections mentioned in step 1-7 for the discrete components for a specific resource is complete, then the outputs of each resource stage are connected to the inputs of the other resource stage based on the information present in multiplexing scheme tables. For example, in this case, input 'R1 out' of resource R1 results from the output 'R1in' of the same resource. Also, output 'R1in' of the second resource R2 acts as the input of the first resource R1in the form of 'R2out' through the second MUX. Similarly, using the information from the multiplexing tables, the interconnected components of each resource is connected among each other to obtain a circuit in FIG. 13.

Development of the Centralized Control Unit with Timing Specification

Referring back to FIG. 6, at step 212, system 10 generates a control timing sequence, also referred to herein as a control unit. The next design stage is the development of the control unit structure, which is accountable for any mis-coordination in timing among the various elements of the data path. The function of the controller is to activate and deactivate the different elements of the data path based on the timing specification determined for the objective function. The control unit prepares the data path units for the incoming data by changing the configuration to perform the next assigned function. For synchronous functioning of all data elements in the system the controller must respond to the requirement at exactly the right moment. Failure to activate or deactivate any functional block in the data path will result in fatal consequences in the system output. The determination of the timing specification from the control unit helps to create an error free structure of the controller. As an example, VHDL was used here as the hardware description language for designing the control unit, but other hardware description languages may also be used. The timing specification data shown in Table 5 is developed with clock cycles placed in the Y-axis and the control signals placed in the X-axis. At every count the transition of the different control signals can be clearly observed. This facilitates in the description of the control structure in a hardware description language.

TABLE 5

| Adder (R1) | | | | | | Multiplier (R2) | | | | | Strobes | | | |
|---|---|---|---|---|---|---|---|---|---|---|---|---|---|---|
| Latch strobe | en-able | add_sub | Output strobe | Select-or | De-selector | Latch strobe | en-able | Output strobe | select-or | De-selector | Stobes_register | Dstrobe_regP | Strobe_regY | Clock Cycles |
| 0 | 0 | 0 | 0 | 00 | 0 | 0 | 0 | 0 | 000 | 000 | 0 | 0 | 0 | 0 |
| | | | | | | | | | 000 | | 1 | | | 1 |
| | | | | | | 1 | | | | | | | | 2 |
| | | | | | | | | 1 | 001 | 000 | | | | 3 |
| | | | | | | 0 | | | | | | | | 4 |
| | | | | | | | | | | | | | | 5 |
| | | | | | | | | | | | | | | 6 |
| | | | | | | | | 1 | | | | | | 7 |
| | | | | | | | 0 | | | | | | 1 | 8 |
| | | | | | | 1 | | | | | | | | 9 |
| | | | | 00 | | | 1 | 0 | 010 | 001 | | | | 10 |
| | | | | | | 0 | | | | | | | | 11 |
| | | | | | | | | | | | | | | 12 |
| | | | | | | | | | | | | | | 13 |
| | | | | | | | 0 | 1 | | | | | | 14 |
| 1 | | | | | | 1 | | | | | | | | 15 |
| | 1 | 0 | | 01 | 00 | 1 | 0 | | 011 | 010 | | | | 16 |
| | | | | | | | | | | | | | | 17 |

TABLE 5-continued

| Adder (R1) | | | | | | Multiplier (R2) | | | | | Strobes | | | Clock Cycles |
|---|---|---|---|---|---|---|---|---|---|---|---|---|---|---|
| Latch strobe | enable | add_sub | Output strobe | Selector | De-selector | Latch strobe | enable | Output strobe | selector | De-selector | Stobes_register | Dstrobe_regP | Strobe_regY | |
| 0 | | | | | | 0 | | | | | | | | 18 |
|   |   |   |   |   |   |   |   |   |   |   |   |   |   | 19 |
|   | 0 |   | 1 |   |   |   | 0 | 1 |   |   |   |   |   | 20 |
| 1 |   |   |   |   |   | 1 |   |   |   |   |   |   |   | 21 |
|   | 1 | 0 | 0 | 10 | 01 |   | 1 | 0 | 100 | 011 |   |   |   | 22 |
| 0 |   |   |   |   |   | 0 |   |   |   |   |   |   |   | 23 |
|   |   |   |   |   |   |   |   |   |   |   |   |   |   | 24 |
|   |   |   |   |   |   |   |   |   |   |   |   |   |   | 25 |
|   | 0 |   | 1 |   |   |   | 0 | 1 |   |   |   |   |   | 26 |
| 1 |   |   |   |   |   | 1 |   |   |   |   |   |   |   | 27 |
|   | 1 | 0 | 0 | 11 | 10 |   | 1 | 0 |   | 100 |   |   |   | 28 |
| 0 |   |   |   |   |   | 0 |   |   |   |   |   |   |   | 29 |
|   |   |   |   |   |   |   |   |   |   |   |   |   |   | 30 |
|   |   |   |   |   |   |   |   |   |   |   |   |   |   | 31 |
|   | 0 |   | 1 |   |   |   | 0 | 1 |   |   |   |   |   | 32 |
| 1 |   |   |   |   |   |   |   |   |   |   |   |   |   | 33 |
|   | 1 | 1 | 0 |   | 11 |   |   |   |   |   |   |   |   | 34 |
|   |   |   |   |   |   |   |   |   |   |   |   |   |   | 35 |
| 0 |   |   | 1 |   |   |   |   |   |   |   |   |   |   | 36 |
|   | 0 |   |   |   |   |   |   |   |   |   |   |   | 1 | 37 |

System 10 is operable to implement the following procedure for determination of the controller table.

The procedure for determination of controller table is to identify the various control signals that control the different components of the data paths. With the developed block diagram in the previous step (see the algorithm for development of block diagram of the data path from multiplexing scheme table), there can be 'm' # of control signals depending on the complexity of the data path unit architecture. For the example used, after development of the block diagram of the data path unit for the example as shown in FIG. 13, the control signals for the different components can be extracted. Examples of control signals are:

Latch strobe—Control signal of input latch for adder/subtractor (R1)
enable add_sub—Control signal of resource for adder/subtractor (R1)
Output strobe—Control signal of output latch for adder/subtractor (R1)
Selector—Control signal of multiplexer for adder/subtractor (R1)
Deselector—Control signal of de-multiplexer for adder/subtractor (R1)
Latch strobe—Control signal of input latch for multiplier (R2)
enable multiplier—Control signal of resource for multiplier (R2)
Output strobe—Control signal of output latch for multiplier (R2)
Selector—Control signal of multiplexer for multiplier (R2)
Deselector—Control signal of de-multiplexer for multiplier (R2)
Stobes_register—Control signal of Reg x(n−1), Reg x(n−2), RegA, RegC, Reg x(n), RegB, Reg x(n−3), Reg y(n−2).
Dstrobe_regP—Control signal of RegP.
Strobe_regY—Control signal of output register Y.

1. When count0, if (clock event and clock='1') then
   if (reset='0') then
     if count=0 then
1.1 strobes<='0'; ----initialize strobe for the registers
1.2 latch_strobe_R2 = 0;---initialize the latch strobe
1.3 latch_strobe_R1 = 0;---initialize the latch strobe
1.4 output_strobe_R2 =0;---initialize
1.5 output_strobe_R1 =0;----initialize
1.6 strobe_regY =0; ---initialize
1.7 Dstrobe_regP =0; ---initialize
1.8 Increment count;
2. When count=1 then
2.1 strobes<='1';
2.2 selector_R2<="000";
2.3 Increment count;
3. When count=2 then
3.1 busy<='1';
3.2 latch_strobe_R2<='1';
3.3 Increment count;
4. When count=3 then
4.1 enable_R2<='1';
4.2 selector_R2<="001";
4.3 Deselector_R2<="000";
4.4 Increment count;
5. When count=4 then
5.1 latch_strobe_R2<='0';--resetting
5.2 Increment count;
6. When count=5 then
6.1 Increment count;
7. When count=6 then
7.1 Increment count;
8. When count=7 then
8.1 output_strobe_R2<='1';
8.2 Increment count;
9. When count=8 then
9.1 enable_R2<='0';---resetting the value
9.2 Dstrobe_regP<='1';
9.3 Increment count;
10. When count=9 then
10.1 latch_strobe_R2<='1';
10.2 Increment count;
11. When count=10 then
11.1 enable_R2<='1';
11.2 selector_R2<="010";----preparing for the next input
11.3 selector_R1<="00";----preparing for the next input
11.4 Deselector_R2<="001";
11.5 output_strobe_R2<='0';---resetting
11.6 Increment count;
12. When count=11 then
12.1 latch_strobe_R2<='0';----resetting
12.2 Increment count;
13. When count=12 then
13.1 Increment count;

-continued

14. When count=13 then
14.1 Increment count;
15. When count=14 then
15.1 output_strobe_R2<='1';
15.3 enable_R2<='0'; -----resetting
15.4 Increment count;
16. When count=15 then
16.1 latch_strobe_R2<='1';
16.2 latch_strobe_R1<='1';
    16.3 Increment count;
17. When count=16 then
17.1 enable_R2<='1';
17.2 add_sub<='0';--------------for the add operation
17.3 enable_R1<='1';
17.4 selector_R2<="011";
17.5 selector_R1<="01";
17.6 Deselector_R2<="010";
17.7 Deselector_R1<="00";
17.8 output_strobe_R2<='0';----resetting
17.9 Increment count;
18. When count=17 then
18.1 Increment count;
19. When count=18 then
19.1 latch_strobe_R2<='0';----resetting
19.2 latch_strobe_R1<='0';----resetting
19.3 Increment count;
20. When count=19 then
20.1 Increment count;
21. When count=20 then
21.1 output_strobe_R1<='1';
21.2 output_strobe_R2<='1';
21.2 enable_R2<='0'; -----resetting
21.3 enable_R1<='0'; -----resetting
21.4 Increment count;
22. When count=21 then
22.1 latch_strobe_R2<='1';
22.2 latch_strobe_R1<='1
22.3 Increment count;
23. When count=22 then
23.1 enable_R2<='1';
23.2 add_sub<='0';
23.3 enable_R1<='1';
23.4 selector_R2<="100";
23.5 selector_R1<="10";
23.6 Deselector_R2<="011";
23.7 Deselector_R1<="01";
23.8 output_strobe_R2<='0';----resetting
23.9 output_strobe_R1<='0';----resetting
23.10. Increment count;
24. When count=23 then
24.1 latch_strobe_R2<='0';----resetting
24.2 latch_strobe_R1<='0';----resetting
24.3 Increment count;
25. When count=24 then
25.1 Increment count;
26. When count=25 then
26.1 Increment count;
27. When count=26 then
27.1 output_strobe_R1<='1';
27.2 output_strobe_R2<='1';
27.3 enable_R2<='0'; resetting
27.4 enable_R1<='0'; resetting
27.5 Increment count;
28. When count=27 then
28.1 latch_strobe_R2<='1';
28.2 latch_strobe_R1<='1';
28.3 Increment count;
29. When count=28 then
29.1 enable_R2<='1';
29.2 add_sub<='0';
29.3 enable_R1<='1';
29.4 selector_R1<=""11";
29.5 Deselector_R2<="100";
29.6 Deselector_R1<="10";
29.7 output_strobe_R2<='0';----resetting
29.8 output_strobe_R1<='0';----resetting
29.9 Increment count;
30. When count=29 then
30.1 latch_strobe_R2<='0';----resetting
30.2 latch_strobe_R1<='0';----resetting
30.3 Increment count;
31 When count=30 then
31.1 Increment count;
32. When count=31 then
32.1 Increment count;
33. When count=32 then
33.1 output strobe_R1<='1';
33.2 output_strobe_R2<='1';
33.3 enable_R2<='0'; -----resetting
33.4 enable_R1<='0'; -----resetting
33.5 Increment count;
34. When count=33 then
34.1 latch_strobe_R1<='1';
34.2 Increment count;
35. When count=34 then
35.1 add_sub<='1'; -----for subtraction
35.2 enable_R1<='1';
35.3 Deselector_R1<="11";
35.4 output_strobe_R1<='0';----resetting
35.5 Increment count;
36. When count=35 then
36.1 Increment count;
37. When count=36 then
37.1 latch_strobe_R1<='0';---resetting
37.2 output_strobe_R1<='1';
37.3 Increment count;
38. When count=37 then
38.1 strobe_regY<='1';
38.2 enable_R1<='0';   ----resetting the value
38.3 Increment count;

Schematic Structure Development for the Whole System

Figure 14:
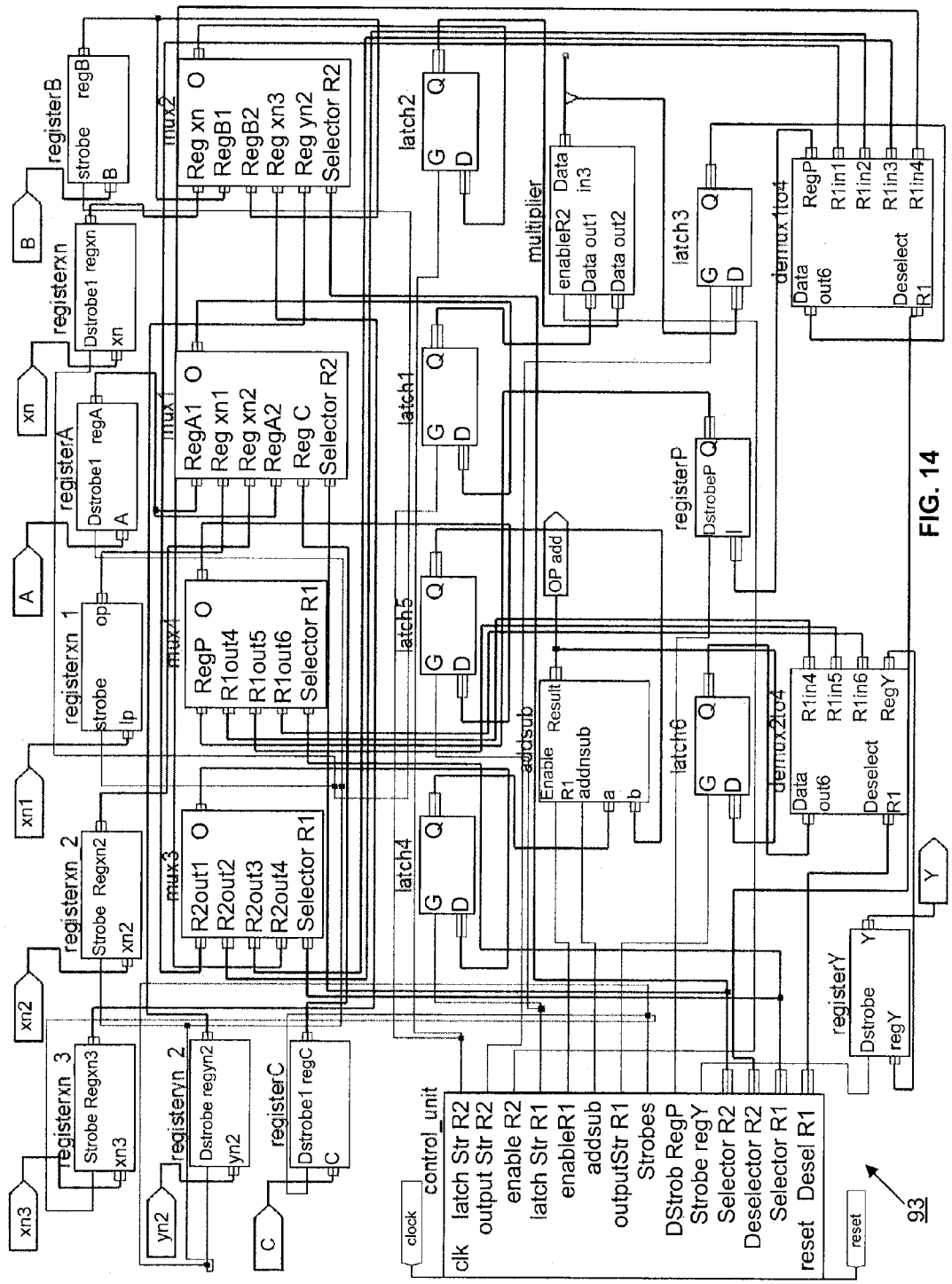
FIG. 14 illustrates a schematic structure of a device designed in accordance with an example embodiment.

At step 214, system 10 simulates the schematic structure for testing and verification and then implements the schematic structure of the device may be developed in any of the synthesis tools available. Examples include Synopsys, Xilinx Integrated Software, Environment (ISE) and Altera Quartus II. For this example, components in the data path may be described and implemented in VHDL before verification. Then, as an example, the schematic structure of the whole device may be designed and implemented in Xilinx Integrated Software Environment (ISE) version 9.2i. Referring now to FIG. 14, there is shown a schematic structure 93 of the whole device in accordance with an example embodiment, which is designed in Xilinx ISE 9.2i as an illustrative example.

Analysis and Results

For determination of a system architecture based on the selected vector, design space exploration may require elaborate analysis and evaluation of the architectural variants (design points). Before selecting the vector specifying the combination of resources to use for the system architecture, the border variants of architecture for the optimization parameters (execution time and area/power, for example) are found separately. In an example, binary search conducted on the arranged design space (increasing or decreasing) leads to the border variant, taking into account the operating constraints for execution time and area/power separately. Other search algorithms can also be used. The proposed DSE approach uses binary search after the arrangement of the design space using the priority factor method. The search of the optimal architecture requires only $$\log_2 \prod_{i=1}^{n} v_{Ri}.$$

Where 'n'=number of type of resources and '$v_{Ri}$' is the number of variants of resource 'Ri'. On the contrary, the exhaustive search checks for $$\prod_{i=1}^{n} v_{Ri}$$

architectural variants during optimal architecture while satisfying all operating constraints. In this design space exploration approach and in the design flow three optimization parameters have been used for optimization, but additional optimization parameters may also be used, such as cost for example. In one example, the execution time and power are the parametric constraints and area is the final optimization parameter. Hence, the searching has to be repeated for both optimizations parameters to determine the border variant.

Therefore the total number of architecture evaluations using exhaustive search is given as $$M * \prod_{i=1}^{n} v_{Ri}$$

And total number of architecture evaluations using the proposed method is given $$M * \log_2 \prod_{i=1}^{n} v_{Ri}.$$

Here, 'M' denotes each performance parameter. In this case the value of 'M' is two because there are two performance parametric constraints. The proposed approach was applied on various realistic benchmarks to check the acceleration obtained through this DSE method. Results indicated massive acceleration in the speedup compared to the exhaustive approach. The results of proposed design space exploration framework for the realistic benchmarks are illustrated in Table 6.

Figure 15:
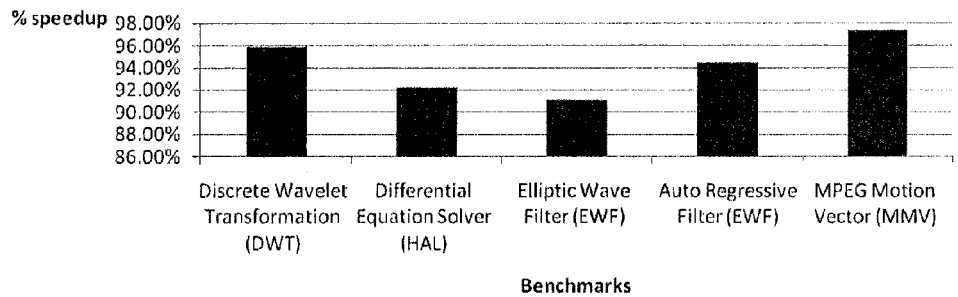
FIG. 15 illustrates a graph of the speedup results when using an approach in accordance with an example embodiment compared to an exhaustive variant analysis.
Figure 15:
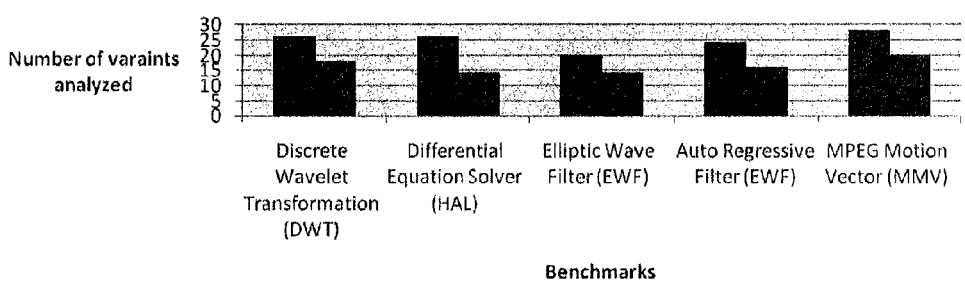
Figure 15:
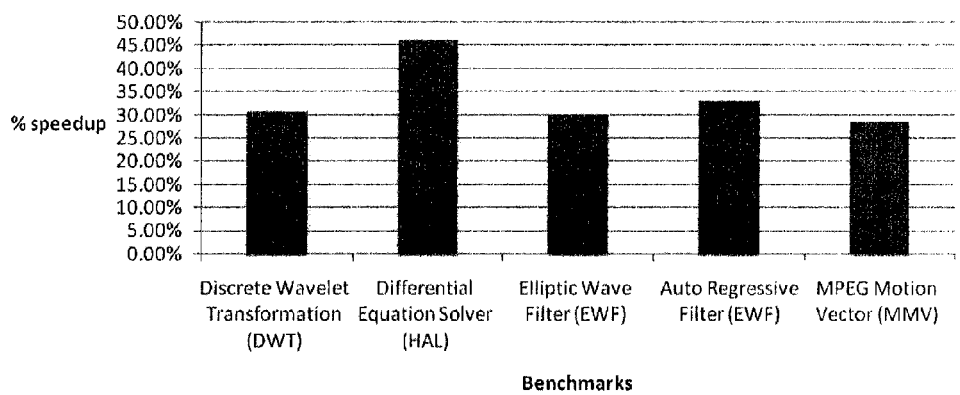

Referring now to FIG. 15, which illustrates a graph 88 of speedup results when using the proposed approach for DSE compared to the exhaustive variant analysis. A graph 90 shows the comparison of the number of architectural variants analyzed between another approach and the proposed approach in accordance with an example embodiment, while another graph 92 represents the speedup that may be attained by the proposed method compared to the hierarchy tree structure approach using Architecture Configuration Graph (ACG).

System 10 is operable to verify the device or integrated circuit, designed through the high level synthesis design flow, for its accurate functionality. System 10 is further operable to import the design in a Synopsys tool for flattening of the circuit. After flattening, system 10 is operable to execute the steps needed for floorplanning, power planning, placement and routing.

System 10 is capable of resolving the conflicting objectives in DSE by concurrently maximizing the accuracy in evaluation of the design point and minimizing the time expended for design space assessment. This approach is applicable to all system architectures based on modules with known performance requirements and system specifications. Formalizing the design methodology for multi parametric HLS may be useful for many industrial projects and modern automated high level synthesis tools.

As another example, the following illustrates an application of the embodiments to hardware area and execution time as maximum constraints values, power as a minimum constraint value.

As shown in FIGS. 2 and 3, at step 102 and 104 the problem description and the technical specifications are provided to the system 10. The application should be properly defined with its associated data structure. The constraints should be clearly defined along with the parameters to be optimized. These specifications will act as the input information for the high level synthesis tools. For the demonstration of design flow the following real specifications are assumed for initiating the high level synthesis design flow shown in Table 7 below.

TABLE 6

Experimental results of comparison between the proposed DSE approach with the current approach for large benchmarks

| Benchmarks | Total possible architecture in the design space for exhaustive search | Architecture evaluation using Hierarchical arrangement of the ACG with binary search (Number of variants analyzed) | Architecture evaluation using Proposed Priority Factor method (Number of architecture) | Percentage speed up compared to current DSE approach | Speedup using proposed approach compared to the exhaustive search |
|---|---|---|---|---|---|
| Discrete Wavelet Transformation (DWT) | 432 | 26 | 18 | 30.76% | 95.88% |
| Differential Equation Solver (HAL) | 180 | 26 | 14 | 46.15% | 92.22% |
| Elliptic Wave Filter (EWF) | 156 | 20 | 14 | 30% | 91.02% |
| Auto Regressive Filter (EWF) | 288 | 24 | 16 | 33% | 94.44% |
| MPEG Motion Vector (MMV) | 756 | 28 | 20 | 28.57% | 97.35% |

TABLE 7

System Specifications and Constraints

1) Maximum hardware area of resources: 160 area units (a.u.)
2) Maximum time of execution: 200 μs (For 1000 sets of data)
3) Power consumption: Minimum.
4) Maximum resources available for the system design:
   a) 3 Adder/subtractor units.
   b) 3 Multiplier units
   c) 3 clock frequency oscillators: 24 MHz, 100 MHz and 400 MHz TABLE 7-continued System Specifications and Constraints 5) No. of clock cycles needed for multiplier and adder/subtractor to finish each operation: 4 cc and 2 cc
6) Area occupied by each adder/subtractor and multiplier: 12 a.u. and 65 a.u. on the chip (e.g. 12 CLB on FPGA for adder/subtractor)
7) Area occupied by the 24 MHz, 100 MHz and 400 MHz clock oscillators are: 6 a.u., 10 a.u. and 14 a.u. respectively.
8) Power consumed at 24 MHz, 100 MHz and 400 MHz are: 10 mW/a.u., 32 mW/a.u. and 100 mW/a.u. respectively.

At the problem formulation stage of the high level synthesis the mathematical model of the application is used to define the behavior of the algorithm. The model suggests the input/output relation of the system and the data dependency present in the function. As an example, second order IIR digital filter function is used to demonstrate the high level synthesis design flow has been used. The transfer function of a second order IIR digital filter function can be given as:

$$H(z) = \frac{Y(z)}{X(z)} = \frac{0.041(1+z^{-1})^2}{1 - 1.4418z^{-1} + 0.6743z^{-2}} \quad (29)$$

$$H(z) = \frac{Y(z)}{X(z)} = \frac{0.041 + 0.082z^{-1} + 0.041z^{-2}}{1 - 1.4418z^{-1} + 0.6743z^{-2}} \quad (30)$$

$$y(n) = 0.041x(n) + 0.082x(n-1) + \\ 0.041x(n-2) - 0.6743y(n-2) + 1.4418y(n-1) \quad (31)$$

For this example, x(n), x(n−1) and x(n−2) are the input vector variables for the function. The previous outputs are given by y (n−1) and y (n−2), while the present output of the function is given by y(n). For simplicity, constants 0.041, 0.082, 0.6743 and 1.4418 have been denoted as 'A', 'B', 'D' and 'E' respectively. While x(n), x(n−1), x(n−2), y (n−1) and y (n−2) are denoted by Xn, Xn1, Xn2, Yn1 and Yn2 respectively.

Referring to FIGS. 2 and 3, at step 106, the architecture design space is represented in the form of vectors consisting of the resources available for the system. The random organization of the design space is used as way to represent the different combinations of the resources that make the total design space. This initial arrangement can be made in any order and is used for visualizing the total architectural variants available in the system. The design space can change based on the available resources of a system. The total design space is first created according to the specifications mentioned for total available resources for the system design. The equation Vn=($N_{R1}$, $N_{R2}$, $N_{R3}$) is used to represent the architecture design space. The variables $N_{R1}$, $N_{R2}$ and $N_{R3}$ indicate the number of adders/subtractor, multipliers, and clock frequencies. According to the specification, 1<=$N_{R1}$<=3, 1<=$N_{R2}$<=3, and 1<=$N_{R3}$<=3.

The design space shown in Table 8 below illustrates the different combinations of the resources available during system design, viz. adder/subtractor and multiplier.

TABLE 8

| | | | |
|---|---|---|---|
| V1 = (1,1,1) | V8 = (1,2,3) | V15 = (2,3,2) | V22 = (3,1,2) |
| V2 = (1,2,1) | V9 = (1,3,3) | V16 = (2,1,3) | V23 = (3,2,2) |
| V3 = (1,3,1) | V10 = (2,1,1) | V17 = (2,2,3) | V24 = (3,3,2) |
| V4 = (1,1,2) | V11 = (2,2,1) | V18 = (2,3,3) | V25 = (3,1,3) |
| V5 = (1,2,2) | V12 = (2,3,1) | V19 = (3,1,1) | V26 = (3,2,3) |
| V6 = (1,3,2) | V13 = (2,1,2) | V20 = (3,2,1) | V27 = (3,3,3) |
| V7 = (1,1,3) | V14 = (2,2,2) | V21 = (3,3,1) | |

At step 108, for each optimization parameter, system 10 defines a priority factor function for each kind of resource available to construct the system architecture. Example priority factor functions are described herein.

At step 110, for each optimization parameter except the final optimization parameter, system 10 is operable to implement method 110 illustrated in FIG. 4.

At step 130, for hardware area, system is operable to calculate the priority factor for each available resource and arrangement of the PF in increasing order for area.

For resource adder/subtractor (R1):

$$PF(R1) = \frac{\Delta N_{R1} \cdot K_{R1}}{N_{R1}} = \frac{(3-1) \cdot 12}{3} = 8$$

For resource multiplier (R2):

$$PF(R2) = \frac{\Delta N_{R2} \cdot K_{R2}}{N_{R2}} = \frac{(3-1) \cdot 65}{3} = 43.33$$

For resource clock oscillator (Rclk):

$$PF(Rclk) = \frac{\Delta A(Rclk)}{N_{Rclk}} = \frac{(14-6)}{3} = 2.67$$

The above factors are a true measure of the change in area with the change in number of a specific resource. For example, according to the above analysis the change in number of multipliers affects the change in area the most. While the change in clock frequency from 24 MHz to 400 MHz influences the change in area the least.

At step 132, system 10 determines the priority order (PO) according to the priority factors calculated. For this example, the PO is arranged so that the resource with the lowest priority factor is assigned the highest priority order while the resource with the highest priority factor is assigned the lowest priority order. The priority order of the resources increases with the decrease in priority factor of the resources. Therefore the following PO of the resources is obtained for arranging the design variants in increasing order.

PO(Rclk)>PO(R1)>PO(R2)

Figure 20:
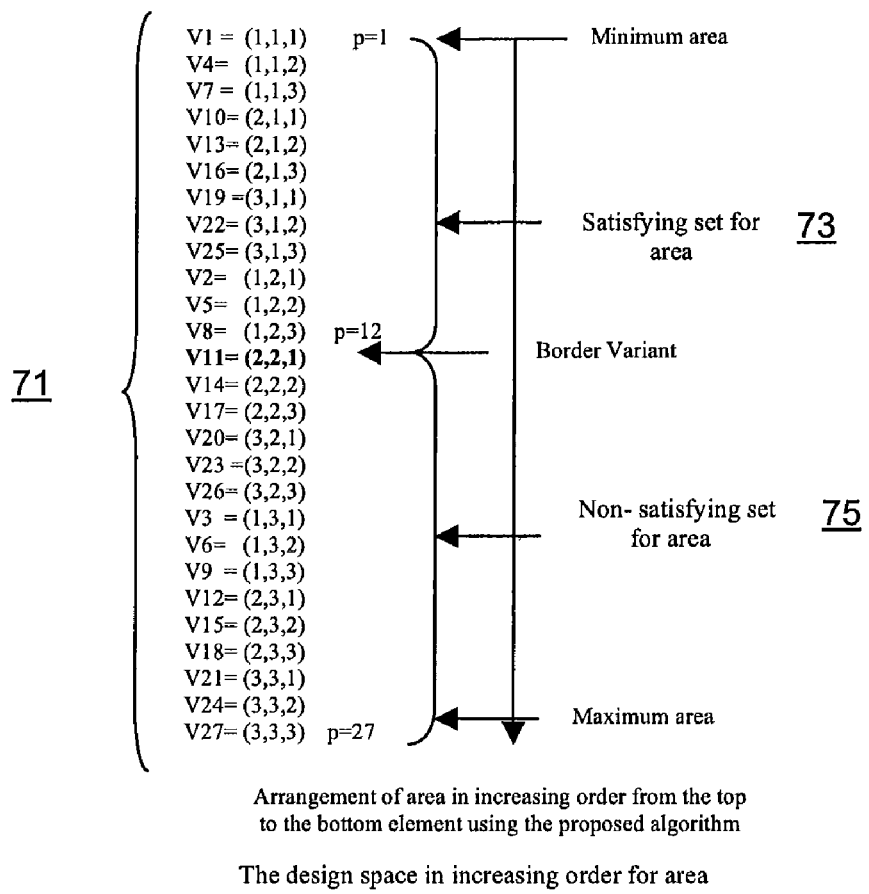
FIG. 20 illustrates an ordered list of vectors for area in accordance with an example embodiment.

At step 134, system 10 generates an ordered list of vectors based on the above priority such that the design space for area can be organized in increasing orders of magnitude. This will help prune the design space for obtaining the border variant for area. An ordered set of vectors 71 is shown in FIG. 20 Determination of the Border Variant for the Area At step 136, system 10 determines a satisfying set (or nearly satisfying set) by applying a binary search to the ordered set of vectors 71 shown in FIG. 20, the search yielded the design variants shown in Table 9 by analyzing the area occupied according to equation (1). '$A_{optimal}$' is the value of area occupied that is specified as a constraint at the beginning of the design flow. '$A^i$' is the value of area occupied by the variant#i. When the value of $A^i$ is less than the value of specified $A_{optimal}$, then the southern portion (down) of the design space with respect to the calculated value of $A^i$ is searched. On the contrary, if the value of $A^i$ is more than the value of specified $A_{optimal}$, then the northern portion (up) of the space with respect to the calculated value of $A^i$ is searched. After four iterations, variant 11 is found to be the last variant which satisfies the $A_{optimal}$. Hence, this variant is called the border variant for area. The significance of this border variant lies in the fact that all variants to the top of the border variant satisfy the condition of $A_{optimal}$, while any variant to the bottom fails to meet the constraint.

TABLE 9

VARIANTS OBTAINED AFTER PRUNING FOR AREA

| Variants | Area occupied by the Resources ($A_{Ri}$) | Decision based on the $A_{optimal}$ |
|---|---|---|
| Variant#11 | $A^{11}$ = (2 * 12) + (2 * 65) + 6 = 160 a.u. | $A^{11} <= A_{optimal}$ (Search down in the design space) |
| Variant#6 | $A^6$ = (1 * 12) + (3 * 65) + 10 = 217 a.u. | $A^{16} > A_{optimal}$ (Search up in the design space) |
| Variant#20 | $A^{20}$ = (3 * 12) + (2 * 65) + 6 = 172 a.u. | $A^{20} > A_{optimal}$ (search up in the design space) |
| Variant#14 | $A^{14}$ = (2 * 12) + (2 * 65) + 10 = 164 a.u. | stop |

As shown in FIG. 20, for area, the satisfying set 73 is all vectors above the border variant V11, including the border variant. The non-satisfying set 75 for area is all vectors below the border variant V11.

For the next optimization parameter, time of execution, system 10 returns to step 130 to calculate the priority factor for each available resource for time of execution.

For resource adder/subtractor (R1):

$$PF(R1) = \frac{\Delta N_{R1} \cdot T_{R1}}{N_{R1}} \cdot (T_p)^{max} = \frac{(3-1) \cdot 2}{3} * 0.0416 = 0.055$$

For resource multiplier (R2):

$$PF(R2) = \frac{\Delta N_{R2} \cdot T_{R2}}{N_{R2}} \cdot (T_p)^{max} = \frac{(3-1) * 4}{3} * 0.0416 = 0.11$$

For resource clock oscillator ($R_{clk}$):

$$PF(Rclk) = \frac{N_{R1} \cdot T_{R1} + N_{R2} \cdot T_{R2} + \ldots + N_{Rn} \cdot T_{Rn}}{N_{Rclk}} \cdot (\Delta T_p)$$
$$= \frac{(3*2) + (3*4)}{3} * 0.039$$
$$= 0.234$$

The factors determined above indicate a measurement of the change in time of execution with the change in number of a specific resource. For instance, according to the above analysis the change in number of adder/subtractor affects the change in time of execution the least, while the change in clock frequency from 24 MHz to 400 MHz affects the change in time of execution the most. Similarly, the change in multiplier influences the change in execution time less than the change in clock frequency.

At step 132, system 10 determines the following priority order (PO) for arranging the design variants in increasing order according to the priority factors calculated above.

PO(R1)>PO(R2)>PO(Rclk)

Figure 21:
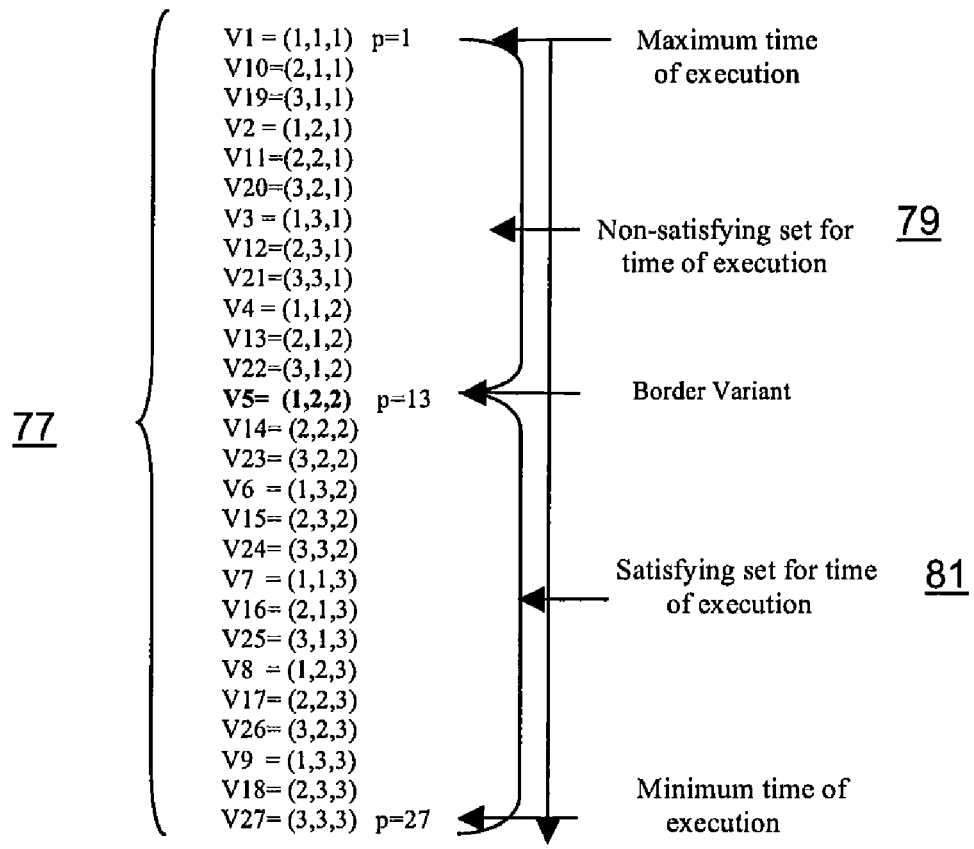
FIG. 21 illustrates an ordered list of vectors for time of execution in accordance with an example embodiment.

At step 134, system 10 generates an ordered list of vectors based on the PO. Referring now to FIG. 21, which illustrates an ordered list of vectors 77 for time of execution. The arrangement of the vector space in decreasing order enables the design space to be pruned for finding the border variant of time of execution.

At step 136, system 10 determines the satisfying set by determining the border variant for the time of execution parameter. The binary search algorithm is applied to the design space (or ordered list of vectors). After applying the binary search, the variants that are analyzed in the process according to equation (13) to determine the best variant is shown in Table 10. Analysis reveals that variant number 'V5' is the border variant for the 'time of execution' parameter. Hence all the design variants to the south of the vector space must satisfy the constraint imposed by the user.

TABLE 10

VARIANTS OBTAINED AFTER PRUNING THE DESIGN SPACE FOR TIME OF EXECUTION PARAMETER

| Variants | Time of execution ($T_{exe}$) | Decision based on the $T_{optimal}$ |
|---|---|---|
| Variant#5 | $T_{exe}^5$ = 14 + (1000 − 1) * 10 * 0.01 = 100.04 μs | $T_{exe}^5 < T_{optimal}$ (search up in the design space) |
| Variant#20 | $T_{exe}^{20}$ = 14 + (1000 − 1) * 10 * 0.0416 = 416.82 μs | $T_{exe}^{20} > T_{optimal}$ (search down in the design space) |
| Variant#21 | $T_{exe}^{21}$ = 12 + (1000 − 1) * 8 * 0.0416 = 333.5 μs | $T_{exe}^{21} > T_{optimal}$ (search down in the design space) |
| Variant#13 | $T_{exe}^{13}$ = 22 + (1000 − 1) * 20 * 0.01 = 200.02 μs | $T_{exe}^{13} > T_{optimal}$ (search down in the design space) |
| Variant#22 | $T_{exe}^{22}$ = 22 + (1000 − 1) * 20 * 0.01 = 200.02 μs | stop |

FIG. 21 illustrates that, for time of execution, the satisfying set 79 is all vectors above the border variant V5, including the border variant V5, and the non-satisfying set 81 is all vectors below the border variant.

At step 112, system 10 determines a set of vectors based on the intersection of the satisfying sets of vectors for area and time of execution.

At step 114, system 10 selects a vector from the set of vectors, as illustrated by the flowchart in FIG. 5 for example. In this example, power consumption is the final optimization parameter.

At step 140, system 10 calculates the priority factor for the power consumption parameter is determined according to equations (25)-(28) to arrange the variants of the set of vectors in increasing order, similar to the way the priority factor for area and execution time were determined. At step 142, after calculation of the PF the priority order is determined. The obtained priority order is: PO (R1)>PO (R2)>PO (Rclk)

Variants V5, V7, V16, V25 and V8 belong to the set of vectors. The variants V5, V7, V16, V25 and V8 are arranged in increasing order for power consumption. According to the specification provided, the variant with the minimum power consumption should be selected. At step 144, system generates an ordered list of vectors based on the PO and at step 146 selects a vector. In this example, variant 'V5' is selected as it represents a combination of resources with the minimum power consumption. Therefore variant number 'V5' is the only variant from the whole design space consisting of 27 variants that optimizes concurrently hardware area, power consumption and time of execution while meeting all the specifications provided.

As an additional example, system 10 may receive cost of resources and execution time as maximum constraints, and power as a minimum constraint. System 10 is operable to implement the function of the second order digital IIR Chebyshev filter is given in (1d).

$$y(n)=0.041x(n)+0.082x(n-1)+0.041x(n-2)-0.6743y(n-2)+1.4418y(n-1) \quad (1d)$$

Where x(n), x(n−1) and x(n−2) are the input vector variables for the function. The previous outputs are given by y(n−1) and y(n−2), while the present output of the function is y(n).

System 10 calculates priority factors the cost of each resource and determines a priority order (consisting of resources) in increasing orders for cost The PF of the different resources for cost model is given as:

$$PF(R1) = \frac{\Delta N_{R1} \cdot K_{R1} \cdot C_{R1}}{N_{R1}} = \frac{(3-1) \cdot 12 \cdot 10}{3} = 80$$

$$PF(R2) = \frac{\Delta N_{R2} \cdot K_{R2} \cdot C_{Ri}}{N_{R2}} = \frac{(3-1) \cdot 65 \cdot 10}{3} = 433.33$$

$$PF(RM) = \frac{\Delta N_{RM} \cdot K_{RM} \cdot C_{RM}}{N_{RM}} = \frac{(2-1) \cdot 4 \cdot 4}{3} = 8$$

$$PF(Rclk) = \frac{\Delta A(Rclk) \cdot C_{Rclk}}{N_{Rclk}} = \frac{(14-6) \cdot 8}{3} = 21.36$$

Based on the PF calculated for cost model, the architecture vector space for cost can be constructed. This architecture tree uses a new topology in this paper for design space arrangement. The vector space topology used enable quick arrangement of the design space which is further used for searching the border variant. The topology adds another dimension as it does not require any special algorithm to arrange the design space. Just mere construction of the architecture vector space based on the calculated PF for a parameter ensures that the design space has become sorted in increasing/decreasing orders of magnitude. The architecture vector space comprising of the design space becomes automatically arranged in increasing orders of magnitude for the cost model.

Therefore applying binary search on the sorted design space for cost yields the border variant in just few comparisons. The border variant for cost is the last variant in the design space which satisfies the constraint for cost specified. The border variant obtained for cost is 'V19'.

System 10 determines an ordered set by arrangement of the design space in decreasing orders in the form of architecture vector space for execution time.

The PF of the different resources used in system design for execution time model is given below:

$$PF(R1) = \frac{\Delta N_{R1} \cdot T_{R1}}{N_{R1}} \cdot (T_p)^{max} = \frac{(3-1) \cdot 2}{3} \cdot 0.0416 = 0.055$$

$$PF(R2) = \frac{\Delta N_{R2} \cdot T_{R2}}{N_{R2}} \cdot (T_p)^{max} = \frac{(3-1) \cdot 4}{3} \cdot 0.0416 = 0.111$$

$$PF(Rclk) = \frac{T_{Rclk}^{Max} - T_{Rclk}^{Min}}{N_{Rclk}} = \frac{333.5 - 20.01}{3} = 104.50$$

$$PF(RM) = \frac{T_{RM}^{Max} - T_{RM}^{Min}}{N_{RM}}$$

System 10 determines an ordered set by arrangement of the design space in decreasing orders in the form of architecture tree for execution time. The job is to just hold the data temporarily until being used by some functional unit in next clock cycles. Therefore the change in number of memory elements does not directly affect the execution time (e.g. the execution time does not change regardless of whether the there are two separate registers at different time slots or both are binded together to act as one single register to save chip area). Hence, $T_{RM}^{Max} = T_{RM}^{Min}$. Hence, PF(RM)=0.

Based on the PF calculated for execution time, the architecture vector space for execution time is also constructed. Hence, the obtained architecture vector space after construction is now also automatically arranged (sorted) in decreasing orders of magnitude. After arrangement, binary searching is applied in order to find the border variant for execution time. The border variant for execution time is the first variant in the design space which satisfies the constraint for cost specified. The border variant obtained is variant 'V19'. After the border variant for both cost and execution time is obtained, the Pareto optimal set is obtained. Then the architecture vector space for power consumption is also similarly constructed as explained before using the PF function, in increasing orders of magnitude for power consumption Among the variants of the Pareto set, the variant, which appears first in the ascending ordered sorted design space, is the one with the minimum power consumption and concurrently satisfies the constraints for cost, execution time and power consumption (specified in Table 11) for the design problem.

TABLE 11

1) Maximum Cost of Resources: 1484 units
2) Maximum Time of execution: 416.83 µs (for D = 1000 sets of data)
3) Power consumption: Minimum
4) Maximum resources available for the system design:
   a) 3 Adder/subtractor units.
   b) 3 Multiplier units
   c) 3 clock frequency oscillators: : 24 MHz, 100 MHz and 400 MHz
5) No. of clock cycles needed for multiplier and adder/subtractor to finish each operation: 4 cc and 2 cc
6) Area occupied by each adder/subtractor, multiplier and memory element (register): 12 area units (a.u), 65 a.u. and 4 a.u. on the chip
7) Area occupied by the 24 MHz, 100 MHz and 400 MHz clock oscillator: 6 a.u., 10 a.u. and 14 a.u.
8) Power consumed at 24 MHz, 100 MHz and 400 MHz: 10 mW/a.u., 32 mW/a.u. and 100 mW/a.u. respectively.
9) Cost per area unit resource ($C_{Ri}$) = 10 units, Cost per area unit memory element = 4 units and Cost per area unit clock oscillator = 8 units The present invention has been described here by way of example only. Various modification and variations may be made to these exemplary embodiments without departing from the spirit and scope of the invention, which is limited only by the appended claims.

We claim:

1. A method of developing a system architecture comprising:
   defining a plurality of resources constraints $maxN_{R1}, \ldots maxN_{Rn}$, wherein each resource constraint corresponds to a maximum number $N_{Ri}$, $1 \leq i \leq n$, of a each kind of resources R1, ... Rn available to construct the system architecture, wherein n is an integer greater than 1, wherein i is an integer;
   defining a constraint value for each of at least three optimization parameters for the system architecture, wherein the at least three optimization parameters comprise a final optimization parameter;
   defining a design space as a plurality of vectors representing different combinations of a number of each kind of resource R1, ... Rn available to construct the system architecture, wherein each vector $V_n$ of the design space is of the form:

$$V_n = (N_{R1}, \ldots N_{Rn})$$

wherein, $N_{R1}$ represents the number of the kind of resource R1, $N_R$ represents the number of the kind of resource Rn; and wherein based on resource constraints, $1 \leq N_{R1} \leq \max N_{R1}, \ldots 1 \leq N_{Rn} \leq \max N_{Rn}$, wherein $\max N_{R1}$ is a maximum number of the kind of resource R1, ... $\max N_{Rn}$ is a maximum number of the kind resource Rn;

for each of the plurality of optimization parameters, defining a priority factor function for each kind of resource R1, ... Rn, wherein a priority factor function defines a rate of change of the optimization parameter with respect to a change in a number $N_{Ri}$ of the corresponding kind of resource Ri, $1 \leq i \leq n$;

determining by a processor, a plurality of satisfying sets of vectors by, for each of the optimization parameters except for the final optimization parameter, for each kind of resource R1, ... Rn available to construct the system architecture, calculating a priority factor using the corresponding priority factor function for the optimization parameter;

determining a priority order by sorting the calculated priority factors based on a relative magnitude of the calculated priority factors;

generating an ordered list of vectors by sorting the plurality of vectors of the design space based on the priority order; and determining a satisfying set of vectors from the ordered list of vectors, wherein each vector of the satisfying set substantially satisfies the constraint value for the optimization parameter;

determining a set of vectors based on an intersection of the plurality of satisfying sets of vectors for the optimization parameters;

selecting, by a processor, a vector from the set of vectors using the final optimization parameter by, for each kind of resource R1, ... Rn available to construct the system architecture, calculating a priority factor using the corresponding priority factor function for the final optimization parameter;

determining a priority order by sorting the calculated priority factors based on a relative magnitude of calculated priority factors;

generating an ordered list of vectors by sorting the set of vectors based on the priority order;

selecting the vector from the set of vectors based on the ordered list of vectors; and developing the system architecture using the selected vector.

2. The method of claim 1, wherein the system architecture comprises a Register Transfer Level data path circuit.

3. The method of claim 2, wherein the Register Transfer Level data path circuit is configured to generate output data as a result of performing a sequence of operations on data using Register Transfer Level modules, wherein the Register Transfer Level modules include the number of each kind of resources represented by the selected vector.

4. The method of claim 3, wherein the Register Transfer Level modules are selected from the group consisting of registers for storage of data, memory modules, latches for sinking of data, multiplexers and demultiplexers.

5. The method of claim 1, wherein the system architecture comprises a Register Transfer Level control timing sequence.

6. The method of claim 5, wherein the Register Transfer Level control timing sequence provides a control configuration for a data path circuit to provide timing and synchronization required by data traversing through the Register Transfer Level modules of the data path circuit.

7. The method of claim 1, wherein the kinds of resources R1, ... Rn are selected from the group consisting of adders, subtractors, clock oscillators, multipliers, divider, comparator, Arithmetic Logic Unit (ALU), integrator, summer and other functional modules.

8. The method of claim 1, wherein the optimization parameters are selected from the group consisting of hardware area, cost, time of execution, and power consumption.

9. The method of claim 1, wherein the final optimization parameter is a hardware area of a total number of all kinds of resources R1, ... Rn and wherein, for the hardware area, the priority factor function of each kind of resource R1, ... Rn is an indicator of a change of area contributed by a change in the number of the kind of resource Ri, wherein $1 \leq i \leq n$.

10. The method of claim 9, wherein, for the hardware area, the priority factor for each kind of resource R1, ... Rn that is not a clock oscillator is calculated from $N_{Ri}$, $\Delta N_{Ri}$, $K_{Ri}$ wherein $N_{Ri}$ is the number of the kind of resource Ri, $K_{Ri}$ is an area occupied by the kind of resource Ri, $\Delta N_{Ri} \cdot K_{Ri}$ is a change of area contributed by the kind of resource Ri, wherein Ri is a member of the kinds of resources R1, ... Rn; and wherein, for the hardware area, the priority factor function of resource Ri that is a clock oscillator is calculated from $\Delta A(R_{clk})$, $N_{Rclk}$, $R_{clk}$, wherein $R_{clk}$ is a clock oscillator used to construct the system architecture, $\Delta A(R_{clk})$ is a change of area occupied by clock oscillators, $N_{Rclk}$ is a number of clock oscillators.

11. The method of claim 10, wherein, for the hardware area, the priority factor for each kind of resource R1, ... Rn that is not a clock oscillator is of the form:

$$PF(Ri) = \frac{\Delta N_{Ri} \cdot K_{Ri}}{N_{Ri}}$$

and wherein, for the hardware area, the priority factor function of resource Ri that is a clock oscillator is of the form:

$$\frac{\Delta A(R_{clk})}{N_{Rclk}}.$$

12. The method of claim 1, wherein the plurality of optimization parameters comprise a time of execution of a total number of all kinds resources R1, ... Rn, and wherein, for the time of execution, the priority factor function for each kind of resource R1, ... Rn is a function of the rate of change of a cycle time with a change in the number $N_{Ri}$, of the kind of resources Ri at a maximum clock period, wherein $1 \leq i \leq n$ and Ri is a member of the kinds of resources R1, ... Rn.

13. The method of claim 11, wherein the priority factor function for the time of execution of the resources R1, ... Rn that is not a clock oscillator is calculated by $N_{Ri}$, $T_{Ri}$, $T_p^{max}$, wherein $N_{Ri}$ is the number of the kind of resource Ri, $T_{Ri}$ a number of clock cycles required by the kind of resource Ri to finish each operation, $T_p$ is the time period of the clock, $T_p^{max}$ is the maximum clock period; and wherein, for the time of execution, the priority factor function of resource Ri that is a clock oscillator is calculated by $R_{clk}$, $N_{Ri}$, $T_{Ri}$, $R_{clk}$, $N_{Rclk}$, where $R_{clk}$ is a clock oscillator used to provide necessary clock frequency to the system, $N_{Ri}$ is the number of the kind of resource Ri, $N_{Rclk}$ is the number of clock oscillators, $T_{Ri}$, a number of clock cycles required by the kind of resource Ri to finish each operation.

14. The method of claim 13, wherein the priority factor function for the time of execution of the resources R1, . . . Rn that is not a clock oscillator is of the form:

$$PF(R_i) = \frac{\Delta N_{Ri} T_{Ri}}{N_{Ri}}(T_p^{max})$$

and wherein, for the time of execution, the priority factor function of resource Ri that is a clock oscillator is of the form:

$$PF(R_{clk}) = \frac{N_{R1} \cdot T_{R1} + N_{R2} \cdot T_{R2} \ldots + N_{Rn} \cdot T_{Rn}}{N_{Rclk}}(\Delta T_p).$$

15. The method of claim 1, wherein the plurality of optimization parameters comprise a power consumption of the resources R1, . . . Rn, and wherein, for the power consumption, the priority factor function for each kind of resource R1, . . . Rn is a function of a change in power consumption per unit area due to deviation of clock frequency from maximum to minimum and a change in the number $N_{Ri}$ of the kind of resource Ri at maximum clock frequency, wherein 1<i<n, and Ri is a member of the kinds of resources R1, . . . Rn.

16. The method of claim 15, wherein the priority factor function for the power consumption of the resources R1, . . . Rn that is not a clock oscillator is calculated by $N_{Ri}$, $K_{Rn}$, $\Delta N_{Ri}$, $(p_c)^{max}$, $p_c$ wherein $N_{Ri}$, is the number of resource Ri, $K_{Rn}$ is an area occupied by resource Ri, $\Delta N_{Rn} \cdot K_{Rn}$ is a change of area contributed by resource Ri, $p_c$ is power consumed per area unit resource at a particular frequency of operation, $(p_c)^{max}$ is power consumed per area unit resource at a maximum clock frequency; and wherein, for the power consumption, the priority factor function of resource Ri that is a clock oscillator is calculated by $N_{Ri}$, $T_{Ri}$, $R_{clk}$, $N_{Rclk}$, $p_c$ where $R_{clk}$ is a clock oscillator used to provide necessary clock frequency to the system, $N_{Ri}$ is the number of the kind of resource Ri, $T_{Rn}$ a number of clock cycles required by resource Ri to finish each operation, $p_c$ is power consumed per area unit of resource at a particular frequency of operation.

17. The method of claim 16, wherein the priority factor function for the power consumption of the resources R1, . . . Rn that is not a clock oscillator is of the form:

$$PF(Ri) = \frac{\Delta N_{Ri} \cdot K_{Ri}}{N_{Ri}}(p_c)^{max}$$

and wherein, for the power consumption, the priority factor function of resource Ri that is a clock oscillator is of the form:

$$PF(Rclk) = \frac{N_{R1} \cdot T_{R1} + N_{R2} \cdot T_{R2} \ldots + N_{Rn} \cdot T_{Rn}}{N_{Rclk}}(\Delta p_e).$$

18. The method of claim 1 wherein the plurality of optimization parameters comprise a total cost of the total number of all kinds resources R1, . . . Rn, and wherein, for the total cost, the priority factor function for each kind of resource R1, . . . Rn is an indicator of change in total cost of the total number of all kinds resources R1, . . . Rn with respect to a change in the number of the kind of resource Ri and the cost per unit resource, wherein 1≦i≦n.

19. The method of claim 18, wherein, for the cost, the priority factor function for each kind of the resources R1, . . . Rn that is not a clock oscillator is calculated by $N_{Ri}$, $K_{Ri}$, $\Delta N_{Ri}$, $C_{Ri}$, wherein $N_{Ri}$ is the number of the kind of resource Ri, $K_{Ri}$ is an area occupied by the kind of resource Ri, $\Delta N_{Ri} \cdot K_{Ri}$, is a change of area contributed by the kind of resource Ri, $C_{Ri}$ is the cost per area unit of the kind of resource Ri; and wherein, for the cost, the priority factor function of resource Ri that is a clock oscillator is calculated by $R_{clk}$, $N_{Rclk}$, $\Delta A(R_{clk})$, $C_{Rclk}$, wherein $R_{clk}$ is a clock oscillator used to provide necessary clock frequency to the system, $\Delta A(R_{clk})$ is a change of area occupied by clock oscillators, $N_{Rclk}$ is a total number of clock oscillators available to construct the system architecture, $C_{Rclk}$ is the cost per area unit of clock oscillators.

20. The method of claim 19, wherein, for the cost, the priority factor function for each kind of the resources R1, . . . Rn that is not a clock oscillator is of the form:

$$PF(Ri) = \frac{\Delta N_{Ri} \cdot K_{Ri} \cdot C_{Ri}}{N_{Ri}}$$

and wherein, for the cost, the priority factor function of resource Ri that is a clock oscillator is of the form:

$$PF(R_{clk}) = \frac{A(R_{clk}) \cdot C_{Rclk}}{N_{Rclk}}.$$

21. The method of claim 20, further comprising determining a multiplexing scheme for the resources R1, . . . Rn of the selected vector, with inputs, outputs, operations, interconnections and time steps.

22. The method of claim 1, further comprising, for each optimization parameter:
determining a border variant from the ordered list of vectors, wherein the border variant is the extreme vector of the ordered list of vectors to satisfy the constraint value for the optimization parameter such that all vectors to one side of the border variant in the ordered list of vectors satisfy the constraint value for the optimization parameter and all vectors to the other side of the border variant in the ordered list of vectors do not satisfy the constraint value for the optimization parameter;
and wherein determining the satisfying set of vectors from the ordered list of vectors further comprises using the border variant.

23. The method of claim 22, further comprising producing a Register Transfer Level data path circuit by selecting components for the system architecture using the inputs, outputs, operations, interconnections and time steps for the resources R1, . . . Rn as specified in the multiplexing scheme.

24. The method of claim 1, further comprising, for each of the plurality of optimization parameters, determining whether the constraint value for the optimization parameter is valid by:

determining a minimum value for the optimization parameter;
determining a maximum value for the optimization parameter;
determining whether the constraint value is greater than or equal to the minimum value for the optimization parameter and whether the constraint value is less than or equal to the maximum value for the optimization parameter;
if the constraint value is greater than or equal to the minimum value for the optimization parameter and the constraint value is less than equal than or equal to the maximum value for the optimization parameter, determining that the constraint value is valid; and
otherwise, determining that the constraint value is invalid and prompting for correction.

25. The method of claim 1, further comprising determining whether the set of vectors is valid by determining whether the set of vectors is null; and upon determining that the set of vectors is not valid, relaxing the constraint values for each optimization parameter by predetermined percentage.

26. The method of claim 1, further comprising representing the combination of the number of resources R1, . . . Rn of the selected vector in a temporal and a spatial domain using a sequencing and binding graph and a plurality of registers.

27. The method of claim 1, further comprising producing an integrated circuit using the system architecture, wherein the system architecture is constructed using a specific combination of a number of each kind of resource R1, . . . Rn represented by the selected vector, wherein the system architecture defines a data path circuit and dictates a formation of a control unit of the data path circuit for production of the integrated circuit, wherein the data path circuit defines data flow through the specific combination of resources R1, . . . Rn of the system architecture and the control unit provides a control sequence for the data path circuit to provide timing and synchronization required by data traversing through the specific combination of resources R1, . . . Rn of the system architecture.

28. The method of claim 1, wherein the set of vectors based on the intersection of the satisfying sets of vectors is a pareto set of vectors.

29. A computer-readable storage medium comprising instructions for execution on a computing device, wherein the instructions, when executed, perform acts of a method of developing a system architecture, wherein the method comprises:
defining a plurality of resources constraints $maxN_{R1}$, . . . $maxN_{Rn}$, wherein each resource constraint corresponds to a maximum number $N_{Ri}$, $1 \leq i \leq n$, of a each kind of resources R1, . . . Rn available to construct the system architecture, wherein n is an integer greater than 1, wherein i is an integer;
defining a constraint value for each of at least three optimization parameters for the system architecture, wherein the at least three optimization parameters comprise a final optimization parameter;
defining a design space as a plurality of vectors representing different combinations of a number of each kind of resource R1, . . . Rn available to construct the system architecture, wherein each vector $V_n$ of the design space is of the form:

$$V_n = (N_{R1}, \ldots N_{Rn})$$

wherein, $N_{R1}$ represents the number of the kind of resource R1, $N_{Rn}$ represents the number of the kind of resource Rn; and wherein based on resource constraints, $1 \leq N_{R1} \leq maxN_{R1}$, . . . $1 \leq N_{Rn} \leq maxN_{Rn}$, wherein $maxN_{R1}$ is a maximum number of the kind of resource R1 . . . $maxN_{Rn}$ is a maximum number of the kind resource Rn;
for each of the plurality of optimization parameters, defining a priority factor function for each kind of resource R1, . . . Rn, wherein a priority factor function defines a rate of change of the optimization parameter with respect to a change in a number $N_{Ri}$ of the corresponding kind of resource Ri, $1 \leq i \leq n$;
determining, by a processor, a plurality of satisfying sets of vectors by, for each of the optimization parameters except for the final optimization parameter,
for each kind of resource R1, . . . Rn available to construct the system architecture, calculating a priority factor using the corresponding priority factor function for the optimization parameter;
determining a priority order by sorting the calculated priority factors based on a relative magnitude of the calculated priority factors;
generating an ordered list of vectors by sorting the plurality of vectors of the design space based on the priority order; and
determining a satisfying set of vectors from the ordered list of vectors, wherein each vector of the satisfying set substantially satisfies the constraint value for the optimization parameter;
determining a set of vectors based on an intersection of the plurality of satisfying sets of vectors for the optimization parameters;
selecting, by a processor, a vector from the set of vectors using the final optimization parameter:
for each kind of resource R1, . . . Rn available to construct the system architecture, calculating a priority factor using the corresponding priority factor function for the final optimization parameter;
determining a priority order by sorting the calculated priority factors based on a relative magnitude of calculated priority factors;
generating an ordered list of vectors by sorting the set of vectors based on the priority order;
selecting the vector from the set of vectors based on the ordered list of vectors; and
developing the system architecture using the selected vector.

30. A system of developing a system architecture comprising:
a resource constraint module for defining a plurality of resources constraints $maxN_{R1}$, . . . $maxN_{Rn}$, wherein each resource constraint corresponds to a maximum number $N_{Ri}$, $1 \leq i \leq n$, of a each kind of resources R1, . . . Rn available to construct the system architecture, wherein n is an integer greater than 1, wherein i is an integer;
an optimization parameter constraint module for defining a constraint value for each of at least three optimization parameters for the system architecture, wherein the at least three optimization parameters comprise a final optimization parameter;
a design space module for defining a design space as a plurality of vectors representing different combinations of a number of each kind of resource R1, . . . Rn available to construct the system architecture, wherein each vector $V_n$ of the design space is of the form:

$$V_n = (N_{R1}, \ldots N_{Rn})$$

wherein, $N_{R1}$, represents the number of the kind of resource R1, $N_{Rn}$ represents the number of the kind of resource Rn; and wherein based on resource constraints, $1 \leq N_{R1} \leq \text{maxN}_{R1}, \ldots 1 \leq N_{Rn} \leq \text{maxN}_{Rn}$, wherein $\text{maxN}_{R1}$ is a maximum number of the kind of resource R1, . . . $\text{maxN}_{Rn}$, is a maximum number of the kind resource Rn;

a priority factor module for each of the plurality of optimization parameters, defining a priority factor function for each kind of resource R1, . . . Rn, wherein a priority factor function defines a rate of change of the optimization parameter with respect to a change in a number $N_{Ri}$ of the corresponding kind of resource Ri, $1 \leq i \leq n$;

a satisfying set module for determining a plurality of satisfying sets of vectors by, for each of the optimization parameters except for the final optimization parameter,
 for each kind of resource R1, . . . Rn available to construct the system architecture, calculating a priority factor using the corresponding priority factor function for the optimization parameter;
 determining a priority order by sorting the calculated priority factors based on a relative magnitude of the calculated priority factors;
 generating an ordered list of vectors by sorting the plurality of vectors of the design space based on the priority order; and
 determining a satisfying set of vectors from the ordered list of vectors, wherein each vector of the satisfying set substantially satisfies the constraint value for the optimization parameter;

an intersection module for determining a set of vectors based on an intersection of the plurality of satisfying sets of vectors for the optimization parameters;

a selection module for selecting a vector using the final optimization parameter by:
 for each kind of resource R1, . . . Rn available to construct the system architecture, calculating a priority factor using the corresponding priority factor function for the final optimization parameter;
 determining a priority order by sorting the calculated priority factors based on a relative magnitude of calculated priority factors;
 generating an ordered list of vectors by sorting the set of vectors based on the priority order;
 selecting a vector from the set of vectors based on the ordered list of vectors; and a system architecture module for developing the system architecture using the selected vector.

31. A method of determining a vector representing a combination of a number of each kind of resource R1, . . . Rn available for constructing a system architecture comprising:

defining a plurality of resources constraints $\text{maxN}_{R1}, \ldots \text{maxN}_{Rn}$, wherein each resource constraint corresponds to a maximum number $N_{Ri}$, $1 \leq i \leq n$, of a each kind of resources R1, . . . Rn available to construct the system architecture, wherein n is an integer greater than 1, wherein i is an integer;

defining a constraint value for each of at least three optimization parameters for the system architecture, wherein the at least three optimization parameters comprise a final optimization parameter;

defining a design space as a plurality of vectors representing different combinations of a number of each kind of resource R1, . . . Rn available to construct the system architecture, wherein each vector $V_n$ of the design space is of the form:

$$V_n = (N_{R1}, \ldots N_{Rn})$$

wherein, $N_{R1}$ represents the number of the kind of resource R1, $N_{Rn}$ represents the number of the kind of resource Rn; and wherein based on resource constraints, $1 \leq N_{R1} \leq \text{maxN}_{R1}, \ldots 1 \leq N_{Rn} \leq \text{maxNRn}$, wherein $\text{maxN}_{R1}$ is a maximum number of the kind of resource R1, . . . $\text{maxN}_{Rn}$ is a maximum number of the kind resource Rn;

for each of the plurality of optimization parameters, defining a priority factor function for each kind of resource R1, . . . Rn, wherein the priority factor function defines a rate of change of the optimization parameter with respect to a change in a number $N_{Ri}$ of the corresponding kind of resource Ri, $1 \leq i \leq n$;

determining, by a processor, a plurality of satisfying sets of vectors by, for each of the optimization parameters except for the final optimization parameter,
 for each kind of resource R1, . . . Rn available to construct the system architecture, calculating a priority factor using the corresponding priority factor function for the optimization parameter;
 determining a priority order by sorting the calculated priority factors based on a relative magnitude of the calculated priority factors;
 generating an ordered list of vectors by sorting the plurality of vectors of the design space based on the priority order; and
 determining a satisfying set of vectors from the ordered list of vectors, wherein each vector of the satisfying set substantially satisfies the constraint value for the optimization parameter;

determining a set of vectors based on an intersection of the plurality of satisfying sets of vectors for the optimization parameters;

selecting, by a processor, a vector from the set of vectors using the final optimization parameter by,
 for each kind of resource R1, . . . Rn available to construct the system architecture, calculating a priority factor using the corresponding priority factor function for the final optimization parameter;
 determining a priority order by sorting the calculated priority factors based on a relative magnitude of calculated priority factors;
 generating an ordered list of vectors by sorting the set of vectors based on the priority order;
 selecting a vector from the set of vectors based on the ordered list of vectors.

* * * * *

UNITED STATES PATENT AND TRADEMARK OFFICE
CERTIFICATE OF CORRECTION

PATENT NO. : 8,397,204 B2
APPLICATION NO. : 12/974925
DATED : March 12, 2013
INVENTOR(S) : Sengupta et al.

It is certified that error appears in the above-identified patent and that said Letters Patent is hereby corrected as shown below:

In the Claims:

Col. 54, line 58, claim 1, the mathematical symbol "$1 \leqq i \leqq n$" should be replaced with "$1 \leq i \leq n$".

Col. 55, line 9, claim 1, the mathematical symbols "$1 \leqq NR1 \leqq maxNR1$" should be replaced with "$1 \leq NR1 \leq maxNR1$".

Col. 55, line 18, claim 1, the mathematical symbol "$1 \leqq i \leqq n$" should be replaced with "$1 \leq i \leq n$".

Col. 56, line 19, claim 10, the mathematical symbol "$1 \leqq i \leqq n$" should be replaced with "$1 \leq i \leq n$".

Col. 56, line 56, claim 12, the mathematical symbol "$1 \leqq i \leqq n$" should be replaced with "$1 \leq i \leq n$".

Col. 58, line 6, claim 18, the mathematical symbol "$1 \leqq i \leqq n$" should be replaced with "$1 \leq i \leq n$".

Col. 59, line 49, claim 29, the mathematical symbol "$1 \leqq i \leqq n$" should be replaced with "$1 \leq i \leq n$".

Col. 59, line 67, claim 29, the mathematical symbols "$1 \leqq NR1 \leqq maxNR1$" should be replaced with "$1 \leq NR1 \leq maxNR1$".

Col. 60, line 9, claim 29, the mathematical symbol "$1 \leqq i \leqq n$" should be replaced with "$1 \leq i \leq n$".

Col. 60, line 50, claim 30, the mathematical symbol "$1 \leqq i \leqq n$" should be replaced with "$1 \leq i \leq n$".

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,397,204 B2

Col. 61, line 2, claim 30, the mathematical symbols "$1 \leqq NR1 \leqq maxNR1$" should be replaced with "$1 \leq NR1 \leq maxNR1$".

Col. 61, line 11, claim 30, the mathematical symbol "$1 \leqq i \leqq n$" should be replaced with "$1 \leq i \leq n$".

Col. 61, line 33, claim 30, "parameter by:" should be replaced with "parameter by,".

Col. 61, line 52, claim 31, the mathematical symbol "$1 \leqq i \leqq n$" should be replaced with "$1 \leq i \leq n$".

Col. 62, line 13, claim 31, the mathematical symbols "$1 \leqq NR1 \leqq maxNR1$" should be replaced with "$1 \leq NR1 \leq maxNR1$" and "$1 \leqq NRn \leqq maxNRn$" should be replaced with "$1 \leq NRn \leq maxNRn$".

Col. 62, line 22, claim 31, the mathematical symbol "$1 \leqq i \leqq n$" should be replaced with "$1 \leq i \leq n$".